(12) United States Patent
Fasel

(10) Patent No.: US 10,953,979 B2
(45) Date of Patent: Mar. 23, 2021

(54) CONTROL OF HYPERSONIC BOUNDARY LAYER TRANSITION

(71) Applicant: The Arizona Board of Regents on Behalf of the University of Arizona, Tucson, AZ (US)

(72) Inventor: Hermann F. Fasel, Tucson, AZ (US)

(73) Assignee: The Arizona Board of Regents on Behalf of the University of Arizona, Tucson, AZ (US)

( * ) Notice: Subject to any disclaimer, the term of this patent is extended or adjusted under 35 U.S.C. 154(b) by 216 days.

(21) Appl. No.: 15/349,745

(22) Filed: Nov. 11, 2016

(65) Prior Publication Data
US 2017/0240271 A1    Aug. 24, 2017

Related U.S. Application Data

(60) Provisional application No. 62/254,103, filed on Nov. 11, 2015.

(51) Int. Cl.
*B64C 21/10*        (2006.01)
*B64C 30/00*        (2006.01)
(Continued)

(52) U.S. Cl.
CPC .............. *B64C 21/10* (2013.01); *B64C 21/04* (2013.01); *B64C 21/08* (2013.01); *B64C 23/06* (2013.01); *B64C 30/00* (2013.01); *B64C 2230/10* (2013.01); *B64C 2230/26* (2013.01); *Y02T 50/162* (2013.01); *Y02T 50/166* (2013.01)

(58) Field of Classification Search
CPC ....... B64C 23/00; B64C 23/06; B64C 23/005; B64C 21/00; B64C 21/02; B64C 21/025; B64C 21/04; B64C 21/06; B64C 21/08; B64C 21/10; B64C 2230/00; B64C 2230/04; B64C 2230/06; B64C 2230/08; B64C 2230/10; B64C 2230/16; B64C 2230/20; B64C 2230/22; B64C 2230/26; B64C 2003/148; B64C 30/00;
(Continued)

(56) References Cited

U.S. PATENT DOCUMENTS 3,002,716 A * 10/1961 Shaw ...................... B64C 30/00
                                                   244/117 A
5,348,256 A *  9/1994 Parikh .................... B64C 21/06
                                                   244/204
(Continued)

*Primary Examiner* — Richard R. Green
*Assistant Examiner* — Brady W Frazier
(74) *Attorney, Agent, or Firm* — Blank Rome LLP

(57) ABSTRACT

A system and method for controlling hypersonic boundary layer transition for a hypersonic flight vehicle are disclosed. The reduction or elimination of hot streaks that naturally occurs in the boundary layer transition process during hypersonic flight is achieved by utilizing various techniques. One such technique utilizes roughness elements to counteract streak development. The techniques for reducing or eliminating the streaks are tailored such that the nonlinear stages of transition are profoundly altered. This results in significant drag reduction, and consequently an increase in range of the vehicle, and also a reduction of the weight penalty due to the Thermal Protection Systems (TPS) as less protective material would be required, thus allowing for an increased payload and/or range of the vehicle.

18 Claims, 72 Drawing Sheets

(51) Int. Cl.
*B64C 23/06* (2006.01)
*B64C 21/04* (2006.01)
*B64C 21/08* (2006.01)

(58) Field of Classification Search
CPC ...... F15D 1/008; F15D 1/0075; F15D 1/0085; Y02T 50/162; Y02T 50/166
USPC ..................................................... 244/200.1
See application file for complete search history.

(56) References Cited

U.S. PATENT DOCUMENTS

| | | | |
|---|---|---|---|
| 5,598,990 A * | 2/1997 | Farokhi | B64C 23/06 244/198 |
| 6,027,078 A * | 2/2000 | Crouch | B64C 21/00 244/130 |
| 8,894,019 B2 * | 11/2014 | Alvi | F15D 1/008 244/200.1 |
| 9,272,772 B2 * | 3/2016 | Reckzeh | B64C 9/24 |
| 2008/0061192 A1 * | 3/2008 | Sullivan | B64C 21/10 244/200 |
| 2013/0255796 A1 * | 10/2013 | DiMascio | F16S 5/00 137/334 |
| 2015/0108269 A1 * | 4/2015 | Lugg | B64C 1/26 244/13 |
| 2015/0336659 A1 * | 11/2015 | Zhong | B64C 21/10 244/130 |
| 2016/0009364 A1 * | 1/2016 | Goel | B64C 3/141 244/206 |

* cited by examiner

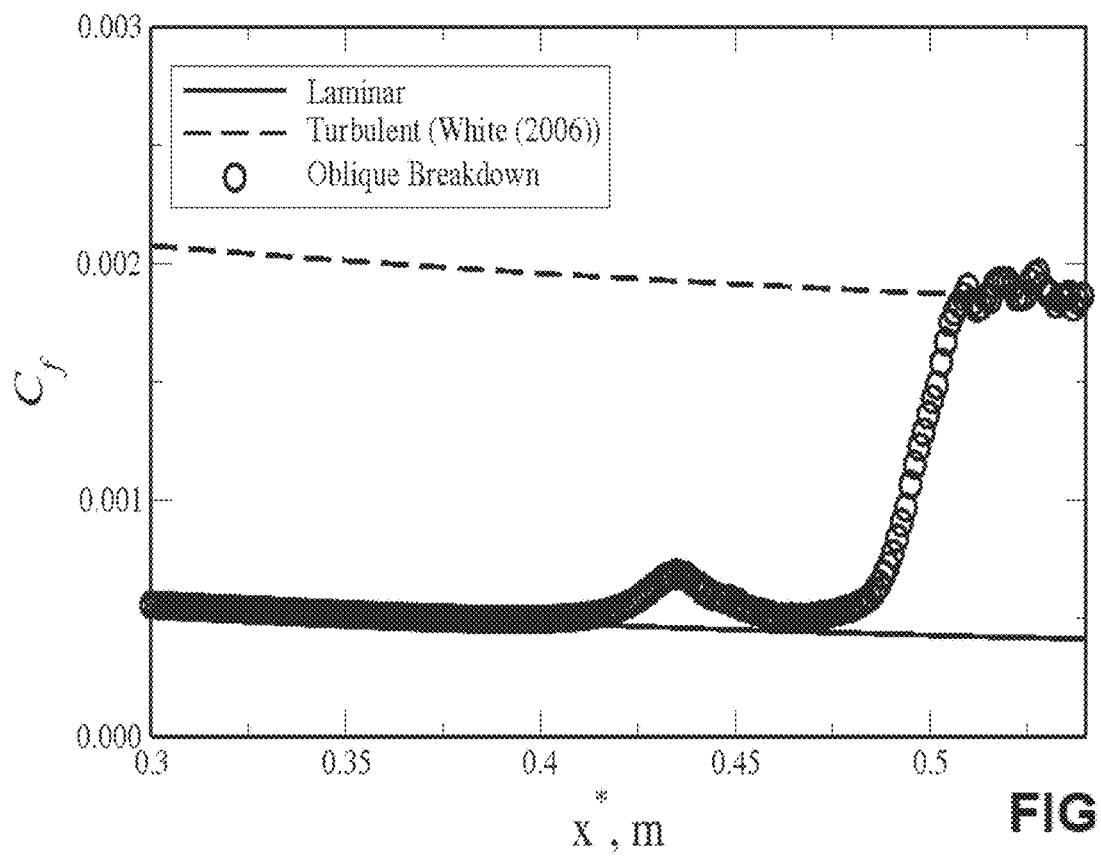
FIG. 13
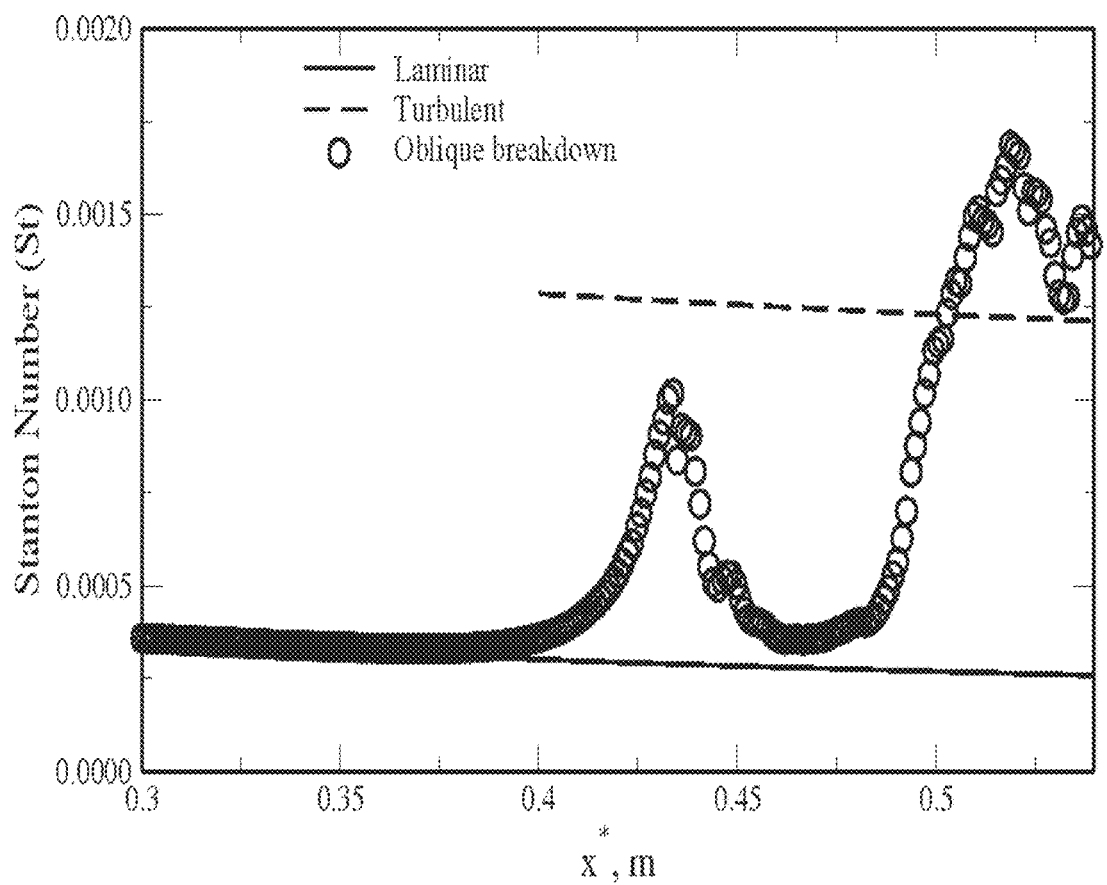

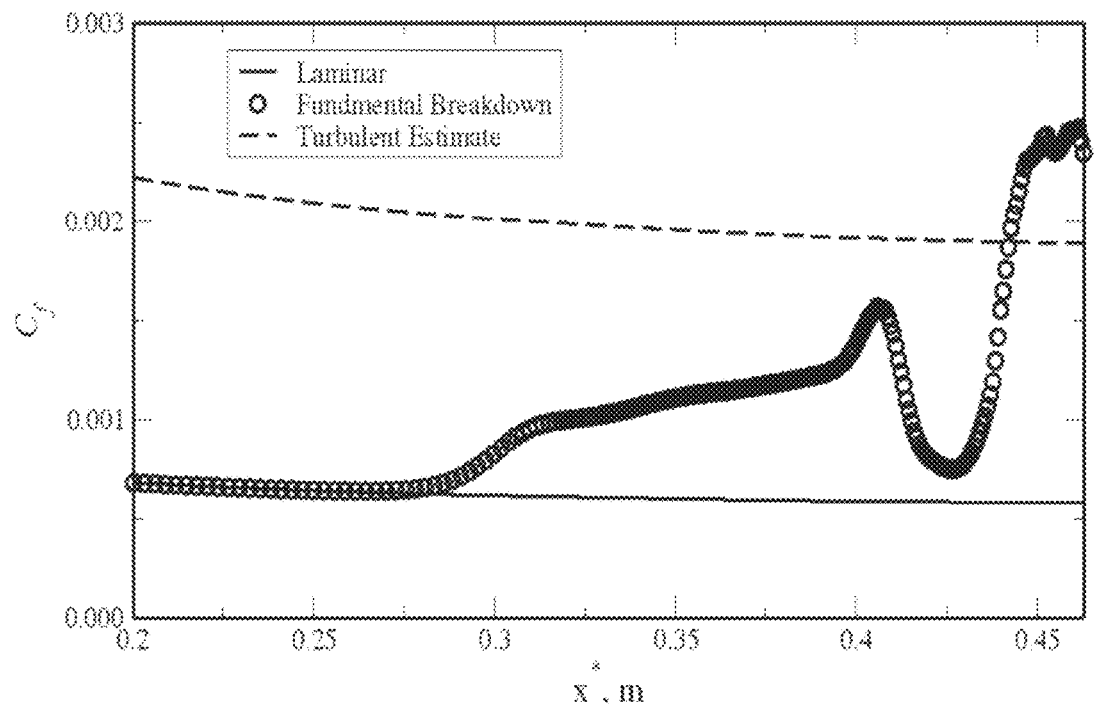
FIG. 17
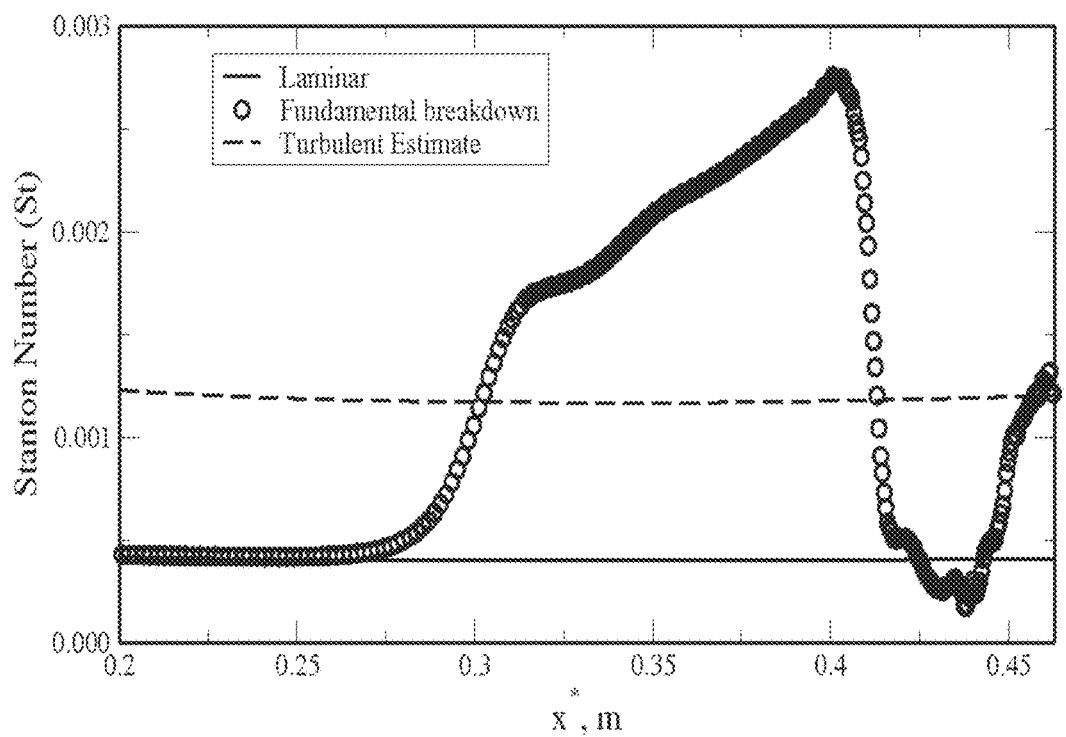

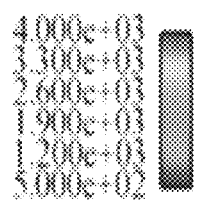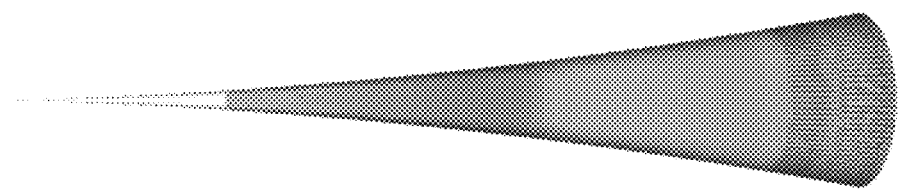
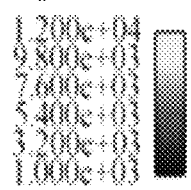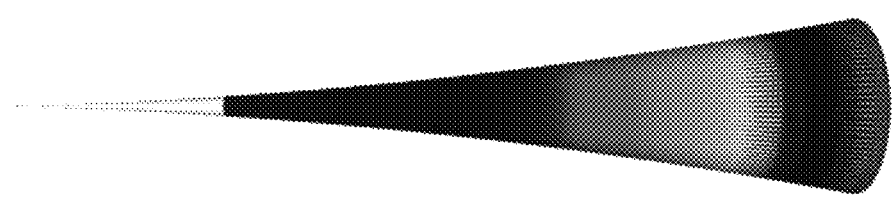
FIG. 18
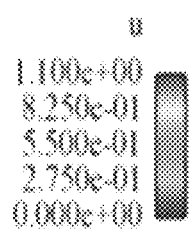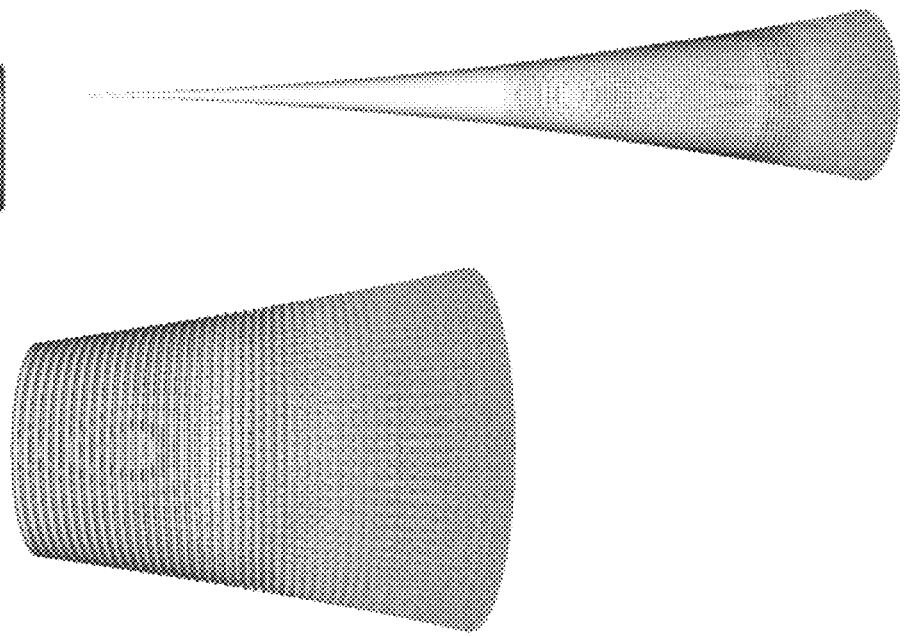
FIG. 19

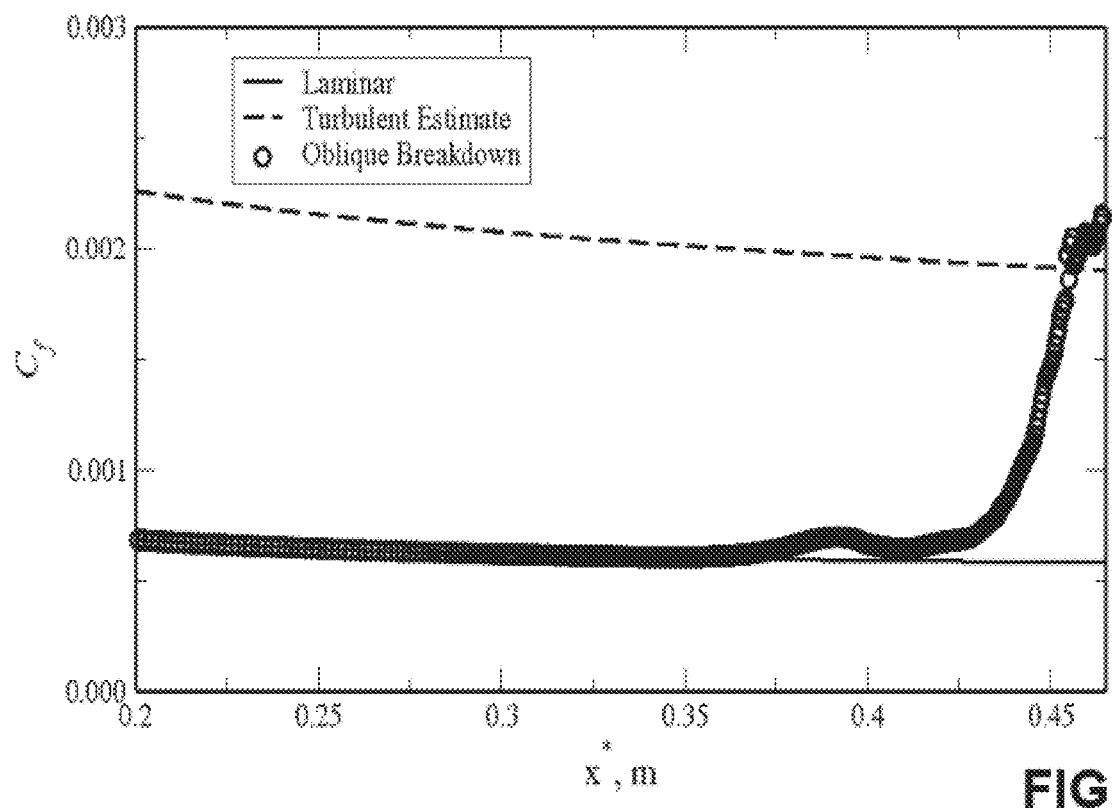
FIG. 21
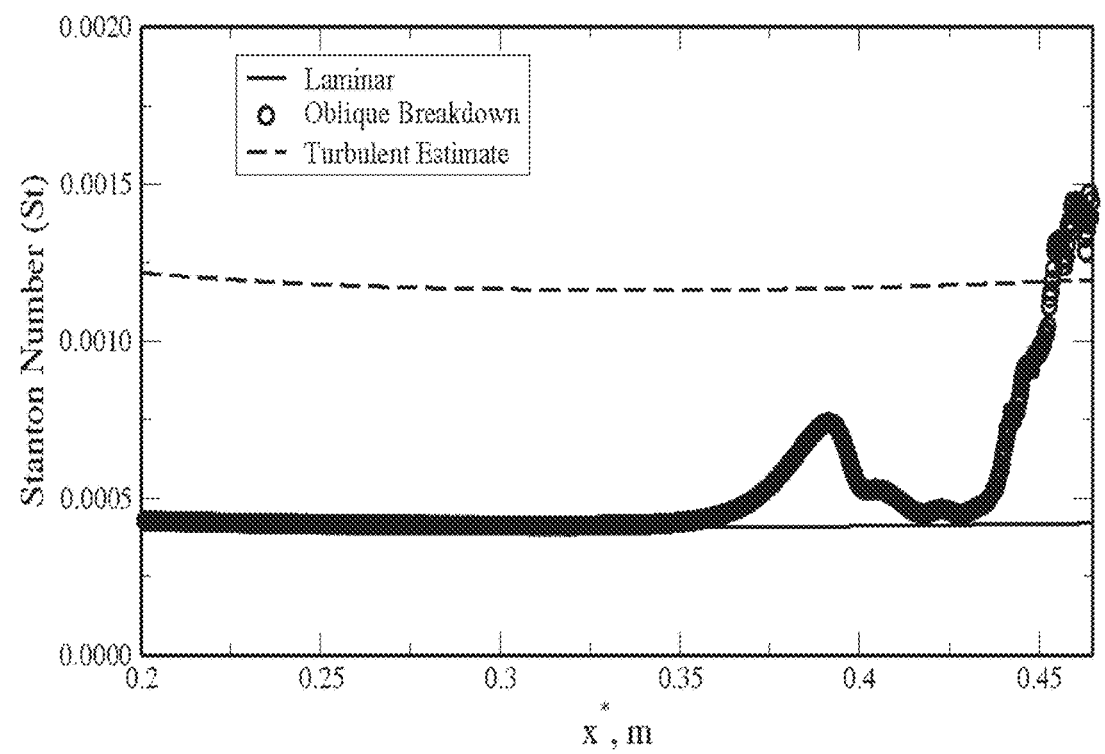

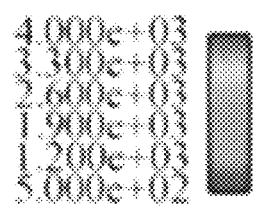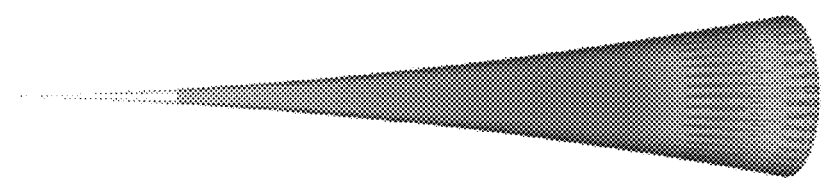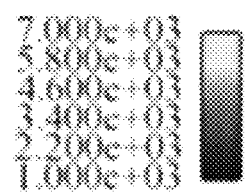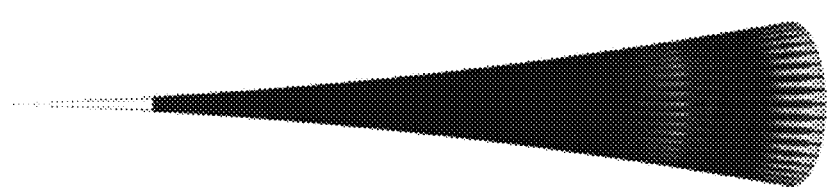
FIG. 22

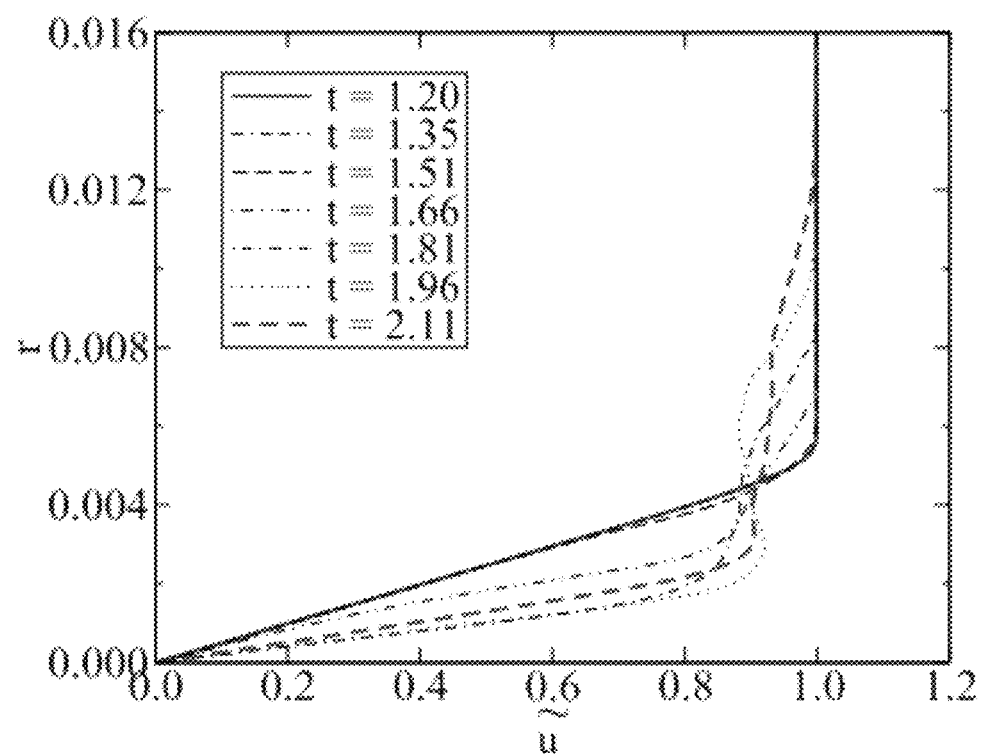
FIG. 29
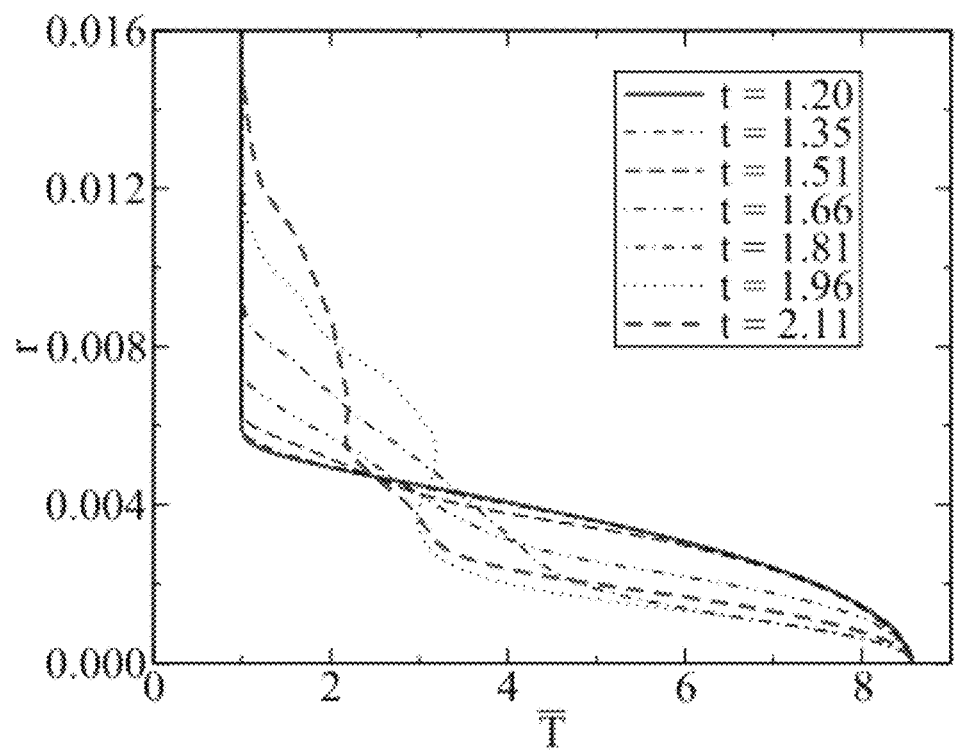

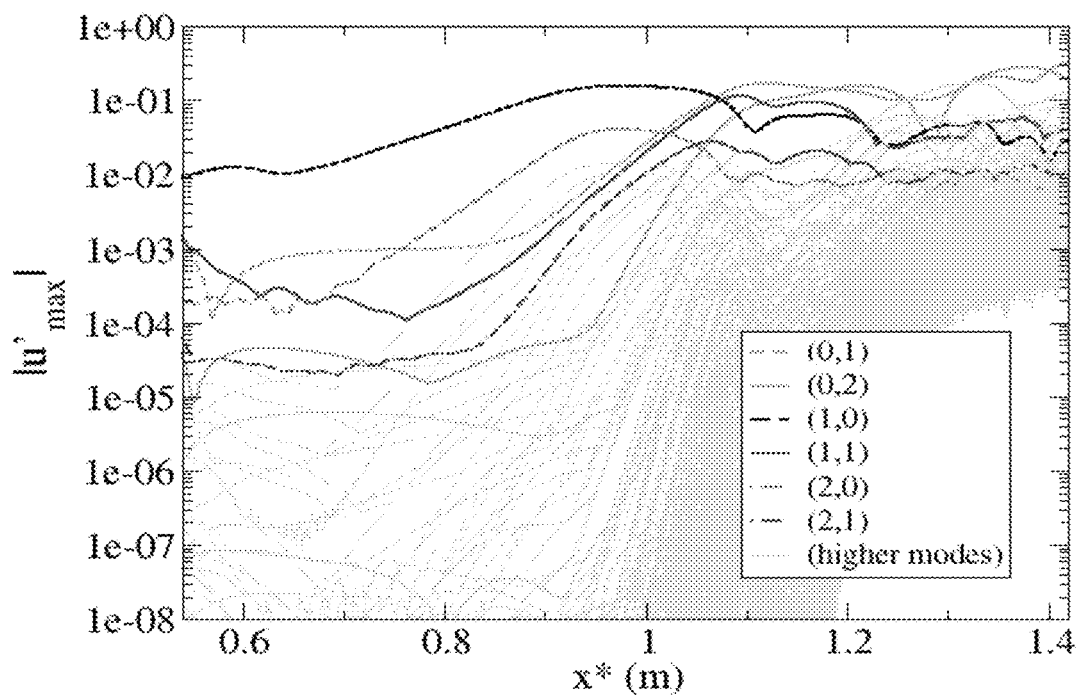
FIG. 31
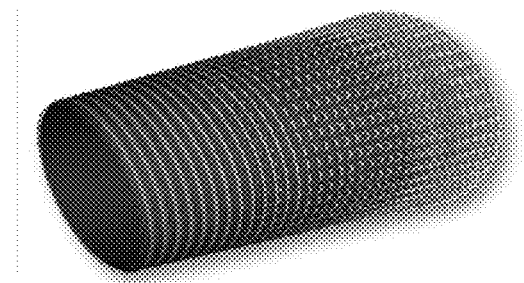
FIG. 32
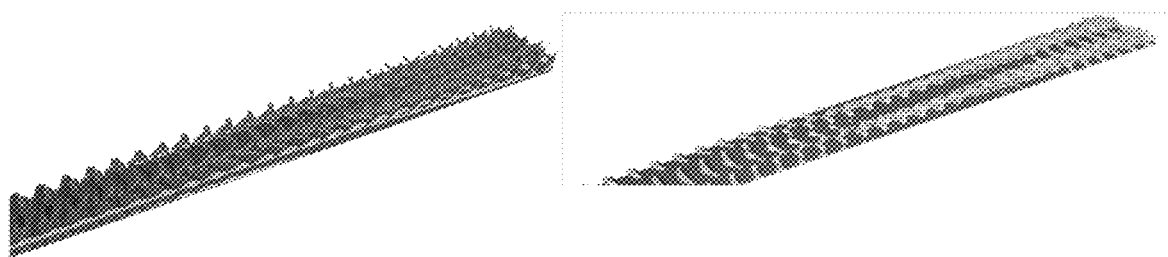
FIG. 33       FIG. 35

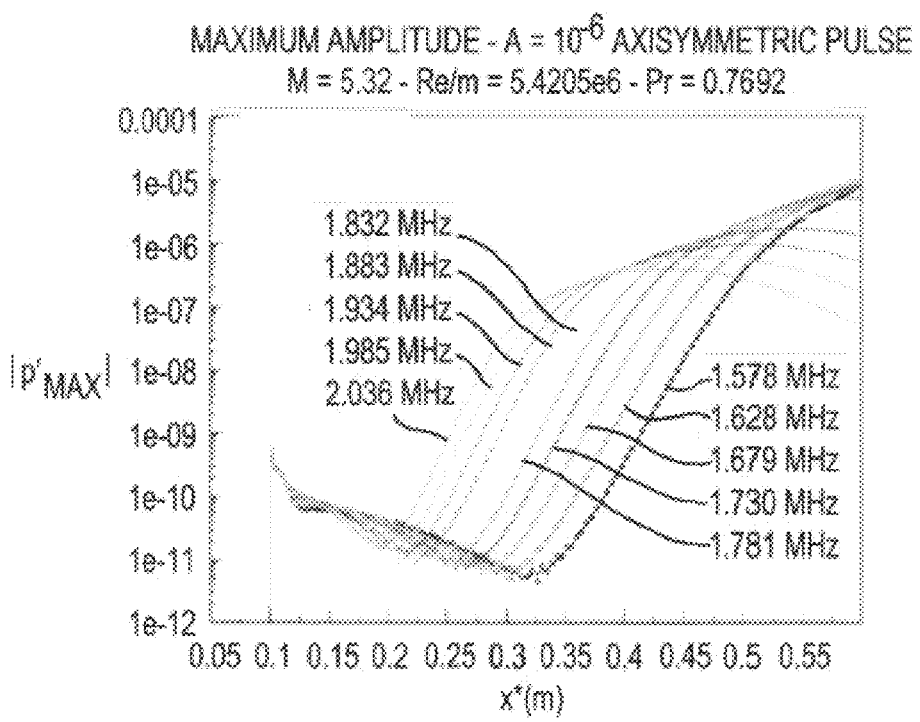
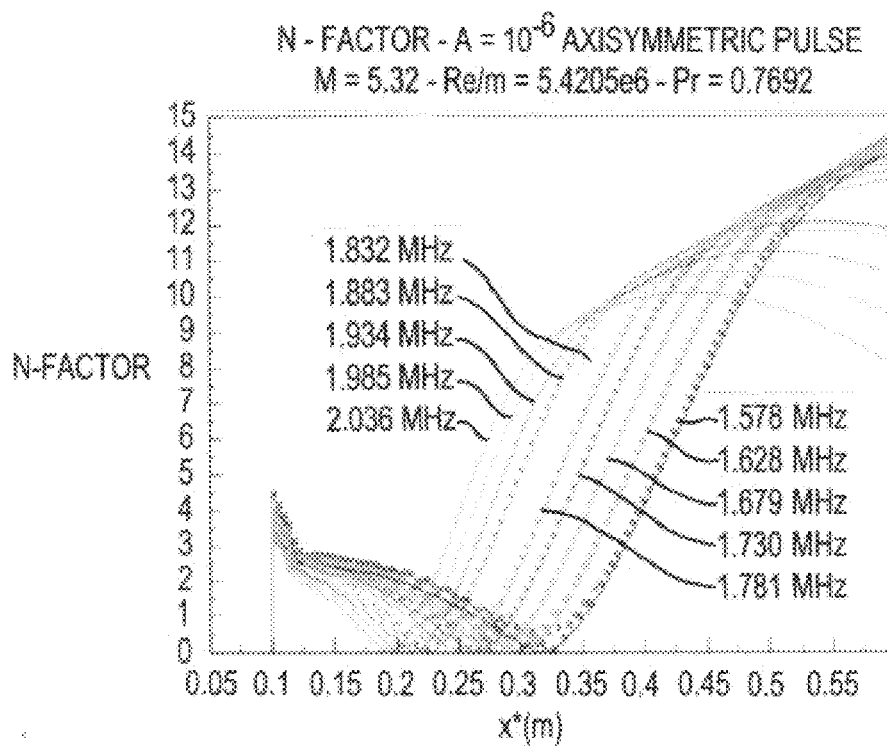
FIG. 36

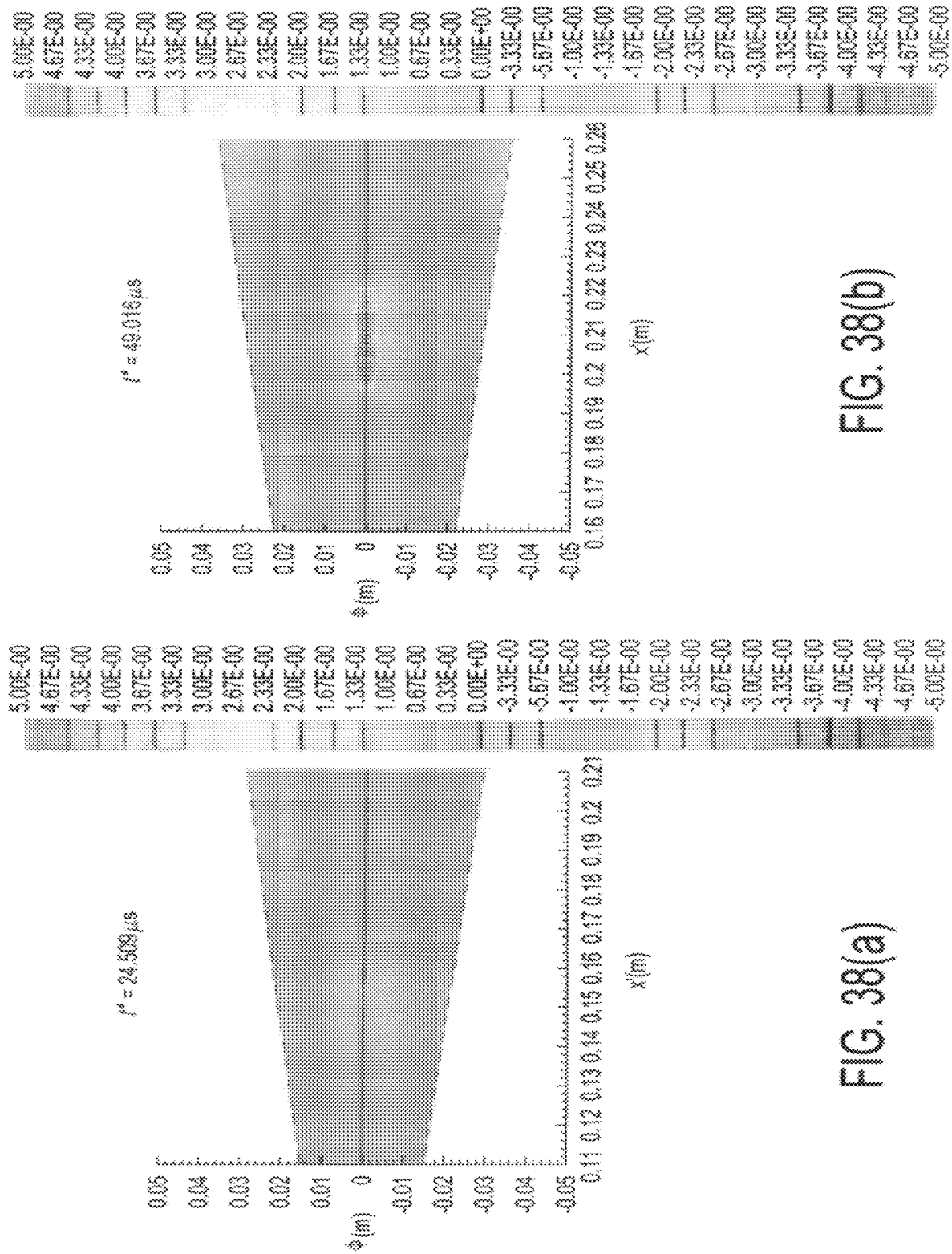

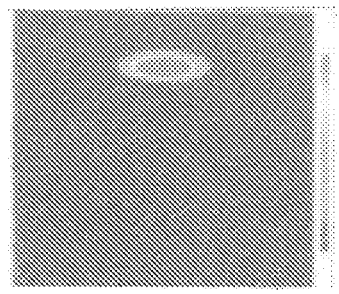 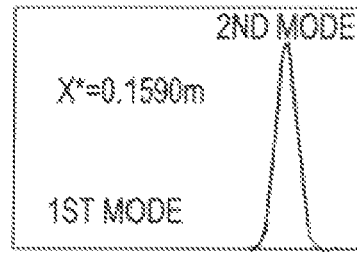
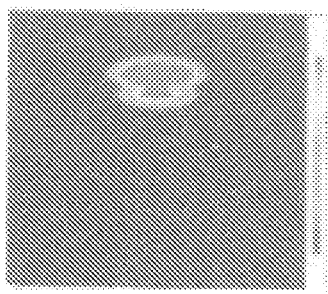 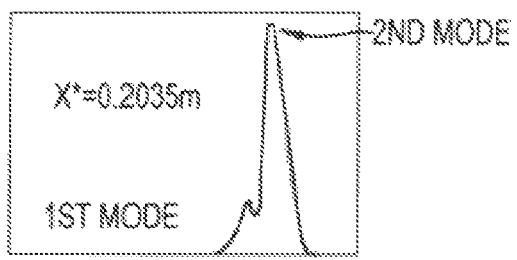
AS WAVES COMPONENTS SYNC WITH VORTICITY/ENTROPY
WAVE, UPSTREAM PEAK (i.e. HIGHER FREQUENCY/LOWER $c_\phi$)
LOSES IMPORTANCE
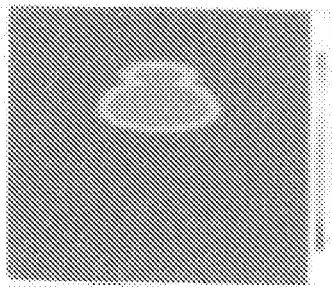 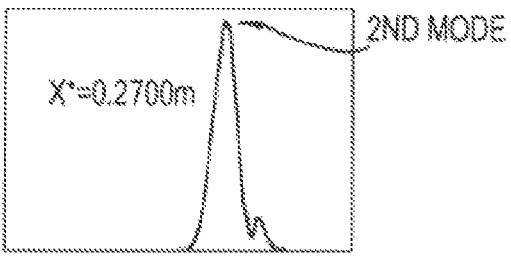
FIG. 39 (continued)

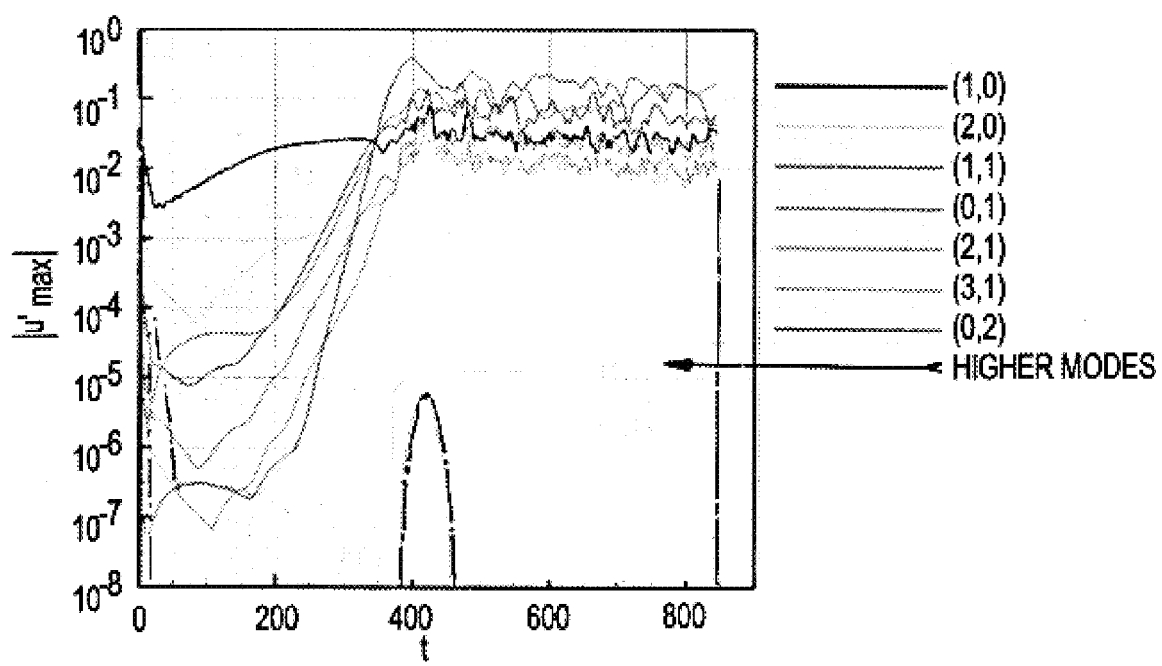
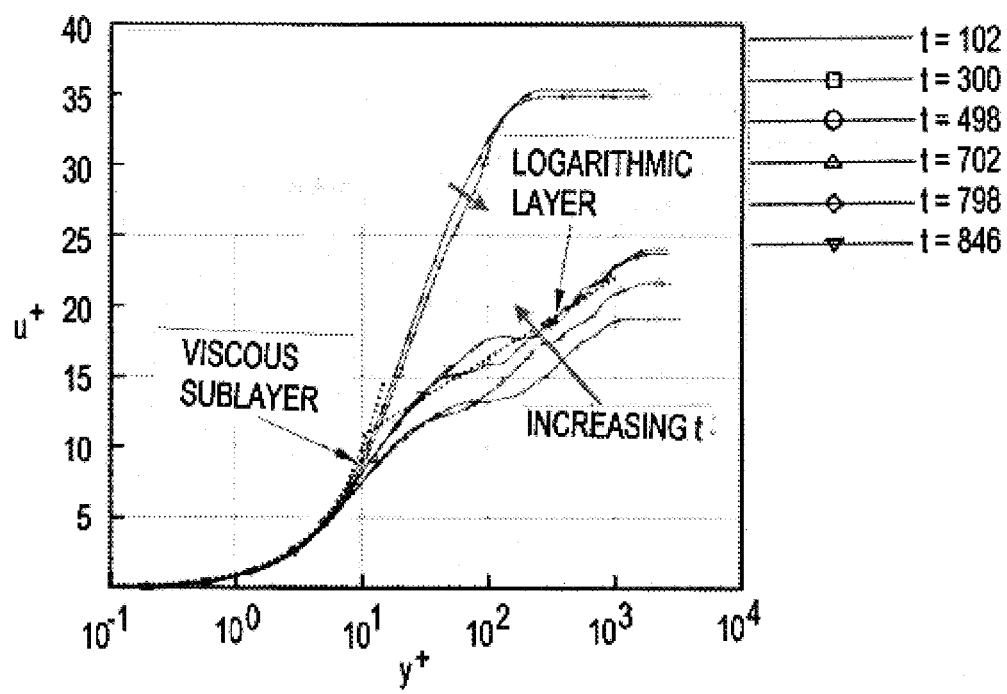
FIG. 55

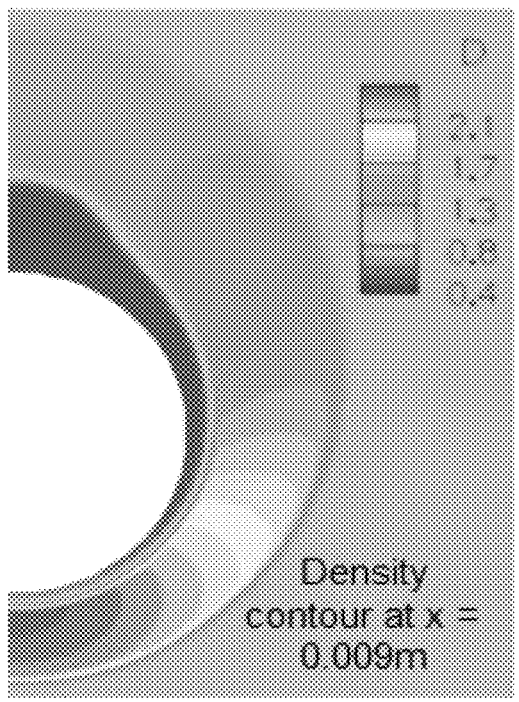 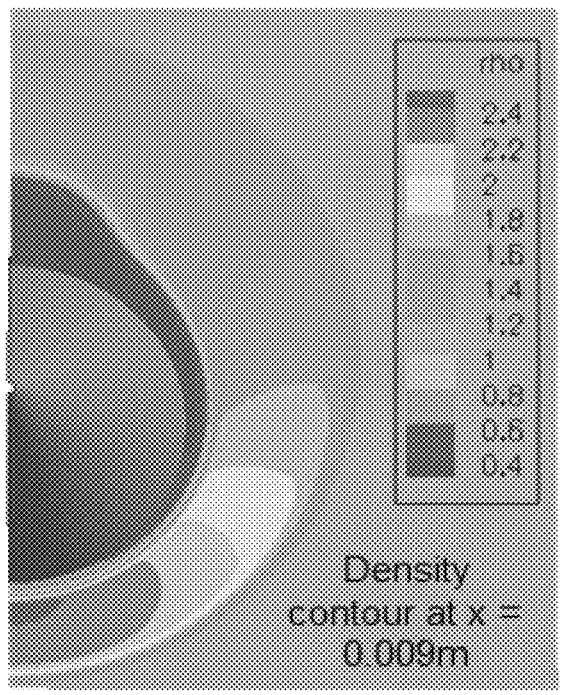
FIG. 60

FIG. 64A
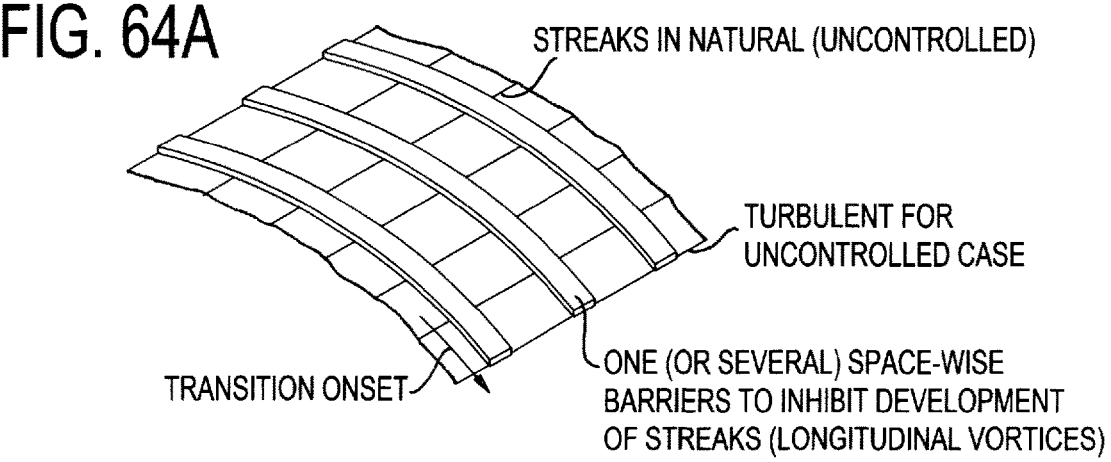
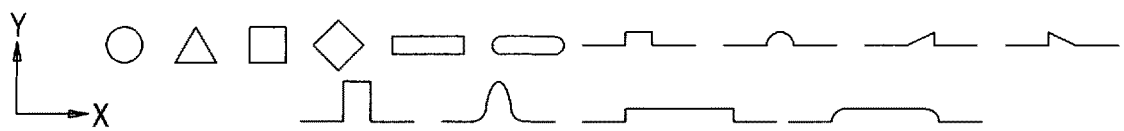
FIG. 64B
POSSIBLE SHAPES: SAME AS IN STRATEGY I
FOR USING ROUGHNESS (BUT NOW 2D)
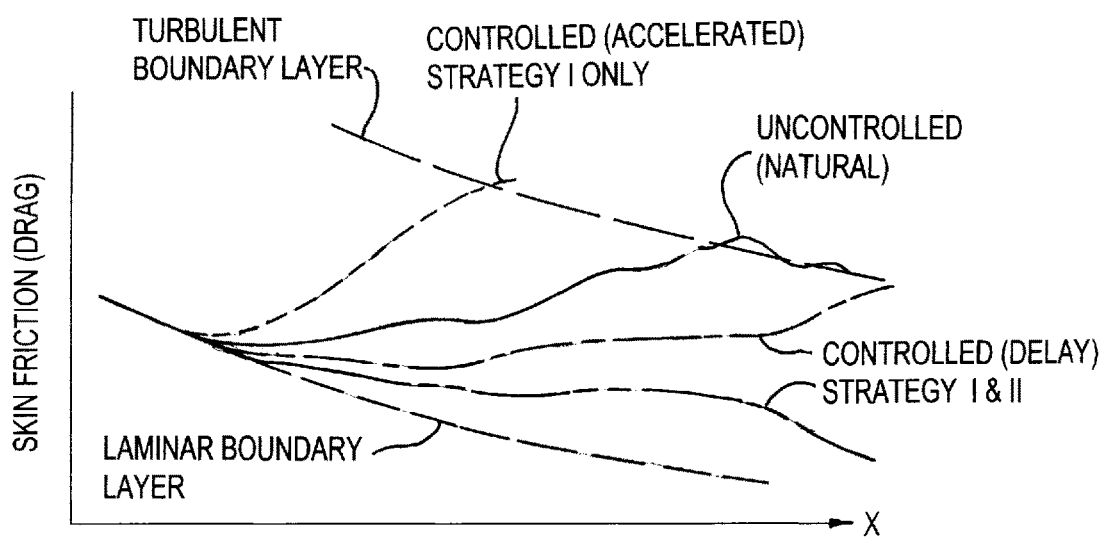
FIG. 65

CONTROL OF HYPERSONIC BOUNDARY LAYER TRANSITION

CROSS REFERENCE TO RELATED APPLICATION(S)

This application claims priority to U.S. provisional patent application No. 62/254,103, filed on Nov. 11, 2015, which is hereby incorporated herein by reference in its entirety.

GOVERNMENT SPONSORSHIP

This invention was made with government support under Grant No. FA9550-15-1-0265 awarded by USAF/AFOSR. The government has certain rights in the invention.

FIELD OF THE INVENTION

Embodiments are in the field of hypersonic boundary layer transition. More particularly, embodiments disclosed herein relate to systems and methods for controlling hypersonic boundary layer transition via various flow control techniques which, inter alia, foster enhanced aerodynamic performance, flight stability of hypersonic vehicles and reduce heat loads.

BACKGROUND OF THE INVENTION

Laminar-turbulent transition in hypersonic boundary layers is a major unresolved topic in Fluid Dynamics. Although significant progress has been made in recent years, crucial aspects of the transition physics are still in the dark. For the future High-Speed Civil Transport (HSCT), as well as for numerous defense-related applications such as high-speed missiles, high-speed reconnaissance aircraft, the Theater Missile Defense (TMD) interceptors, and the Hyper-X program, considerable progress toward the understanding of high-speed boundary layer transition is required in order to develop reliable transition prediction methods that can be used for the design and safe operation of such advanced flight vehicles. The crucial need for reliable transition prediction methods for high-speed applications is due to the fact that transition to turbulence in supersonic/hypersonic boundary layers is associated with considerable increases in heat transfer. The increased heat loads (caused by transition) on the structure of the flight vehicles represent the main difficulties in designing and operating high-speed vehicles. Appropriate measures to guard against the heat transfer due to aero-thermal loads are expensive and/or result in significant weight penalties. Good estimates of the transition location are of vital importance because only then can the aero-thermal loads and surface temperatures be adequately predicted. In addition to surface heating, transition to turbulence also has a significant effect on the aerodynamic performance of high-speed flight vehicles, as the skin friction for turbulent boundary layers is considerably higher than for the laminar boundary layer.

The understanding of transition for low-speed (incompressible) boundary layers is far ahead of that for high-speed (compressible) boundary layers, although many crucial aspects are also still not understood even for the low-speed case. There are several important reasons for the significant gap in understanding of high-speed transition relative to low-speed transition. Of course, historically, high-speed flight, in particular hypersonic flight, has not been considered until recently and therefore the need to understand and predict transition did not exist earlier. However, there are two other main reasons why it is more difficult to obtain knowledge for high-speed boundary layer transition than for the low-speed case: i) Quality experiments for high-speed transition are considerably more difficult to carry out than for incompressible transition and require high-speed testing facilities that are expensive to construct and expensive to operate. ii) The physics of high-speed boundary layer transition are much more complex than for low speeds.

From linear stability theory, it is known that multiple instability modes exist for high-speed boundary layer flows, in contrast to only one mode (Tollmien-Schlichting, TS) for the incompressible case. The so-called first mode in supersonic boundary layers is equivalent to the TS-mode in incompressible boundary layers. However, in contrast to incompressible boundary layers, where, according to Squire's theorem, two-dimensional waves are generally more amplified than three-dimensional waves, for supersonic boundary layers three-dimensional (oblique) waves are more amplified than two-dimensional ones. Thus, experiments and theory always have to address the more complex problem of three-dimensional wave propagation. In addition to the first mode, which is viscous, higher modes exist for supersonic boundary layers that result from an inviscid instability mechanism. According to Linear Stability Theory (LST), the most unstable higher modes are two-dimensional unlike oblique first modes. Also from linear stability theory, it is known that the first mode is dominant (higher amplification rates) for low supersonic Mach numbers while for Mach numbers above 4 the second mode is dominant (most amplified). In addition, for typical supersonic/hypersonic flight vehicle configurations, the three-dimensional nature of the boundary layers that develop, for example, on swept wings and/or lifting bodies, can give rise to so-called cross-flow instabilities and, as a consequence, cross-flow vortices that can be stationary or traveling. Due to the difficulties in carrying out experiments (and "controlled" experiments, in particular) and due to the existence of multiple instability modes, the role and importance of the various instability modes in a realistic transition process are not understood at all. Of course, when amplitudes of the various instability modes reach high enough levels, nonlinear interactions of these modes can occur. As a consequence, the transition process in high-speed boundary layers is highly non-unique (our simulations support this conjecture, see Section 3, below), which means that slight changes in the environment or vehicle geometry may significantly alter the transition process.

An additional difficulty arises from the fact that for high-speed boundary layers the transition processes in free flight may be very different from those in the laboratory. The difference between conditions for free flight ("hot," atmospheric conditions) and the laboratory ("cold" conditions) has a considerable effect on the stability behavior and, as a consequence, on the transition processes. This is best summarized by the following quote from a pioneer in experimental high-speed transition research: " . . . one should not expect a transition Reynolds number obtained in any wind tunnel, conventional or quiet, to be directly relatable to flight." Furthermore, there are still crucial unresolved issues in the understanding of hypersonic transition (e.g. roughness, nose radius, approach flow conditions, etc.) that hamper the progress needed for the development of hypersonic flight vehicles. These topics are investigated below.

These facts clearly indicate already the critical need of investigating high-speed boundary-layer transition. The numerical simulation codes can be tested and validated by detailed comparison with laboratory experiments. Thereafter, they can be applied with more confidence to predict the effects of various conditions on the transition processes and the resulting aerodynamic and aero-thermodynamic behavior. Thus, simulations can provide the crucial understanding and information necessary for design and safe operation of high-speed vehicles.

Thus, it is desirable to provide a system and method for controlling hypersonic boundary layer transition for a hypersonic flight vehicle that are able to overcome the above disadvantages.

Advantages of the present invention will become more fully apparent from the detailed description of the invention hereinbelow.

SUMMARY OF THE INVENTION

Embodiments are directed to novel techniques for controlling (delaying or accelerating) laminar-turbulent transition in hypersonic boundary layers. From basic research of the fundamental physics of laminar-turbulent transition in hypersonic (flow speeds higher than Mach 4.0) boundary layers, we discovered that the nonlinear transition regime is considerably extended in the downstream direction compared to the low-speed case. In this long nonlinear transition region, stream-wise flow structures (i.e., streaks) arise that cause locally very high skin friction and heat transfer values that are even higher than the corresponding (averaged) turbulent values. This strongly affects the aerodynamic performance and flight stability of hypersonic vehicles, and will lead to locally very high heat loads, which may jeopardize the structural integrity of the flight vehicle.

The novel techniques influence the nonlinear phase of transition so that transition is delayed (or accelerated if advantageous for certain flight envelopes or applications). The flow techniques proposed are either passive (by local geometric tailoring of the vehicle surface, tailoring of the thermal properties of the vehicle surface skin, use of locally porous surface elements, use of two- or three-dimensional roughness elements, etc.) or active (localized blowing/suction, localized heating/cooling of the vehicle surface). These techniques all have in common the fact that they are tailored such that the nonlinear stages of transition are profoundly altered compared to the uncontrolled case. For example, delaying transition would result in significant drag reduction, and consequently an increase in range of the flight vehicle, and also a reduction of the weight penalty due to the Thermal Protection Systems (TPS) as less protective material would be required, thus allowing an increased payload and/or range of the flight vehicle.

Additional embodiments and additional features of embodiments for the system and method for controlling hypersonic boundary layer transition for a hypersonic flight vehicle are described below and are hereby incorporated into this section.

BRIEF DESCRIPTION OF THE DRAWINGS

The foregoing summary, as well as the following detailed description, will be better understood when read in conjunction with the appended drawings. For the purpose of illustration only, there is shown in the drawings certain embodiments. It's understood, however, that the inventive concepts disclosed herein are not limited to the precise arrangements and instrumentalities shown in the figures. The detailed description will refer to the following drawings in which like numerals, where present, refer to like items.

FIGS. 1-65 illustrate various concepts relating to systems and methods for controlling laminar-to-turbulent transition in hypersonic boundary layers.

FIG. 13 is a diagram showing time and azimuthal averaged skin friction coefficient and Stanton number from the oblique breakdown simulation. The initial rise in skin friction is caused by the large amplitude primary wave. This is followed by a dip caused by the nonlinear saturation of the primary wave. Then a steeper rise in skin friction occurs when all higher modes experience nonlinear growth. However, the initial rise is not as pronounced as in the case of fundamental breakdown. Straight cone at M=6, Re=11 E6 m$^{-1}$.

FIG. 17 is a diagram showing time and azimuthal averaged skin friction coefficient and Stanton number from the fundamental breakdown simulation. Flared cone at M=6, Re=10E6 m$^{-1}$.

FIG. 18 is a diagram showing time averaged (a) skin friction (du/dy at wall) and (b) wall-normal temperature gradient (dT/dy) at the wall obtained from the fundamental breakdown simulation. Flared cone at M=6, Re=10E6 m$^{-1}$. The streamwise arranged "hot-cold-hot" streaks look qualitatively similar to the streamwise streaks observed in the Purdue experiments using temperature sensitive paint.

FIG. 19 is a diagram showing visualization of flow structures by isosurface of Q criterion from the fundamental breakdown simulation. The isosurface is colored using the streamwise velocity magnitude. Flared cone at M=6, Re=10E6 m$^{-1}$.

FIG. 21 is a diagram showing time and azimuthal averaged skin friction coefficient and Stanton number from the oblique breakdown simulation. Flared cone at M=6, Re=10E6 m$^{-1}$.

FIG. 22 is a diagram showing time averaged (a) skin friction (du/dy at wall) and (b) wall-normal temperature gradient (dT/dy) at the wall obtained from the oblique breakdown simulation. Flared cone at M=6, Re=10E6 m$^{-1}$. The streamwise arranged "hot-cold-hot" streaks look qualitatively similar to the streamwise streaks observed in the Purdue experiments using temperature sensitive paint.

FIG. 27A-D is a diagram showing (a) Temporal growth rate of secondary disturbance mode for t=0.7 (before resonance) and t=1.4 (after resonance). A(1,0)=10$^{-4}$, A(1,1)=10$^{-6}$ (left). (b) Fundamental Breakdown: Temporal development of the maximum disturbance velocity in streamwise direction |u'|(h,k) for $k_c$=50. A(1,0)=10$^{-4}$, A(1,1)=10$^{-4}$ (right). $R_x$=2024, M=7.95, T=53.35K, Re=3,333,333.

FIG. 29 is a diagram showing oblique breakdown: Temporal evolution of Favre-averaged profiles (left) u-velocity (right) temperature. A(1,1)=10$^{-4}$, $R_x$=2024, M=7.95, T=53.35K, Re=3,333,333.

FIG. 31 is a diagram showing (a) Fundamental Resonance: Secondary wave (mode 1,1) growth rate after resonance for different azimuthal mode numbers. (b) Fundamental Breakdown: Streamwise development of u-velocity disturbance amplitudes. A(1,0)=4*10$^{-2}$, A(1,1)=1*10$^{-2}$. Sharp cone, M=7.95, T=53.35K, Re=3,333,333.

FIG. 32 is a diagram showing fundamental breakdown: Instantaneous snapshot of isosurfaces of Q=500 colored with azimuthal vorticity shown on the full cone. Sharp cone, M=7.95, T=53.35K, Re=3,333,333.

FIG. 33 is a diagram showing fundamental breakdown: Isosurfaces of Q=500 with contours of azimuthal vorticity in the symmetry plane. Two-dimensional disturbances become modulated in spanwise direction leading to the formation of lambda-vortex structures and the eventually breakup into smaller scales. Sharp cone, M=7.95, T=53.35K, Re=3,333,333.

FIG. 35 is a diagram showing an oblique breakdown: Flow structures identified with iso-surfaces of Q=500. $k_c=20$, $A(1,1)=2*10^{-2}$. Sharp cone, M=7.95, T=53.35K, Re 3,333,333.

FIG. 36 is a diagram showing amplitude development of the disturbance pressure at the wall versus downstream direction for a 5 degree half angle cone at Caltech T5 conditions. Comparison between linearized Navier-Stokes solver results and DNS results. Lines are from linearized Navier-Stokes solver and symbols are from DNS.

FIG. 38A-F is a diagram showing snapshots of a linear wave packet illustrating its development in downstream direction. Shown are contours of wall-pressure disturbance on the unrolled cone surface. 5 degree straight cone at Caltech T5 conditions.

FIG. 55 is a diagram showing (a) Mode evolution of maximum streamwise velocity disturbance and (b) Van Driest transformed velocity profiles at various time instances for fundamental resonance case with $\Psi=45°$, $n_p=8$, d=0.30 and $\varphi=0.25$.

FIG. 60 is a diagram showing qualitative agreement of basic flows between Fasel and coworkers (not yet published) high-order DNS and Balakumar and Owens (2010) for a Straight cone at AOA=6 deg.

FIG. 64A is a diagram showing an exemplary placement of two-dimensional (spanwise non-varying) barriers that inhibit the three-dimensional instability development and as a consequence, the streak development.

FIG. 64B is a diagram showing exemplary spanwise constant (two-dimensional) possible barrier shapes with no variation of geometry in the z-direction.

FIG. 65 is a diagram showing an exemplary schematic showing the effect of transition control with Strategies I and II, mentioned below.

DETAILED DESCRIPTION OF THE INVENTION

Figure 1A:
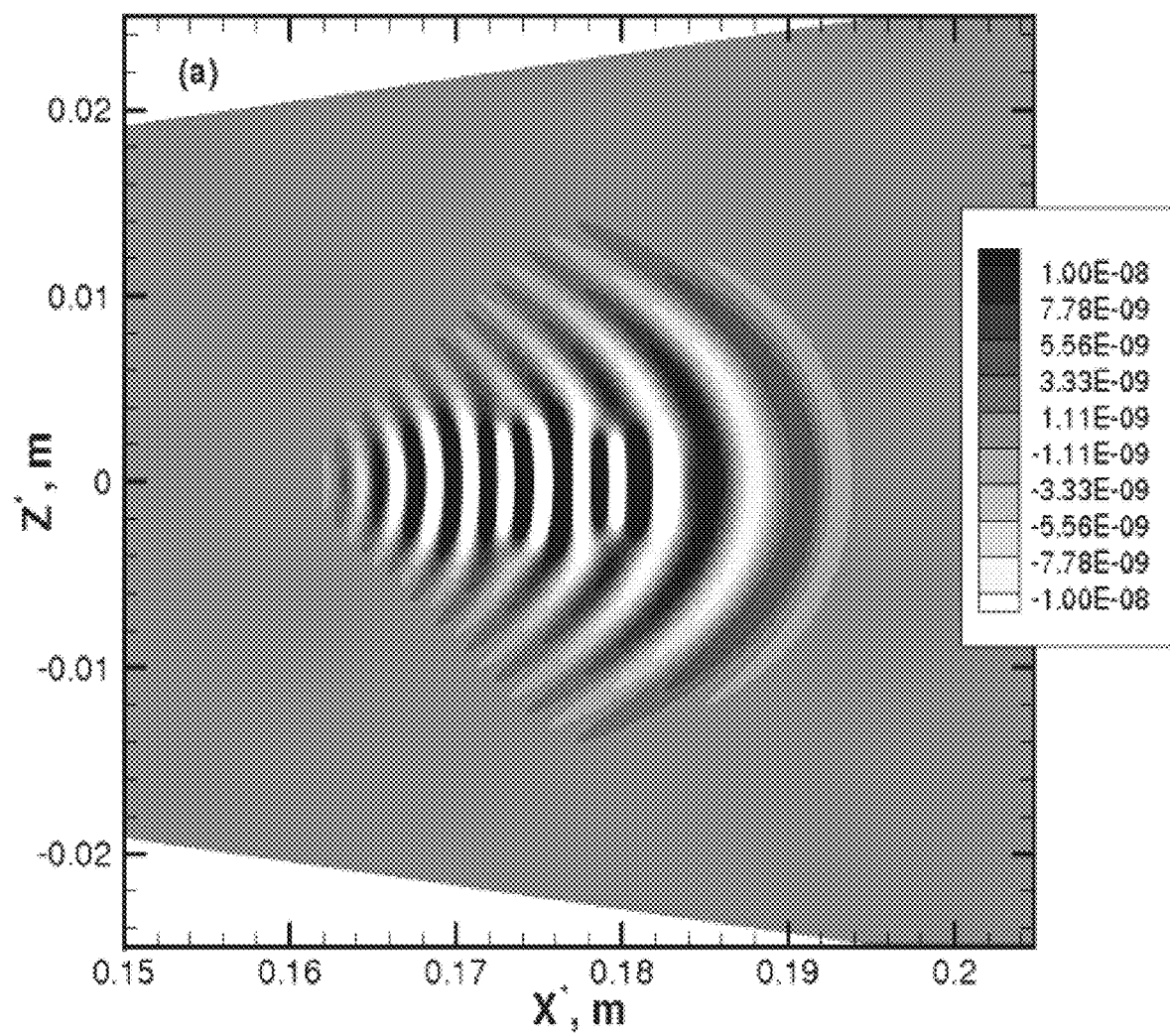
FIG. 1A-D is a diagram showing snapshots of a linear wave packet illustrating it development in downstream direction. M=6, Re=11 E6 $m^{-1}$. Shown are contours of wall-pressure disturbance on the unrolled cone surface at (a) f=0.056 ms (b) t*=0.171 ms, (c) t*=0.285 ms and (d) t*=0.400 ms.

It is to be understood that the figures and descriptions of the present invention may have been simplified to illustrate elements that are relevant for a clear understanding of the present invention, while eliminating, for purposes of clarity, other elements found in a typical hypersonic vehicle or typical method of using/operating a hypersonic vehicle. Those of ordinary skill in the art will recognize that other elements may be desirable and/or required in order to implement the present invention. However, because such elements are well known in the art, and because they do not facilitate a better understanding of the present invention, a discussion of such elements is not provided herein. It is also to be understood that the drawings included herewith only provide diagrammatic representations of the presently preferred structures of the present invention and that structures falling within the scope of the present invention may include structures different than those shown in the drawings. Reference will now be made to the drawings wherein like structures are provided with like reference designations.

For purposes of this disclosure, the terms "high-speed" and "hypersonic" refer to velocity(ies) above Mach 4.0.

1. Introduction

Since compressibility effects considerably extend the nonlinear transition regime in the downstream direction (compared to incompressible boundary layers), the nonlinear transitional flow can cover very large downstream extent of actual hypersonic flight vehicles (such as Hypersonic Glide Vehicles (HGVs)). Our previous research has shown that nonlinear interactions can lead to streamwise streaks that result in locally very high skin friction and heat loads (far exceeding turbulent values), and thus can negatively affect the aerodynamic performance and compromise the structural integrity of flight vehicles. The main objective of the proposed research is the understanding of the fundamental physics of the nonlinear stages in hypersonic boundary layer transition. Based on this understanding, we will then explore flow control strategies with the goal of modifying or delaying the nonlinear transition process.

2. Investigations and Simulations 2.1 Theoretical Investigations

There is a large number of scientific publications available on transition research, with the majority of them focusing on low-speed transition. More recent investigations of transition, both high- and low-speed, were presented at the IUTAM Symposium on Laminar Turbulent Transition (Fasel and Saric 2000, Schlatter and Henningson 2009). Some of the most important aspects of high-speed transition that are relevant to the proposed research are discussed below.

Presently, the main body of knowledge on high-speed transition is still based on Linear Stability Theory (LST) by L. Mack (1969, 1975, 1984, 2000). According to the findings by Mack, the linear stability behavior of compressible (supersonic/hypersonic) boundary layers differs from the incompressible case in several significant aspects:

i. More than one instability mode exists for M>2.2: the first mode and the second and higher (multiple) modes.

ii. The first-mode disturbances are viscous (vortical) and are similar to the Tollmien-Schlichting (TS) modes of incompressible boundary layers. First-mode disturbances dominate (largest amplification rates) at low supersonic Mach numbers. However, in contrast to the incompressible case, the most amplified first-mode disturbances are three-dimensional (oblique)—and not two-dimensional.

iii. The second and higher modes are inviscid (acoustic) and dominate at Mach numbers higher than about 4, where the most unstable second-modes are always two-dimensional (in contrast to the first mode).

iv. In addition to the inviscid (acoustic) higher modes, Mack identified additional viscous modes ("viscous multiple solutions") which, to date, have not been identified in experiments. However, they were also found in the Direct Numerical Simulations of Eissler and Bestek (1996).

v. First-mode disturbances can be attenuated (as for the incompressible case in air) by wall cooling, wall suction, and favorable pressure gradients (Malik 1989).

vi. The second and higher inviscid modes can be stabilized by favorable pressure gradients, suction and porous coating; however, they are destabilized by wall cooling.

For a linear stability analysis, the effects of the growing boundary layer on the disturbance growth are typically neglected ("parallel theory"). However, nonparallel effects can be included by using the Parabolized Stability Equations (PSE) approach (Bertolotti 1991, Bertolotti et al. 1992, Chang and Malik 1993, Pruett and Chang 1993, Herbert et al. 1993, Herbert 1994). Depending on various parameters (Mach number, Reynolds number, frequency, etc.), nonparallel effects can significantly influence the disturbance growth rates. LST and linear PSE are only applicable for the first (linear) stage of the transition process where disturbance amplitudes are small and nonlinear interactions are negligible. Nonlinear PSE, on the other hand, is applicable to the nonlinear stages of transition (Bertolotti et al. 1992, Herbert 1994), although the computational effort increases tremendously when the development becomes strongly nonlinear as in the later stages of transition. In recent years, the PSE approach has also been applied to convectively unstable 3D basic flow configurations. For example, Mughal (2006) performed PSE analysis for complex wing geometries; Johnson and Candler (2005, 2006) performed PSE analysis of hypersonic boundary layers with chemical reaction; De Tullio et al. (2013) studied the effect of discrete roughness elements on boundary layer stability using PSE and recently, Perez and Reed (2012, 2013) performed PSE calculations for circular cones at Mach 6 and at zero and non-zero angle of attack. More recently, Fasel and co-workers (see Salemi et al. 2014a, b) used PSE to investigate the stability of a high-enthalpy hypersonic boundary layer on a 5 degree sharp cone (Caltech T5 conditions). They compared PSE results with DNS and linearized Navier-Stokes calculations and found very good agreement between the three methods.

As mentioned by Chang et al. (1991), the PSE cannot be applied for cases with global or absolute instabilities. This results from the fact that the "parabolization" suppresses the eigenvalue responsible for the propagation of information upstream (Schmid & Henningson, 2000). Also due to the "parabolized" character of the PSE system of equations (Schmid & Henningson, 2000), the method cannot be applied to separated flows. As an alternative to fill the gap in between the PSE and the computationally intensive DNS, Fasel and co-workers (see Salemi and Fasel 2013, Salemi et al., 2014a, b, 2015) proposed to use the linearized compressible Navier-Stokes equations in a disturbance formulation. This method is able to handle flows that PSE cannot, such as flows that possess global and/or absolute instabilities (for example, wakes, laminar separation bubbles etc.), in addition the method is less expensive than DNS. The method also works in the presence of discontinuities and upstream wave propagation. Since it is cast in disturbance formulation, the nonlinear interactions can be added if desired. Recently, there have also been advances in the development of bi-global instability methods (i.e. two-dimensional global linear eigenvalue problems, Theofilis 2011) with application to hypersonic boundary layer flow problems, like the HIFiRE-5 elliptic cone (see for example, Paredes and Theofilis 2013, 2014).

Analogous to incompressible boundary layer transition, several attempts have been made to apply secondary instability theory to model the initial three-dimensional nonlinear development (see, for example, Masad and Nayfeh 1990, El-Hady 1991, 1992, and Ng and Erlebacher 1992). However, whether or not any of these secondary instability mechanisms are relevant for supersonic/hypersonic transition is still an open question because it is very difficult to unequivocally identify them in experiments (see § 2.2).

Theoretical work by Seddougui and Bassom (1997) who investigated the linear stability behavior of flow over cones following the triple-deck-formulation revealed the importance of the shock location relative to the cone radius. However, they only considered viscous modes and conceded that inviscid instabilities might alter their findings. Seddougui and Bassom (1997) revealed that with increasing radius, i.e. moving in downstream direction, first-mode waves are more amplified than higher-mode waves—a phenomenon already observed by Stetson et al. (1983) in their experiments. Additionally, Seddougui and Bassom (1997) stated that with the shock moving away from the cone surface, amplification rates generally drop and axisymmetric waves become more unstable than oblique waves.

Tumin (2007) investigated the three-dimensional spatially growing disturbance waves in a compressible boundary layer within the scope of the linearized Navier-Stokes equations. He solved the Cauchy problem under the assumption of a finite growth rate of the disturbances and demonstrated that the solution could be presented as an expansion into a biorthogonal eigenfunction system. This result can be applied to decompose flow fields obtained by numerical simulations when pressure, temperature, and all the velocity components, together with some of their derivatives, are available (Gaydos and Tumin 2004). Using this technique, Tumin et al. (2007, 2010) compared filtered amplitudes of the two discrete normal modes (the slow mode S and the fast mode F) and the fast acoustic spectrum with the solution of a linear receptivity problem obtained by direct numerical simulation. This example illustrates how the multimode decomposition technique may serve as a powerful tool for gaining insight into results obtained by numerical simulations.

For vehicles with sharp leading edges in the hypersonic Mach number range, high frequency disturbances are the dominant instability. Malmuth et al. (1998) stated that the most unstable modes in this Mach number regime belong to the family of "trapped" acoustic waves ("trapped" between the wall and the sonic line). Experiments by Stetson et al. (1983) showed that the frequency of the most amplified waves on a sharp cone at Mach 8.0 was in the ultrasonic frequency range. These findings inspired Malmuth et al. (1998) to propose a passive flow control method based on the idea that an appropriately tuned ultrasonic absorptive coating (UAC) would damp the most unstable acoustic modes. This idea was confirmed in a theoretical investigation by Fedorov et al. (2001), who modeled the effects of porous walls by using properly derived boundary conditions. Extensive theoretical studies on the possible detrimental effects of improperly tuned porous coatings on boundary layer stability were performed by Stephen and Michael (2011, 2013).

2.2 Experimental Investigations

Conducting transition experiments in high-speed flows is extremely difficult and very expensive. Therefore, relatively few successful experimental efforts have been reported in the open literature. Most experiments have focused on the linear regime and the early stages of the transition process. Some examples are the experiments by Laufer and Vrebalovich (1960), Kendall (1975), Stetson et al. (1983, 1984, 1988), Kosinov et al. (1990), Stetson and Kimmel (1992a), Schneider et al. (1996), Horvath (2002), Schneider and Juliano (2007), and Casper et al. (2009). An overview of the experimental efforts on conical geometries up to 2000 is given by Schneider (2001a). The experiments essentially verified some important parts of linear theory. However, quantitative differences often occur that may be explained by the fact that in the experiments the transition process was "natural," i.e., it was initiated by the environmental disturbances, and not by "controlled" disturbance input (analogous to a vibrating ribbon as in incompressible transition experiments). Also, quantitative differences between experimental measurements and LST may be caused by the fact that the nonparallel effects of the growing boundary layer are neglected in the linear stability analysis ("parallel theory").

All experimental efforts have suffered, more or less, from difficulties in controlling the disturbance environment such as sound radiated from turbulent boundary layers on the tunnel walls (Schneider 2001b, 2008). Nevertheless, these "natural" transition experiments could identify first and second instability modes (Kendall 1975, Stetson et al. 1983). However, for example for Mach 8, considerable discrepancies arose between planar boundary layers and boundary layers on axisymmetric cones when "blow down" facilities were used. For axisymmetric cones, high-frequency second modes were dominant, while for the planar boundary layer only low-frequency first-mode disturbances were observed (Stetson and Kimmel 1992b). In contrast, in an experiment using a Ludwieg tube for a sharp-nosed cone at Mach 5, no dominant second-mode disturbances could be detected (Wendt 1993).

With the more recent experiments for a flat plate and axisymmetric cones at Mach number 3.5 in the NASA-Langley "Quiet Tunnel," a number of discrepancies between LST and other experiments were resolved (Chen et al. 1989, Cavalieri 1995, Corke et al. 2002). Indications of nonlinear developments in the transition process were observed by Stetson et al. (1983) for a cone at Mach 8. Most of the experimental efforts suffered from the deficiency that no "controlled" disturbances could be introduced to allow for detailed quantitative comparisons with linear theory and, in particular, to allow for systematic investigations of the nonlinear stages of transition. Because of the lack of experimental evidence concerning the process in the later stages of transition, it is still completely unclear which instability modes and which nonlinear mechanisms are responsible for the final breakdown to turbulence in high-speed boundary layers. However, the controlled experiments for a Mach 2 boundary layer by Kosinov et al. (1994), using a harmonic point source for the disturbance excitation, have indicated, that secondary instability mechanisms were present. In fact, Kosinov and Tumin (1996) speculated that it was a subharmonic resonance of "oblique" fundamental disturbances which was later confirmed by our simulations (Mayer et al. 2008, 2011a).

Ladoon and Schneider (1998) analyzed the stability behavior of controlled disturbances (introduced via a glow discharge) in a flow over a circular cone at small angles of attack at M=4. They measured a phase speed of 0.9 times the free-stream velocity and observed large rms-amplitude values in the outer part of the boundary layer—both indications that a second-mode instability is present. They speculated that although amplitude growth was significant, the disturbance amplitude of the glow discharge was too small in order to cause transition. Kimmel et al. (1999) investigated the three-dimensional boundary-layer flow over a cone with elliptical cross-section (ratio 2:1) at Mach 8. Their measurements revealed that inflection-point profiles are present close to the centerline where the boundary layer is also significantly thicker than away from the centerline. With the laminar state of the flow already very complex, they could only speculate that transition at the centerline is caused by the inflection point instability while close to the shoulder of the cone transition is induced by cross-flow instabilities. The instability of the inflectional boundary layer appeared to be stronger than the instability of the cross flow so that transition occurred first at the centerline and farther downstream at the shoulder of the cone. Continuing work of Poggie et al. (2000) revealed second-mode disturbance waves close to the centerline of the elliptical cone. It remained unclear if cross-flow disturbances or first-mode waves are present at the shoulder of the cone. According to Poggie et al. (2000), an indication towards the presence of cross-flow instabilities is that the measured wave length was rather short and because the group velocity vector of leading-edge disturbances did not deviate more than 1 degree from the edge velocity vector, they hypothesized that oblique leading edge disturbances do not play an important role in the stability behavior at the shoulder of the cone. Although the amplitudes under investigation were too high for a receptivity study, Schmisseur et al. (2002) saw a response to thermal disturbances generated by a laser placed in the free stream close to the shoulder of his 4:1 elliptic cone at M=4. Maslov and coworkers (see Shiplyuk et al. 2003, Bountin et al. 2008) reported "controlled" experiments for a sharp-nosed cone at M=5.95 using a glow-discharge actuator to generate harmonic point source disturbances. They investigated several nonlinear interactions and identified a "classical" subharmonic resonance (with the 2-D second mode as the primary disturbance) as a possible breakdown mechanism, possibly involving a 3-D first mode as the subharmonic wave. However, in order to confirm this conjecture, a very high spatial and temporal resolution of the measurements would be required which, of course, is difficult experimentally. In fact, Shiplyuk et al. (2003) state in their paper that " . . . numerical calculations would be helpful to clarify the scenarios of nonlinear interactions that are identified in the present work." The simulations proposed in § 4 would indeed serve this purpose and would allow to extract additional information regarding the relevant physical mechanisms.

In a panel discussion at the $45^{th}$ AIAA science meeting in Reno (2007), researchers from industry, government labs, and academia, recognized that the current incomplete understanding of roughness-induced transition in supersonic and hypersonic boundary layer flows is a major bottleneck for the development of supersonic and hypersonic flight vehicles. In the past, numerous experimental investigations of different flow configurations have been performed to gain insight into the physical effects of roughness on the transition process. A detailed survey of these experimental studies was compiled by Schneider (2007). The purpose of these studies is to establish a correlation between roughness parameters and transition onset. Reda (2002) or Berry and Horvath (2007), for example, propose power-law relationships between the location of transition onset (e.g. Reynolds number based momentum thickness) and the shape of the roughness elements (e.g. roughness height over momentum thickness). Most of these correlations are, however, only valid for a certain flow configuration and for roughness heights smaller than the boundary layer thickness.

The first experiments to confirm the stabilizing effects of porous coatings were carried out by Rasheed et al. (2002) for a sharp cone. For these experiments, Rasheed et al. (2002) used a perforated sheet with dimensions based on the theoretical predictions by Fedorov et al. (2001). A comparison between experimental and theoretical results for a sharp cone with random microstructure coating was performed by Fedorov et al. (2003a, 2003b) and showed reasonable agreement between theoretical results and the experimental data. Chokani et al. (2005) conducted experiments using a 7° half-angle cone with a regular microstructure porous coating for M=5.95 to investigate the nonlinear aspects of a porous wall. They reported that the subharmonic and harmonic (fundamental) resonances observed for solid surfaces were substantially altered by a porous wall. With the porous surface, no indications of fundamental resonance could be detected and the subharmonic resonance was significantly weaker than for the solid-wall case. The theoretical studies carried out by Fedorov et al. (2006) match the experimental results obtained by Chokani et al. (2005). Experimental studies confirming the stabilization of boundary layers using a carbon-carbon material for a cone geometry were carried out by Wagner et al. (2012, 2013). Experiments by Lukashevich et al. (2012) showed that porous coatings stabilize the second mode and its higher harmonics. They found that the low-frequency disturbances are marginally destabilized, which is consistent with the previous experimental observations using a felt-metal coating of random microstructures.

Recently, Schneider and co-workers conducted a series of hypersonic transition experiments in the Boeing/AFOSR Mach 6 quiet tunnel (BAM6QT) at Purdue University. In particular, Casper et al. (2009) measured the surface pressure fluctuations on a 7° straight cone. The measurements showed that second mode disturbances grew in a laminar boundary layer and then saturated. They also measured the pressure fluctuations beneath wave packets and turbulent spots on the nozzle wall of the BAM6QT (Casper et al. 2011). In quiet tunnels like the BAM6QT, the background disturbances are at such low levels that the flow does not transition to turbulence for a 7° straight cone. As flared cones lead to more unstable flows (i.e. earlier transition onset), this geometry was therefore also used for transition experiments in the BAM6QT (Berridge et al. 2010, Ward et al. 2012, Henderson et al. 2014). Schneider and co-workers have performed flared cone experiments with and without roughness elements (Chynoweth et al. 2014). They varied the azimuthal spacing of the roughness elements in an attempt to control/manipulate the second-mode breakdown, as suggested by the numerical simulations (DNS) of fundamental and oblique breakdown by Fasel and co-workers (Sivasubramanian and Fasel 2011b, 2012b, 2013, 2015, Laible and Fasel 2011, Fasel et al. 2014). Flow visualization from the experiments revealed longitudinal streaks similar to those observed in the DNS by Fasel and coworkers of fundamental and oblique breakdown.

Far fewer experimental data are available for high-enthalpy ('hot flow') conditions, which are encountered during hypervelocity atmospheric flight. This lack of data is mainly due to the considerable effort and cost of operating hypersonic high-enthalpy tunnels. Therefore, transition research has been carried out mainly in tunnels with very low static free-stream temperatures ('cold flow', see for example Berridge et al., 2010; Corke et al., 2002; Matlis, 2003; Casper et al., 2011, 2013; Hofferth et al., 2010; Hofferth & Saric 2012). In contrast to the real flight environment, the wall to boundary layer edge temperature ratio in such experiments is $T_w/T_e \geq 1$ ('hot wall'). Whereas, the hypervelocity (reflected shock) tunnels, such as the T5 at Caltech, allow for short-duration hot flow experiments that result in conditions, which more closely resemble those encountered during hypersonic atmospheric flight, including high boundary-layer edge temperatures and associated temperature ratios, $T_w/T_e < 1$ ('cold wall'). The T5 is not a 'quiet tunnel' per se. However, the acoustic noise radiated from the tunnel walls is in a frequency range much lower than the expected frequency of the instability waves, making it 'quiet' for hypersonic transition experiments. In the recent T5 experiments Jewell et al. (2012, 2013) observed naturally occurring turbulent spots for a 5° sharp cone at Mach 5.32. Because the cone is heated up by less than 20K during the tests (Jewell & Shepherd 2012), the wall remained essentially at the initial ambient temperature and was thus "cold" relative to the free-stream. According to Mack (1984) a cold wall stabilizes the first mode and destabilizes the second mode. Therefore, it can be expected that the laminar-turbulent transition process for the hot flow case (i.e. cold wall $T_w/T_e < 1$) is different from the cold flow case (i.e. hot wall $T_w/T_e \geq 1$).

Flight experiments have also been conducted to investigate transition in real flight environments. The Hypersonic International Flight Research Experimentation (HIFiRE) program (Dolvin 2008, 2009), is a joint program by the Air Force Research Laboratory (AFRL) and the Australian Defence Science and Technology Organization (DSTO). The purpose of this research is to investigate technologies and validate predictive tools that are critical to the development of next generation hypersonic aerospace systems. HIFiRE-5 is the second of two flights in the HIFiRE program focusing on boundary-layer transition. The HIFiRE-5 flight was devoted to measuring transition on a three-dimensional body (2:1 elliptic cone). Transition on 3D configurations embodies several phenomena not encountered on axisymmetric configurations at zero angle of attack, namely, attachment-line transition and crossflow instabilities (including crossflow interactions with other instability mechanisms shared with axisymmetric geometries, such as first and second mode traveling waves). Due to the practical and financial constraints of obtaining reliable and a broad ranges of data from flight tests such as the HIFiRE-5 supporting "ground" experiments using the same 3D geometry are required in combination with stability theory and numerical simulations (DNS), such as outlined in the present proposal.

2.3 Numerical Simulations

Due to the difficulties in experimental investigations of high-speed boundary layer transition and due to the limitations of linear stability theory, so-called Direct Numerical Simulations (DNS) represent a promising tool for high-speed transition research. In DNS, the complete Navier-Stokes equations are solved directly by proper numerical methods without making restrictive assumptions with regard to the base flow and the form and amplitude of the disturbance waves. Therefore, DNS is particularly well suited for investigations of the nonlinear development that is characteristic of the later stages of high-speed boundary-layer transition. Two fundamentally different models are used for DNS: the "temporal" and the "spatial" model. The so-called "temporal model" is based on the assumption that the base flow does not change in the downstream direction (thus excluding nonparallel effects). Also, assuming spatial (downstream) periodicity of the disturbances, the disturbance development (growth or decay) is then in the time-direction. The temporal model is analogous to the temporal approach in LST with the frequency is assumed to be complex and the spatial wave number is real. Due to the underlying assumptions, the temporal model can only provide qualitative results. On the other hand, since a relatively short integration domain can be used in the downstream direction (typically one or two wave lengths of the fundamental wave) temporal simulations are relatively inexpensive and can be efficiently utilized for parameter studies.

In contrast, in the "spatial model" no assumptions are made with regard to the base flow (thus nonparallel effects are included). The disturbance development (growth or decay) is in the downstream direction as in physical laboratory or free-flight conditions. Thus, the spatial model allows realistic simulations of high-speed transition and direct comparison with wind-tunnel or free-flight experiments. However, simulations based on the spatial model are typically much more costly than for the temporal model because a much larger downstream integration domain is required (many wave lengths of the fundamental disturbance wave). This is particularly true for simulations of high-speed boundary layer transition, where the growth rates of the disturbance waves are often much smaller than for the incompressible case and where the growth rates of certain modes decrease with increasing Mach number. Moreover the transition zone length can be of the same order of magnitude as the length of the preceding laminar boundary layer. Thus, relatively large (in the downstream direction) integration domains are required to allow small disturbances to grow to the large amplitudes that characterize the nonlinear stages of the transition process and that finally lead to the breakdown to turbulence. As a consequence, spatial simulations of high-speed transition are computationally very challenging. Detailed discussions of the DNS methodology for investigations of boundary layer transition, in particular discussions of the temporal and spatial approach are given by Fasel (1990), Kleiser and Zang (1991), and Reed (1993).

Probably the first transition simulation for supersonic boundary layers, although restricted to two-dimensional yet spatially evolving disturbances, was by Bayliss et al. (1985), who employed an approach analogous to that by Fasel (1976) for incompressible boundary layers. The first three-dimensional temporal DNS for flat-plate high-speed boundary-layer transition was performed by Erlebacher and Hussaini (1990). Here, only the linear and early nonlinear stages were explored. Other temporal simulations were performed by Normand and Lesieur (1992), Pruett and Zang (1992), Dinavah and Pruett (1993), Adams and Kleiser (1993). From such temporal simulations, Normand and Lesieur (1992) found that, for their case of a flat-plate boundary layer with M=5, transition occurred via a subharmonic secondary instability for the second mode. This finding was consistent with results from simulations by Adams and Kleiser (1993), Pruett and Zang (1992), and Dinavahi and Pruett (1993) for a boundary layer at Mach 4.5 on a hollow cylinder (the axisymmetric analog of a flat-plate boundary layer). However, the main weakness of these "temporal" simulations is the fact that they do not take the boundary-layer growth into account. In fact, experiments by Stetson and Kimmel (1993) and PSE calculations by Chang et al. (1991) indicate that subharmonic resonance may not be the preferred route to transition in realistic, growing boundary layers (which include nonparallel effects).

Realistic simulations of transition scenarios including the effects of the growing boundary layer require the use of the spatial simulation model. The first three-dimensional spatial simulations of transition in supersonic boundary layers were reported by Thumm (1991) for a Mach number of 1.6. In fact, from these and follow-up simulations (Fasel et al. 1993), it was discovered that a new "Oblique Breakdown" mechanism produces much larger growth rates than either subharmonic or fundamental resonance and requires much lower disturbance amplitudes. Therefore, we believe that the "Oblique Breakdown" is a likely candidate for a viable path to transition for supersonic boundary layers. Using PSE calculations, Chang and Malik (1993) confirmed the validity of this oblique breakdown for a flat-plate boundary layer at M=1.6. Recently, the highly resolved DNS of Mayer et al. (2008, 2009) finally proved that oblique breakdown can indeed lead to a fully turbulent boundary layer for a flat plate at Mach 3 (see § 4). Based on our DNS code (see Fasel et al. 1993), Bestek and Eissler (1996) performed simulations for Mach 4.8 and investigated various nonlinear mechanisms including the "oblique breakdown" mechanism. Bestek and Eissler (1996) also confirmed, for the first time, the existence of an additional "higher viscous" mode, which Mack (1969) had predicted using LST analysis. Pruett and Chang (1993) carried out spatial DNS for a flat-plate boundary layer at Mach 4.5 and provided a detailed comparison with PSE results. Later, an improved version of the code (Pruett et al. 1995) was applied to a simulation of transition on axisymmetric sharp cones at Mach 8 (Mach 6.8 after the shock, Pruett and Chang 1995). This simulation was combined with PSE calculations such that the linear and moderately nonlinear stages were computed by PSE while the strongly nonlinear and breakdown stages of transition were computed by spatial DNS. This approach was motivated by the experience that linear and moderately nonlinear wave propagations can be computed more efficiently with PSE while the strongly nonlinear and breakdown stages (requiring many spanwise Fourier modes) are computed more efficiently and more accurately with DNS. In this simulation, a second-mode-breakdown resonance was also investigated. The so-called rope-like structures obtained from numerical flow visualizations of the simulation data for this breakdown process are similar to those observed in high-speed transitional boundary layers on cones (see Pruett and Chang 1995). More recently, Zhong and coworkers (see Zhong 2001) investigated the leading edge receptivity of high-speed boundary layers using DNS. They also explored the effects of the magnetic fields on the second-mode instabilities for a weakly ionized boundary layer at M=4.5 (Cheng et al. 2003).

Fezer and Kloker (2004) also investigated the same cone geometry used in the experiments by Stetson et al. (1983) but with atmospheric conditions (hot approach flow) and a radiation-cooled wall. They claimed that a fundamental resonance (K-type) with accompanying hot streaks along the wall initiated transition in their case. The high temperature streaks along the wall resulted from streamwise vortical structures which developed during this breakdown.

The physical mechanisms responsible for roughness-induced transition are still not well understood. Reshotko and Tumin (2004) investigated the role of transient growth in roughness-induced transition, where the non-modal growth of steady longitudinal structures would initiate an early breakdown to turbulence, which confirmed the correlation by Reda (2002). Reshotko and Tumin's model, however, is based on the linearized Navier-Stokes equations and cannot explain the nonlinear effects introduced by large roughness heights. The latter case can only be investigated using DNS. Some DNS of the linear regime of roughness-induced transition were conducted by Balakumar (2003) and Zhong (2007). Zhong and co-workers investigated the receptivity w.r.t. three-dimensional surface roughness (Wang and Zhong 2008). They showed that counter-rotating streamwise vortices and transient growth are induced by surface roughness. However, transient growth was generally found to be weak due to the small height of roughness used in the simulations. Recently, they investigated the possibility of stabilization of hypersonic boundary layers using two-dimensional large roughness elements ("bumps") (Duan et al. 2013, Fong et al. 2014). They found that the roughness location with respect to the synchronization point played an important role in the effectiveness of these bumps for delaying transition. However, further systematic studies are needed to understand the relevant flow physics in the presence of such bumps. In particular, it is not clear if the benefits of transition delay are not offset by the largely increased receptivity due to free-stream disturbances (noise, freestream turbulence, etc.) and the increased skin friction and wave drag caused by the relatively large bumps. The effects of discrete roughness elements on stability and transition can be investigated with numerical simulations using either body-fitted grids or using Immersed Boundary Techniques (IBT). Complex body-fitted grids require a generalized coordinate transformation or an elaborate (compute-time intensive) overset grid methodology. There are different approaches to IBT, one that preserves the order of accuracy of the underlying discretization by using jump conditions at the boundary interface (e.g. Linnick and Fasel 2005), and another approach that does not alter the discretization near the interface. The latter approach is less complicated and allows for an easier implementation into existing codes. Examples are Peskin and McQueen (1989), Goldstein et al. (1993), Fadlun et al. (2000), and Terzi et al. (2001). However this approach and most other IBT methods published in the literature have low accuracy near the interface and/or suffer from a lack of computational robustness. Recently, Fasel and co-workers developed a robust, locally stabilized immersed boundary method for the compressible Navier-Stokes equations that remedies these inadequacies (Brehm et al. 2014, 2015). They developed a new block structured compressible Navier-Stokes solver with the immersed boundary method implemented in 3D using a generalized coordinate transformation. These new capabilities allow for an efficient simulation of the effect of discrete and distributed roughness of various shapes on the linear, and in particular also on the nonlinear transition regime for high-speed flows. For large roughness elements that are in the order of the boundary layer thickness, the shock and expansion wave system that forms at the roughness edges needs to be resolved. Therefore, the new compressible code has a higher order WENO capability (Brehm et al. 2015).

Numerous numerical analyses confirmed the stabilizing effect of ultrasonically absorptive coatings (UACs) for a flat plate for the linear stability regime (Brès et al. (2008a, 2008b, 2008c, 2009, 2010, 2013), Fedorov et al. (2008), Egorov et al. (2008), Sandham et al. (2009), Fedorov (2011), Wartemann et al. (2009,2010,2012,2013) and Wang and Zhong (2013)). Direct numerical simulations by Lukashevich et al. (2012) showed that there is an optimal UAC thickness at which the second-mode stabilization is maximal. This optimum corresponds to the UAC thickness ratio of h/b≈3 that is consistent with the theory. The stabilizing effect of porous walls in the nonlinear stability regime and the potential to delay transition was shown by the DNS to turbulence by de Tullio et al. (2010).

Fasel and co-workers carried out Temporal Direct Numerical Simulations (TDNS) for a Mach 6 boundary layer for investigating the stabilizing effect of porous coatings on second mode instability in high speed boundary layers. A newly developed, locally stabilized immersed boundary method was employed (Brehm et al. 2012, 2014, 2015). The immersed boundary method showed significant improvement in accuracy, efficiency and robustness compared to a direct-forcing scheme (Hader et al. 2013a,b, 2014). Moreover, with the new scheme the destabilization effects for very narrow porous coatings was confirmed as was predicted by the theoretical studies by Fedorov (2001). To gain more insight into the physical mechanisms responsible for the stabilization in the linear stability regime, they evaluated the kinetic disturbance energy terms. Their results suggested that the viscous dissipation and the pressure diffusion played a major role in the stabilization process and were at least one order of magnitude larger than the remaining terms. In addition, the simulations into the nonlinear transition regime suggested that the porous walls also delayed disturbance growth in the nonlinear transition regime.

Over the last several years, Fasel and coworkers have investigated the non-linear stages of boundary layer transition for sharp circular cones at Mach 6. The main objective of this research was to explore which nonlinear breakdown mechanisms may be dominant in a broad band "natural" disturbance environment. Towards this end, a "natural" transition scenario was modeled by introducing linear and non-linear wave packets (Sivasubramanian et al. 2009; Sivasubramanian and Fasel 2010a,b, 2011b, 2012a, 2014). By tracking the downstream development of the various disturbance components of the wave packet they found strong evidence for the possibility of fundamental and sub-harmonic resonance, as well as oblique breakdown. However, the simulation results indicated that fundamental resonance and oblique breakdown were much stronger nonlinear mechanisms than sub-harmonic resonance.

Subsequently, in order to gain detailed insight into the various nonlinear mechanisms identified in the wave packet investigations, they conducted "controlled" transition simulations for both straight and flared cones at Mach 6 (Sivasubramanian and Fasel 2011b, 2012b, 2013; Laible and Fasel 2011; Fasel et al. 2014). These simulations confirmed that the fundamental resonance and oblique breakdown were indeed much stronger than subharmonic resonance. A set of highly resolved fundamental and oblique breakdown simulations confirmed their earlier conjectures, namely that compressibility effects will not only extend the linear transition regime, but may in particular also strongly extend the nonlinear regime. Indeed, the simulations have shown that for the Texas A & M and Purdue quiet tunnel conditions the nonlinear transition processes occur in several distinct stages, as could be observed from the skin friction coefficient for a fundamental breakdown scenario. The initial rise in the skin friction is caused by the growth of large amplitude primary waves, followed by the growth of secondary modes, most notably, the steady vortex mode. This mode is responsible for the streamwise aligned "hot-cold-hot" streaks that were also observed in experiments at Purdue for a flared cone using temperature sensitive paint (Berridge et al. 2010; Ward et al. 2012). As the primary wave starts to decay following the nonlinear saturation, caused by the energy transfer from the fundamental mode to the nonlinearly generated (higher 3D) oblique modes, the skin friction decreases strongly. Then finally, a steep rise in skin friction occurs when all the nonlinearly generated higher modes experience strong nonlinear amplification, and thus results in an overshoot over the reference skin friction and the heat transfer value for an equilibrium turbulent boundary layer. This overshoot of the heat transfer was also observed in the HIFiRE-1 ground tests (Wadhams et al. 2008). The streamwise "hot-cold-hot" streaks were also observed for the oblique breakdown. Therefore, both second-mode fundamental breakdown and oblique breakdown could have played a role in the "natural" unforced transition experiments at Purdue University and the ground tests.

3. Simulations and Research

We have been investigating laminar-turbulent transition by performing high-fidelity numerical simulations using in-house developed high-order accurate Navier-Stokes solvers.

3.1 Wave Packet Simulations for a Circular Cone Boundary Layer at Mach 6

We performed several DNS to investigate transition initiated by a wave packet in a sharp cone boundary layer at Mach 6 (Sivasubramanian and Fasel 2010a, b, 2011b, 2012a, 2014). The objective of this work is to investigate transition initiated by a broad disturbance spectrum in an attempt to model a natural transition scenario. The boundary layer is pulsed through a hole on the cone surface in order to generate a wave packet, which contains a wide range of disturbance frequencies and azimuthal wave numbers. In the past, this approach was used to investigate the natural transition phenomena for incompressible boundary layers (Gaster 1975, Gaster and Grant 1975, Medeiros and Gaster 1999a,b). The flow parameters used in the present investigations are based on the experimental conditions of the Boeing/AFOSR Mach 6 quiet wind tunnel at Purdue University (Casper et al. 2009). The cone model used in the Purdue experiments has a semi vertex angle of 7 degrees, and a cone length of L*=0.517 m. The nose radius of the cone is 0.05 mm, and therefore, the cone can be considered a "sharp cone". The approach flow has a Mach number of 6 and a unit Reynolds number of 11 E6 $m^{-1}$. The stagnation temperature and pressure are 433K and 1000 KPa, respectively.

Figure 1B:
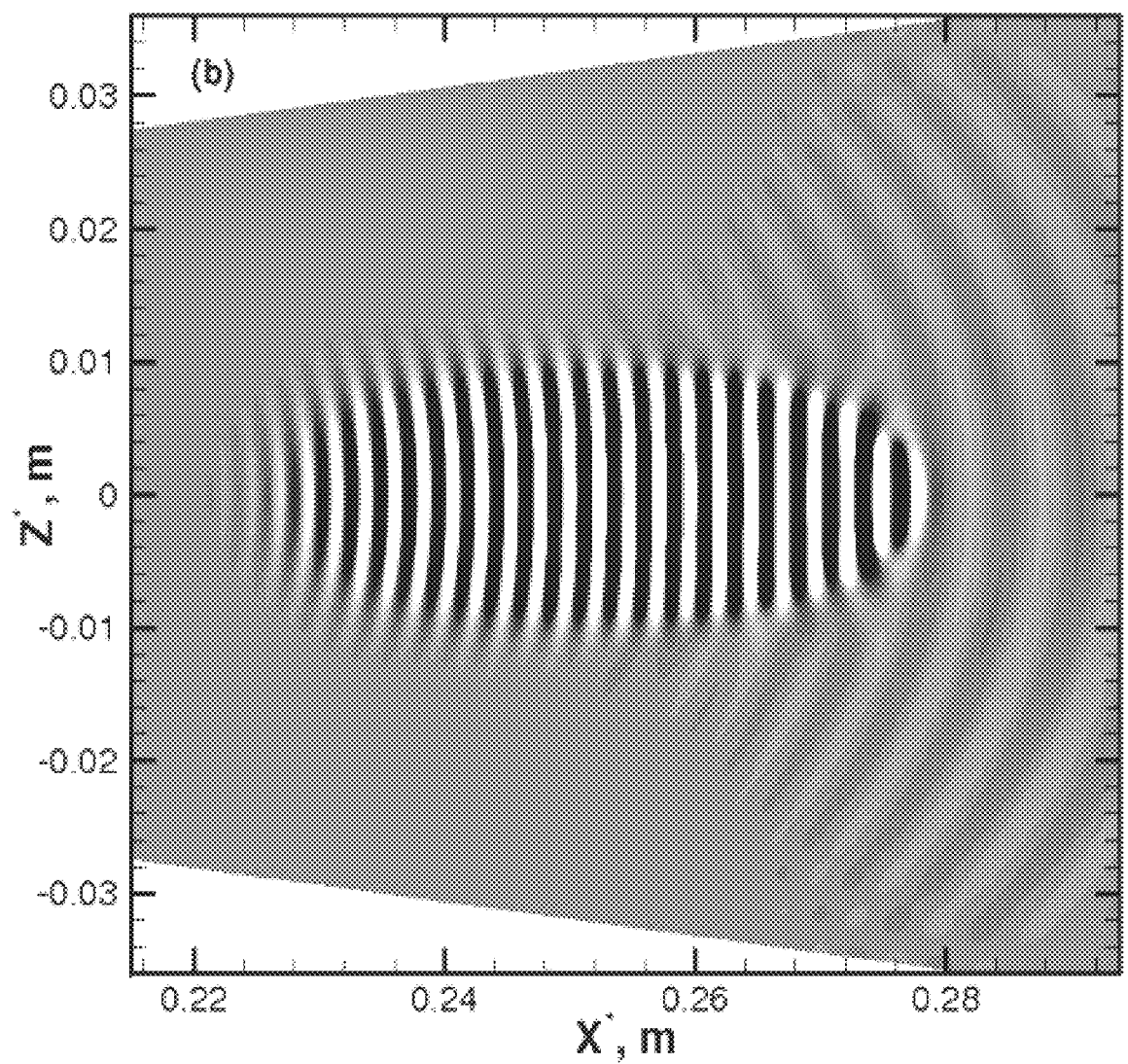
Figure 1C:
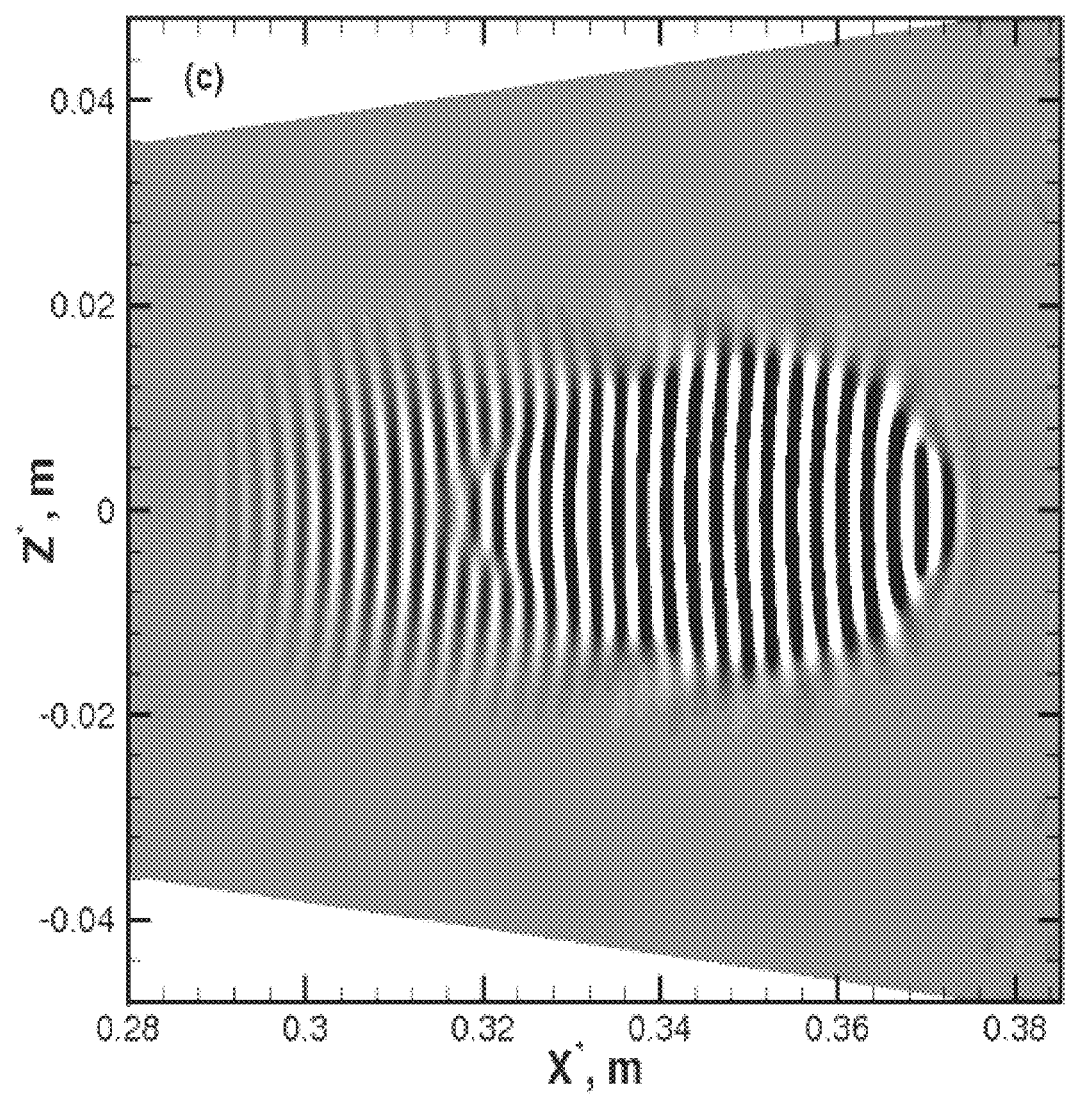
Figure 1D:
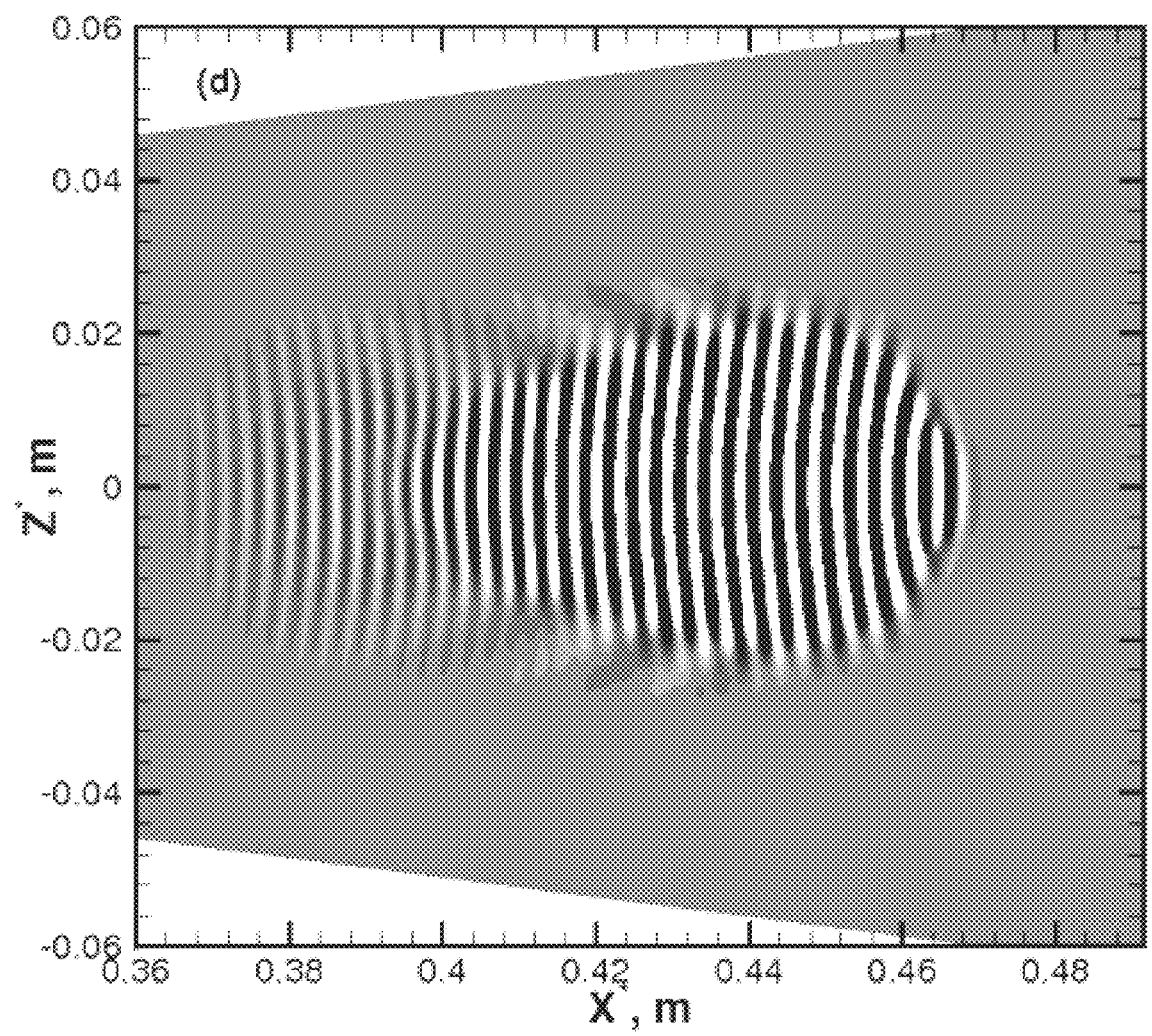

First, the linear development of the wave packet was studied by forcing the flow with a low amplitude pulse (0.001% of the freestream velocity). Four snapshots show the downstream development of the linear wave packet in FIG. 1. FIG. 1a shows the wave packet at an early stage of its development. Three-dimensional waves are seen to develop and lead the wave packet as it propagates downstream. These waves are clearly visible in FIG. 1b and seem to travel faster than the main wave packet. Therefore, these waves could be the stable fast mode waves or acoustic waves. It can be observed that the wave fronts within the main wave packet are predominantly two-dimensional. In addition to the two-dimensional waves, oblique waves can also be observed on the lateral sides of the packet. However, the amplitudes of these oblique waves are small compared to the dominant two-dimensional waves. These oblique waves are most likely first mode waves, which have lower frequencies than the most amplified two dimensional waves. Like the two dimensional waves, the oblique waves experience spatial and temporal growth as the wave packet propagates towards the outflow boundary of the computational domain as seen in FIGS. 1c and 1d.

The streamwise development of the disturbance spectra, obtained from Fourier transformation of the wall-pressure disturbance using 500 Fourier modes in time are presented in FIG. 3. As expected, the spectra exhibit a maximum at the azimuthal mode number $k_c=0$, because according to linear stability theory, in hypersonic boundary layers two-dimensional disturbances have a higher amplification rate than 3D oblique waves. The spectrum broadens in downstream direction and lower frequency first mode oblique disturbances with a peak at approximately $k_c \approx 30$ also become visible. Overall, the peak amplitude remains fixed at $k_c=0$ but shifts to lower frequencies as the boundary layer becomes thicker in the downstream direction.

Figure 2A:
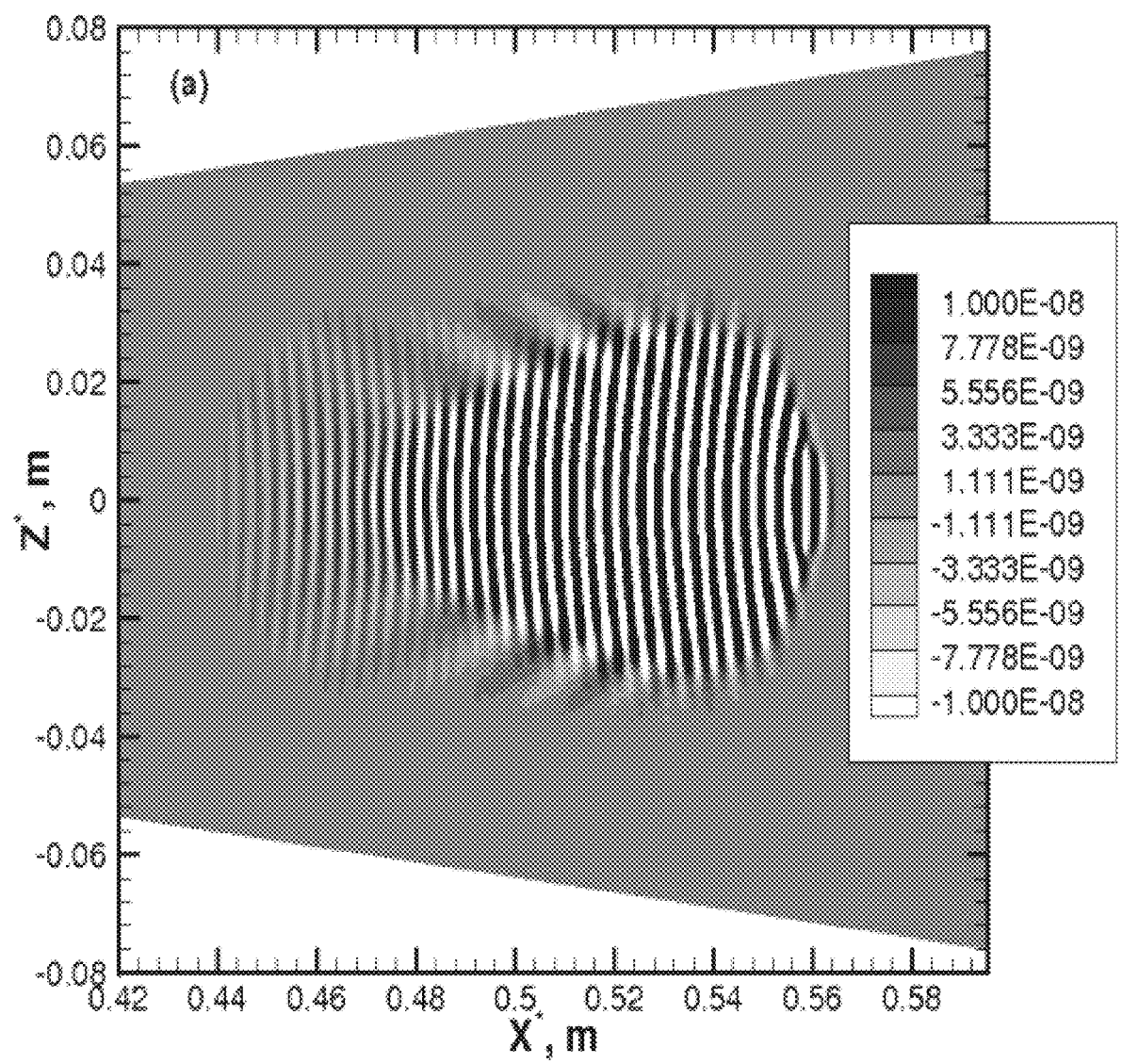
FIG. 2A-B is a diagram showing a comparison of the linear and weakly nonlinear wave packet at t*=0.6 ms. M=6, Re=11 E6 $m^{-1}$. Shown are contours of wall-pressure disturbance on the unrolled cone surface for (a) linear and (b) nonlinear wave packet.
Figure 2B:
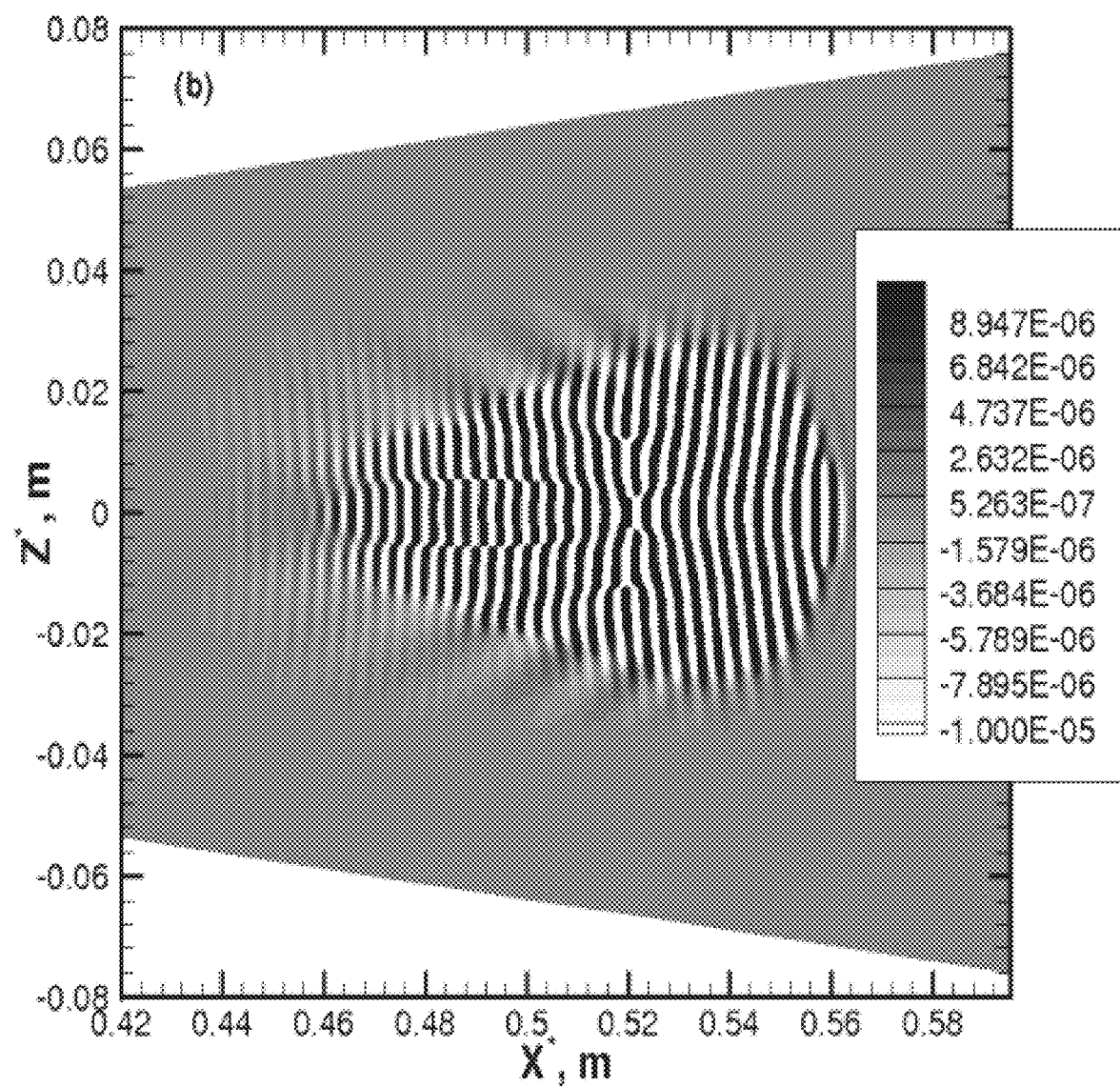
Figure 3A:
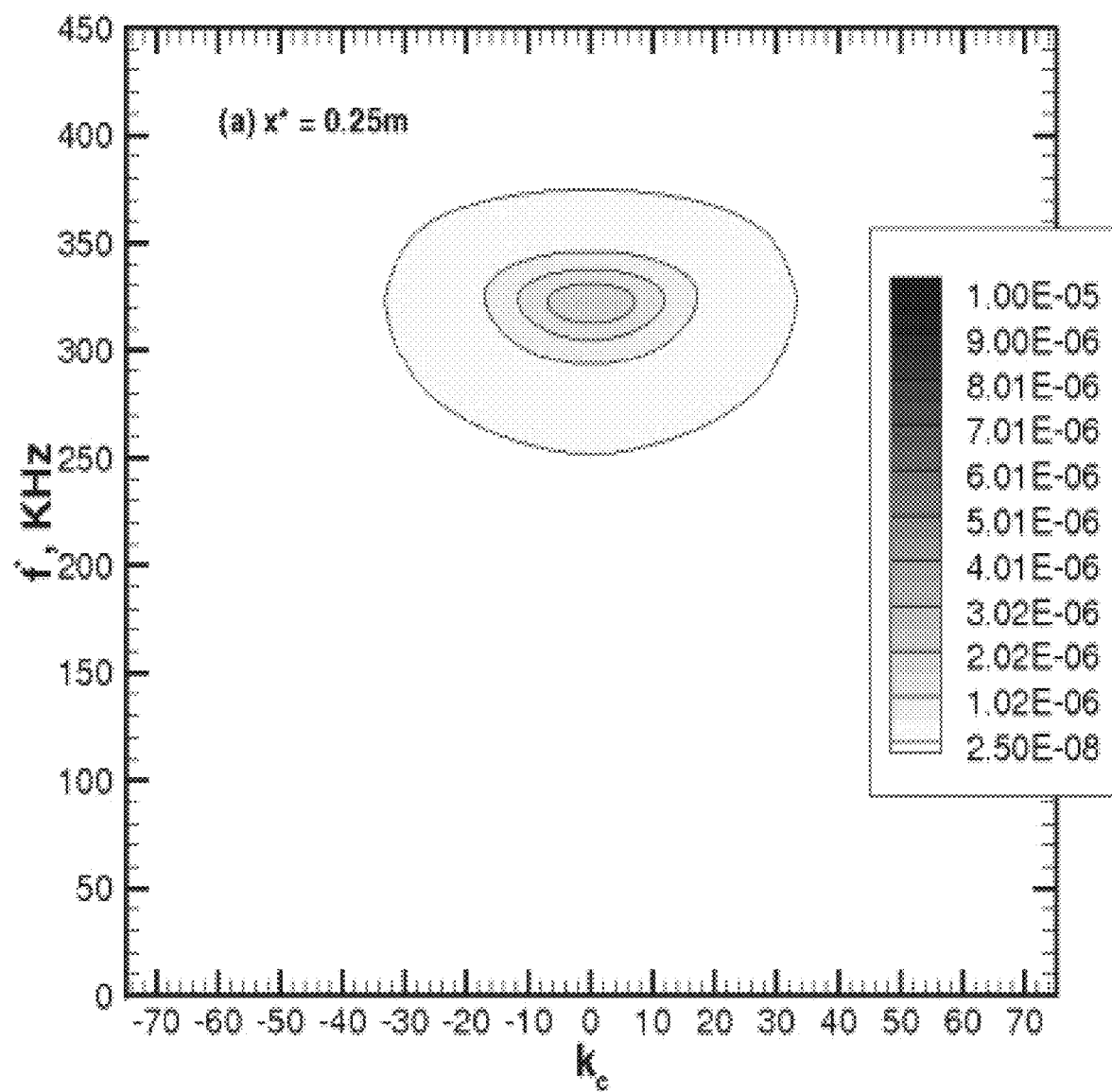
FIG. 3A-D is a diagram showing wall-pressure disturbance spectrum in the azimuthal mode number–frequency ($k_c$-f*) plane for the linear wave packet. M=6, Re=11 E6 $m^{-1}$. (a) x*=0.25 m (b) x*=0.35 m (c) x*=0.45 m and (d) x*=0.55 m.
Figure 3B:
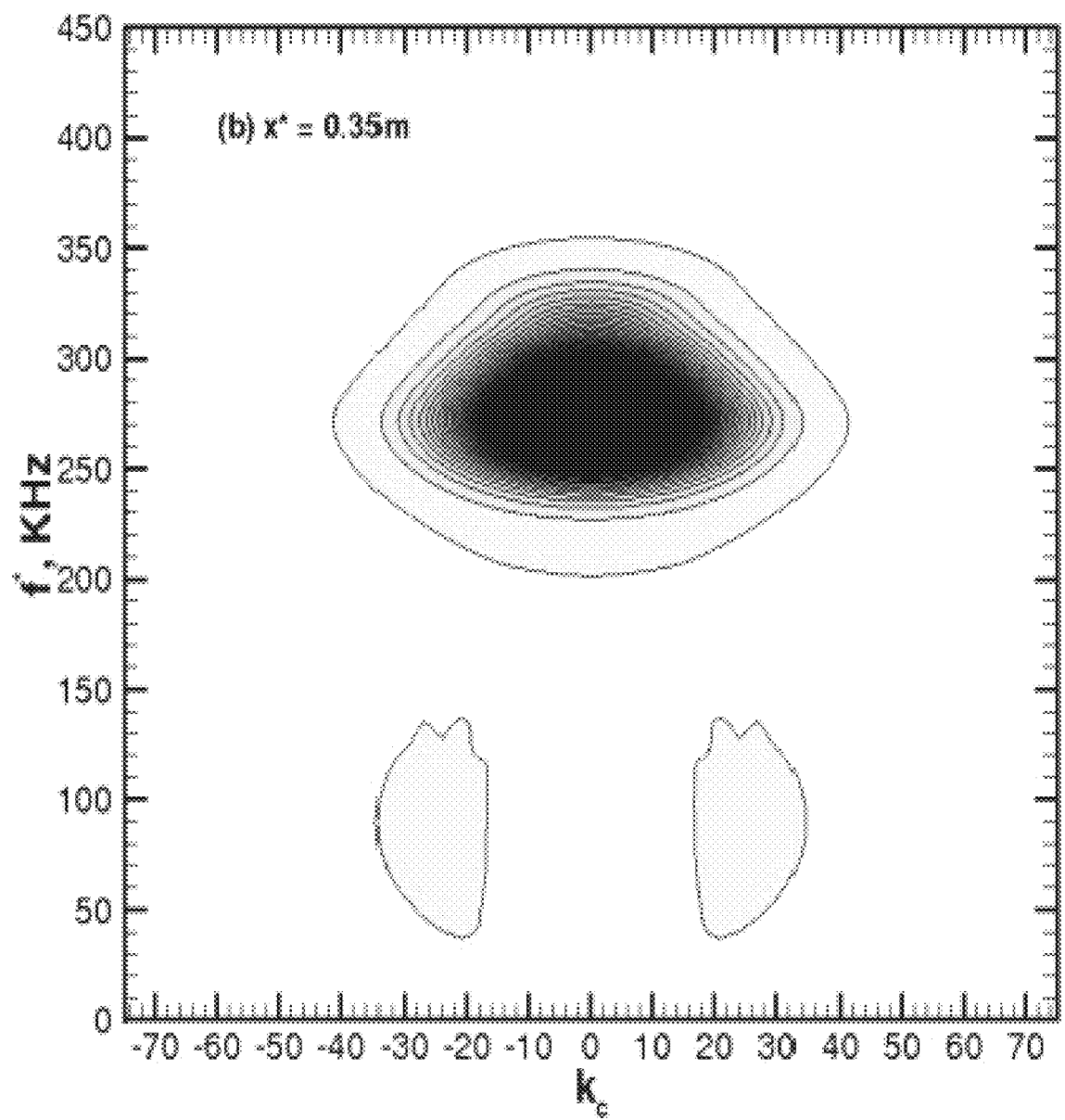
Figure 3C:
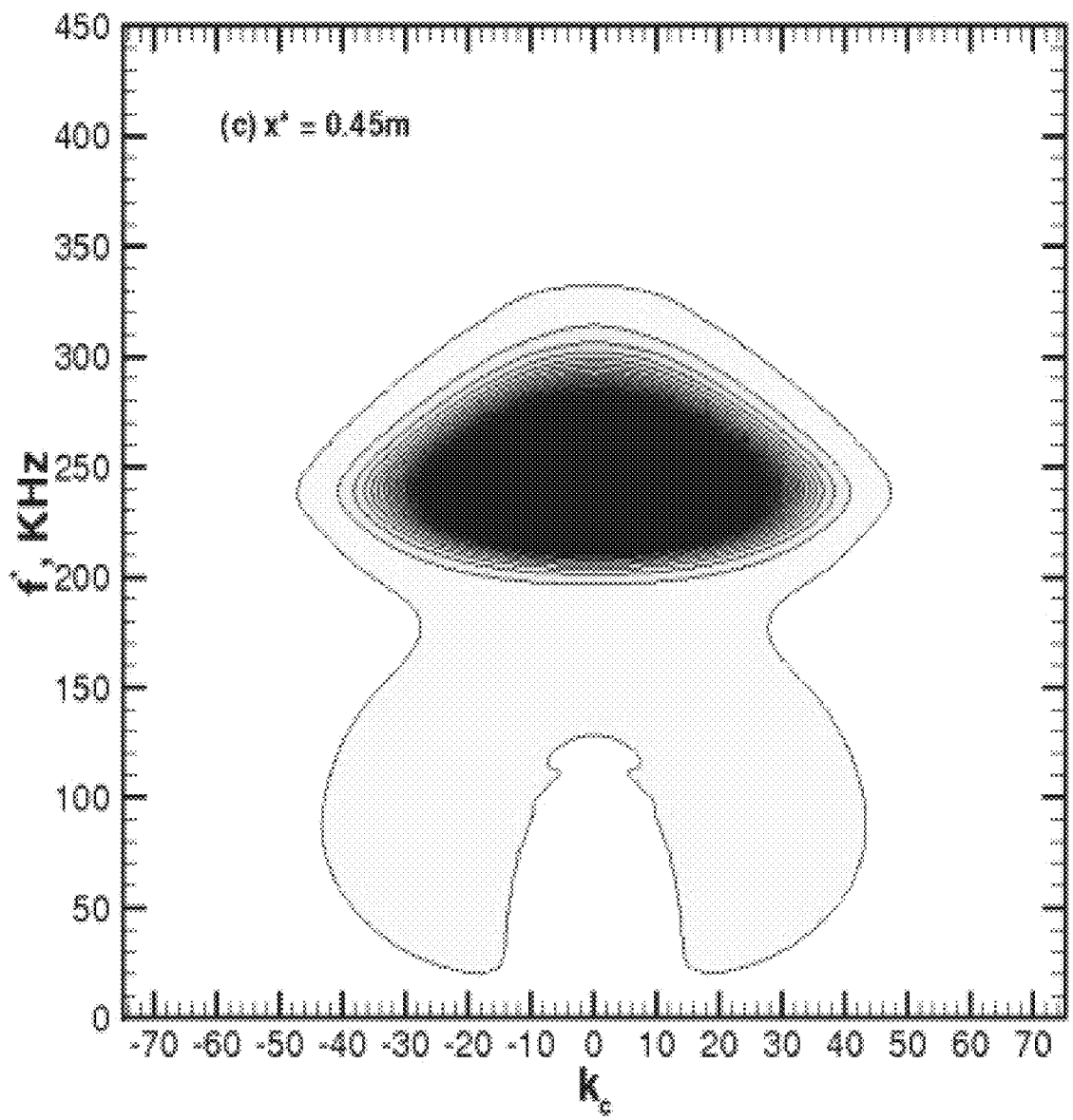
Figure 3D:
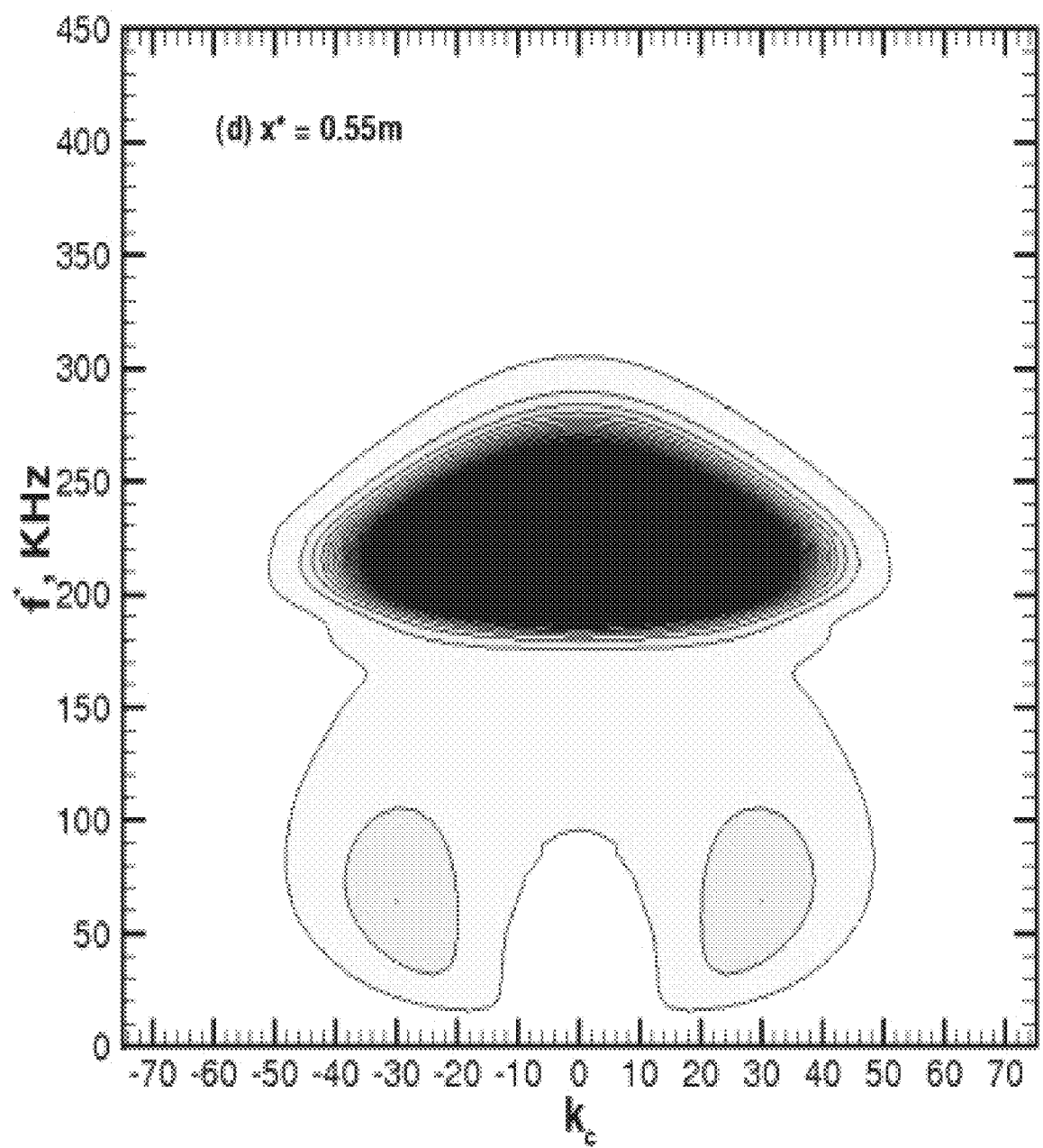
Figure 4A:
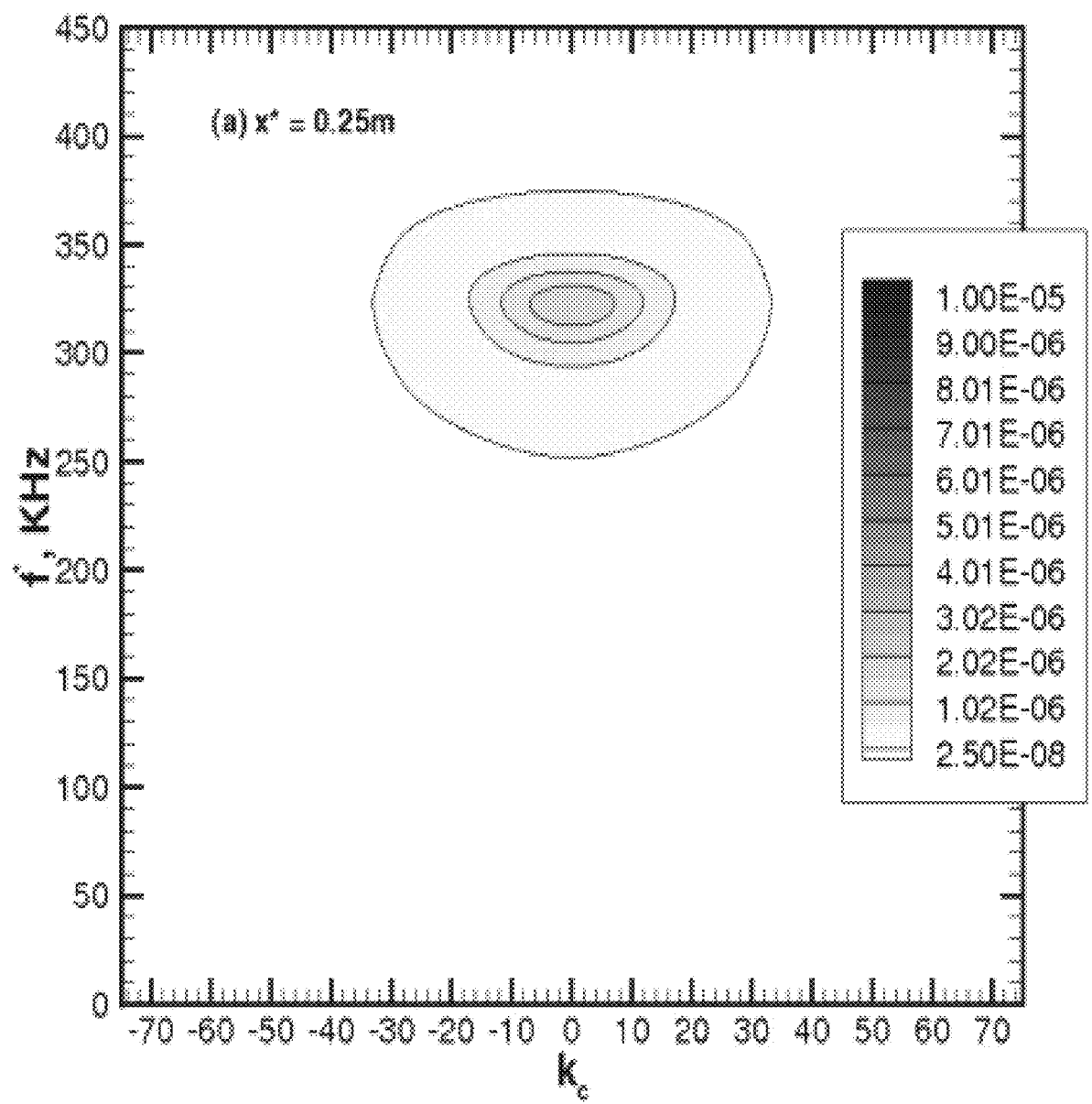
FIG. 4A-D is a diagram showing wall-pressure disturbance spectrum in the azimuthal mode number–frequency ($k_c$-f*) plane for the weekly nonlinear wave packet. M=6, Re=11 E6 $m^{-1}$. (a) x*=0.25 m (b) x*=0.35 m (c) x*=0.45 m and (d) x*=0.55 m.
Figure 4B:
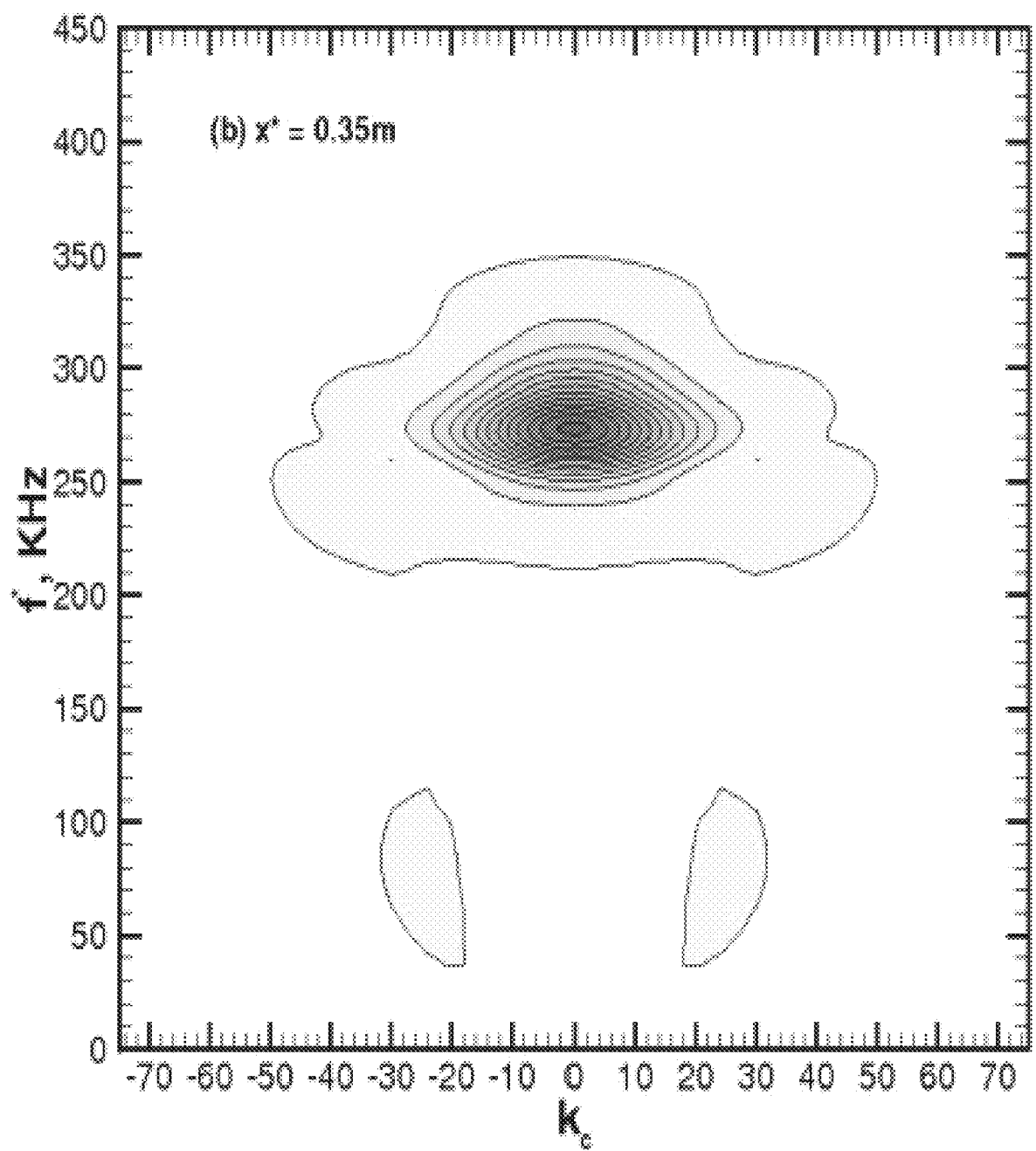
Figure 4C:
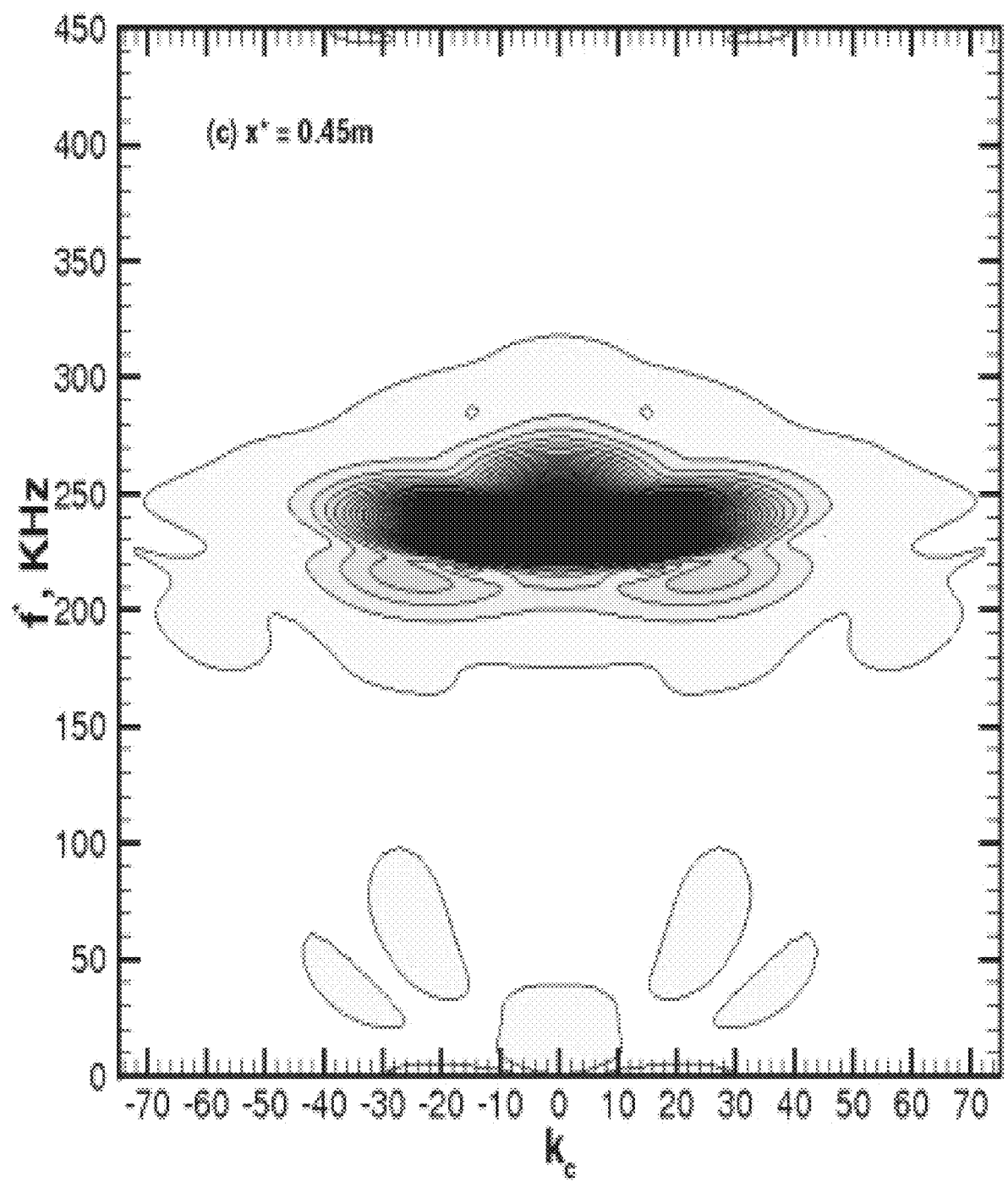
Figure 4D:
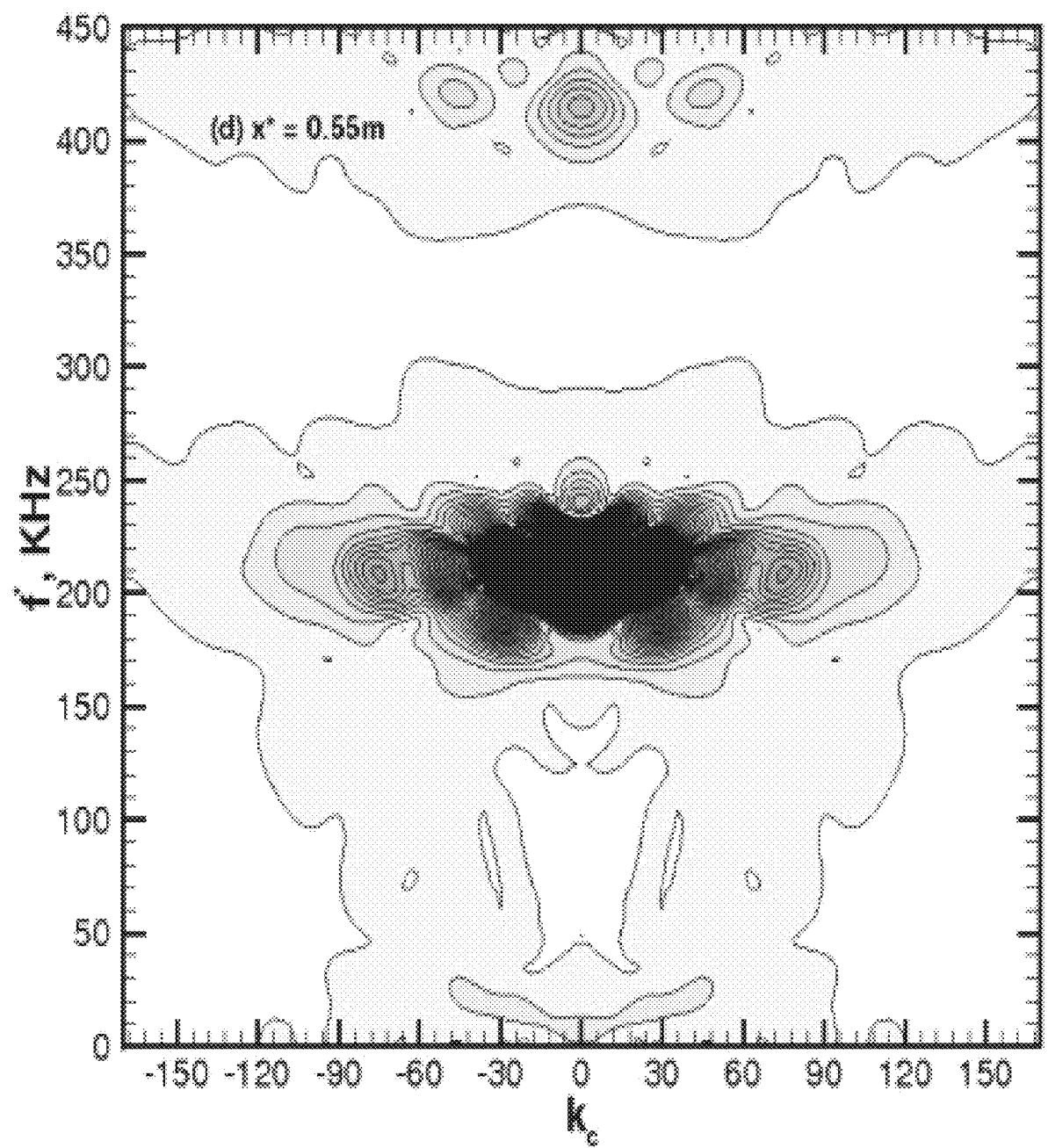

In order to investigate the weakly nonlinear regime another simulation was performed with medium amplitude pulse disturbance (0.5% of the freestream velocity). The initial evolution of the weakly nonlinear wave packet is very similar to the linear wave packet. FIG. 2 shows a comparison of the linear and nonlinear wave packet for $t^*=0.60$ ms. In FIG. 2b the weakly nonlinear wave packet appears altered by nonlinear effects. The two-dimensional wave fronts at the tail of the wave packet are strongly modulated in the azimuthal direction, and it appears as if the wave packet has three tails. This is caused by nonlinear interaction of the two-dimensional waves with oblique waves. In addition to that, changes can also be observed in the center region of the weakly nonlinear wave packet.

Figure 5:
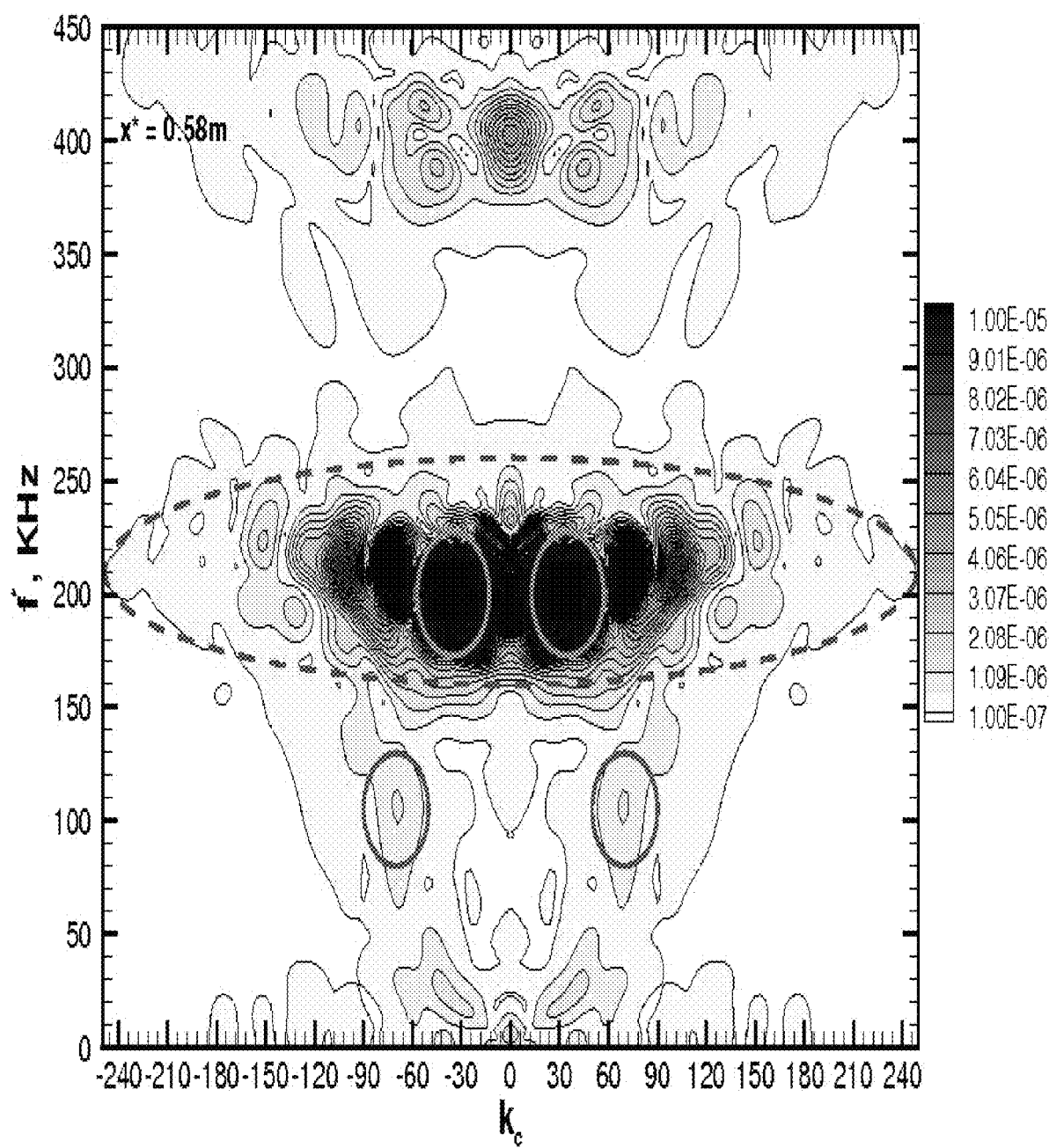
FIG. 5 is a diagram showing wall-pressure disturbance spectrum in the azimuthal mode number–frequency ($k_c$-f*) plane from the weakly nonlinear wave packet x*=0.58 m. M=6, Re=11 E6 $m^{-1}$. The high amplitude frequency bad (at fundamental frequency f*≈210 KHz) spreads over higher azimuthal wave numbers (ellipse with red dashed lines) and indicates the presence of fundamental resonance mechanism. Secondary peaks at approximately half the frequency of the high-amplitude frequency band (solid blue circle) suggest the possibility of subharmonic resonance. Strong peaks observed for low-azimuthal wave number second-mode oblique waves hints at a possible oblique breakdown mechanism.

In FIG. 4 the wall-pressure disturbance spectrum from the weakly nonlinear wave packet are shown in the azimuthal mode number–frequency plane for several streamwise positions. The disturbance spectra obtained for $x^*=0.25$ m (see FIG. 4a) look very similar to those for the linear wave packet (see FIG. 3a), which confirms that initially the wave packet develops linearly. In the disturbance spectrum for $x^*=0.35$ m (FIG. 4b), in addition to the second-mode frequency band, lower-frequency first-mode oblique waves are also observed. Furthermore, the second-mode frequency band appears slightly deformed, which indicates nonlinear interactions. For $x^*=0.45$ m (FIG. 4c) the spectrum broadens with respect to the azimuthal wave number range and additional frequency bands develop. Several low-frequency bands appear in addition to the first-mode oblique waves. Farther downstream at $x^*=0.55$ m (FIG. 4d) the spectrum has spread further over higher azimuthal mode numbers and continues to develop other frequency bands. This is a strong indication of nonlinear interactions between the dominant axisymmetric waves and oblique waves. On the spectrum in FIG. 5 strong secondary peaks appear at the fundamental frequency $f^* \approx 210$ KHz for larger azimuthal wave numbers $k_c \approx 100\text{-}200$. This development may be an indication of a fundamental (K- or Klebanoff-type) resonance mechanism (see Herbert 1988, Kachanov 1994). In addition, secondary peaks are also observed in FIG. 5 at approximately half the frequency ($f^* \approx 105$ KHz) of the high-amplitude frequency band ($f^* \approx 210$ KHz) for azimuthal mode number $k_c \approx 70$, which would be an indication of a subharmonic (N- or H-type) resonance mechanism (see Herbert 1988, Kachanov 1994). However the spectra in FIG. 5 suggest that fundamental resonance is much stronger than subharmonic resonance. Strong peaks were also observed for low-wave-number second-mode oblique waves, which may indicate a possible presence of an oblique breakdown mechanism.

Although for hypersonic boundary layers, two-dimensional or axisymmetric second-mode disturbances are most amplified; low-wave-number second-mode oblique waves can experience similar linear growth. Hence, a pair of second-mode oblique waves can initiate an oblique breakdown mechanism. Higher harmonics 420 KHz) of the high-amplitude frequency band (f 210 KHz) are also visible in the spectrum in FIG. 5. Note that such strong second harmonic disturbances were also observed in the experiments for a Mach 8 sharp cone by Stetson et al. (1983).

Figure 6:
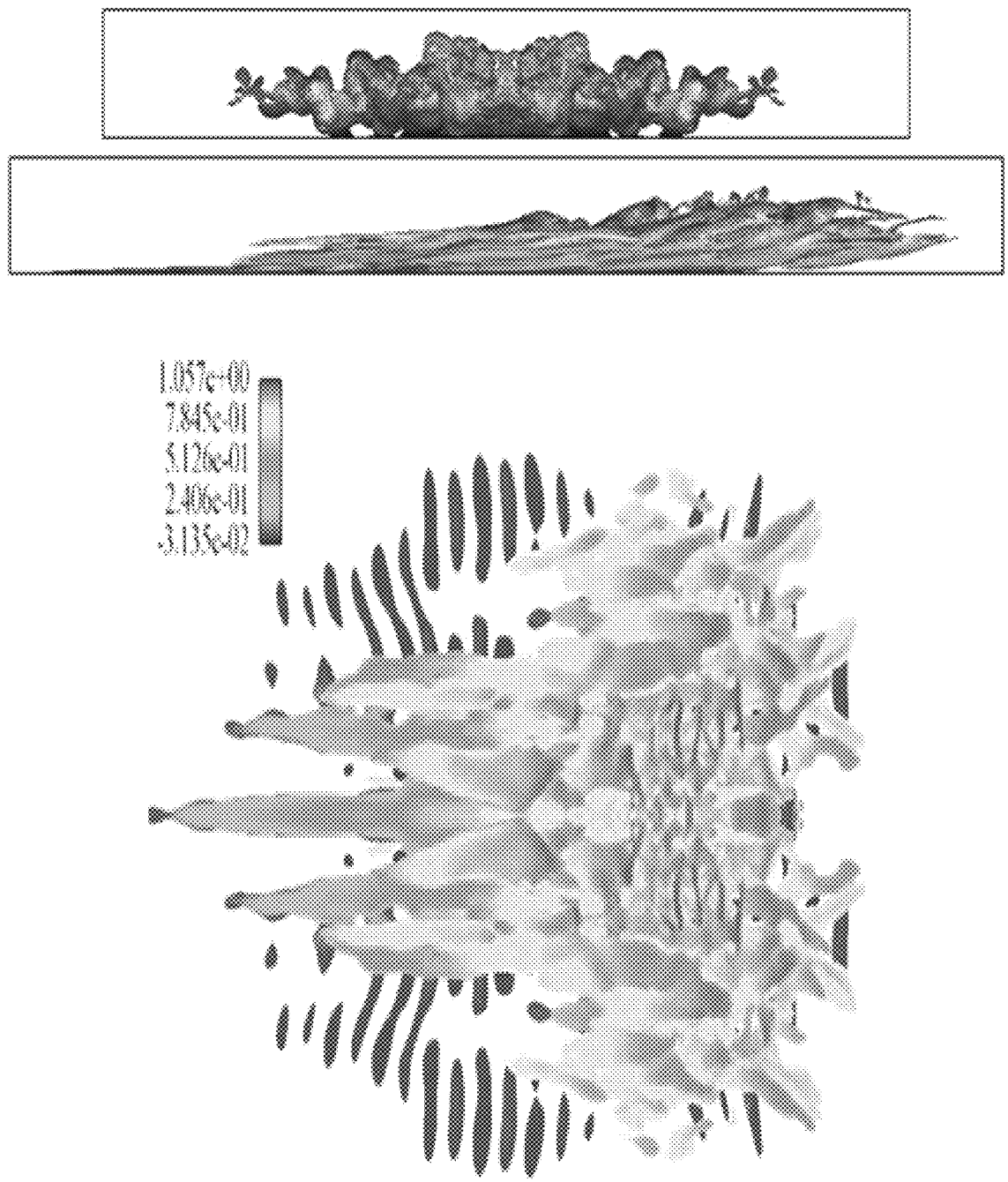
FIG. 6 is a diagram showing a visualization of a young turbulent spot at t*=0.423 ms. M=6, Re=11 E6 $m^{-1}$. Shown are (a) end view (b) side view and (c) top view of total vorticity iso-surface on the unrolled cone surface. Iso-surface is colored with streamwise velocity magnitude. All the plots have the same total vorticity magnitude of 600.

Finally, in order to explore which mechanisms will prevail in the strongly nonlinear regime and will eventually lead to nonlinear turbulent breakdown, a third simulation with a much higher forcing amplitude (5% of the freestream velocity) was performed. In this simulation the developing strongly nonlinear wave packet eventually leads to localized patches of turbulent flow (turbulent spots). Visualization of a young turbulent spot at $t^*=0.423$ ms is shown in FIG. 6. In the end view (FIG. 6, top figure), the "wingtip" with the typical lateral overhang can be clearly identified. In FIG. 6 (middle figure) a typical overhang region at the leading edge of the turbulent spot can be observed. A top view (FIG. 6, bottom figure) shows the arrowhead-shape of the core of the spot. Hairpin-shaped substructures, which play an important role in turbulence production mechanisms, are also clearly visible in the top view. The mechanisms responsible for the growth of turbulent spots in a hypersonic boundary layer are highly complex and will be investigated in greater detail in the proposed research.

3.2 Controlled Transition Simulations for a Sharp Circular Cone at Mach 6

The wave packet simulations we performed for a Mach 6 circular cone boundary layer provided strong evidence for the presence of second-mode fundamental and oblique breakdown mechanisms. In addition, the wave packet simulations have also indicated a possible presence of subharmonic resonance mechanism. However, due to the broadband forcing of multiple frequencies and wave numbers in the wave packet simulations, the nonlinear interactions between different wave components are highly complex. Therefore, in order to determine which of these nonlinear mechanisms were most relevant for the entire transition process, that is, determine which of these mechanisms can indeed lead to a complete breakdown to turbulence and to fully developed turbulent flow, it is necessary to perform simulations where the initial number of possible nonlinear interactions are limited. Towards this end, controlled transition simulations were performed where only a few specified modes are forced. For example, to explore the role of the "classical" fundamental breakdown (K-type), only three modes are forced, i.e. a primary axisymmetric wave with high amplitude and a pair of oblique waves with very small amplitudes. First, the parameter space was explored using several low resolution simulations, to identify the cases that result in the strongest nonlinear interactions and thus leading to the most rapid breakdown to turbulence. Then, based on the results of this parameter study, highly resolved simulations that proceed deep into turbulent breakdown region were performed.

Figure 7:
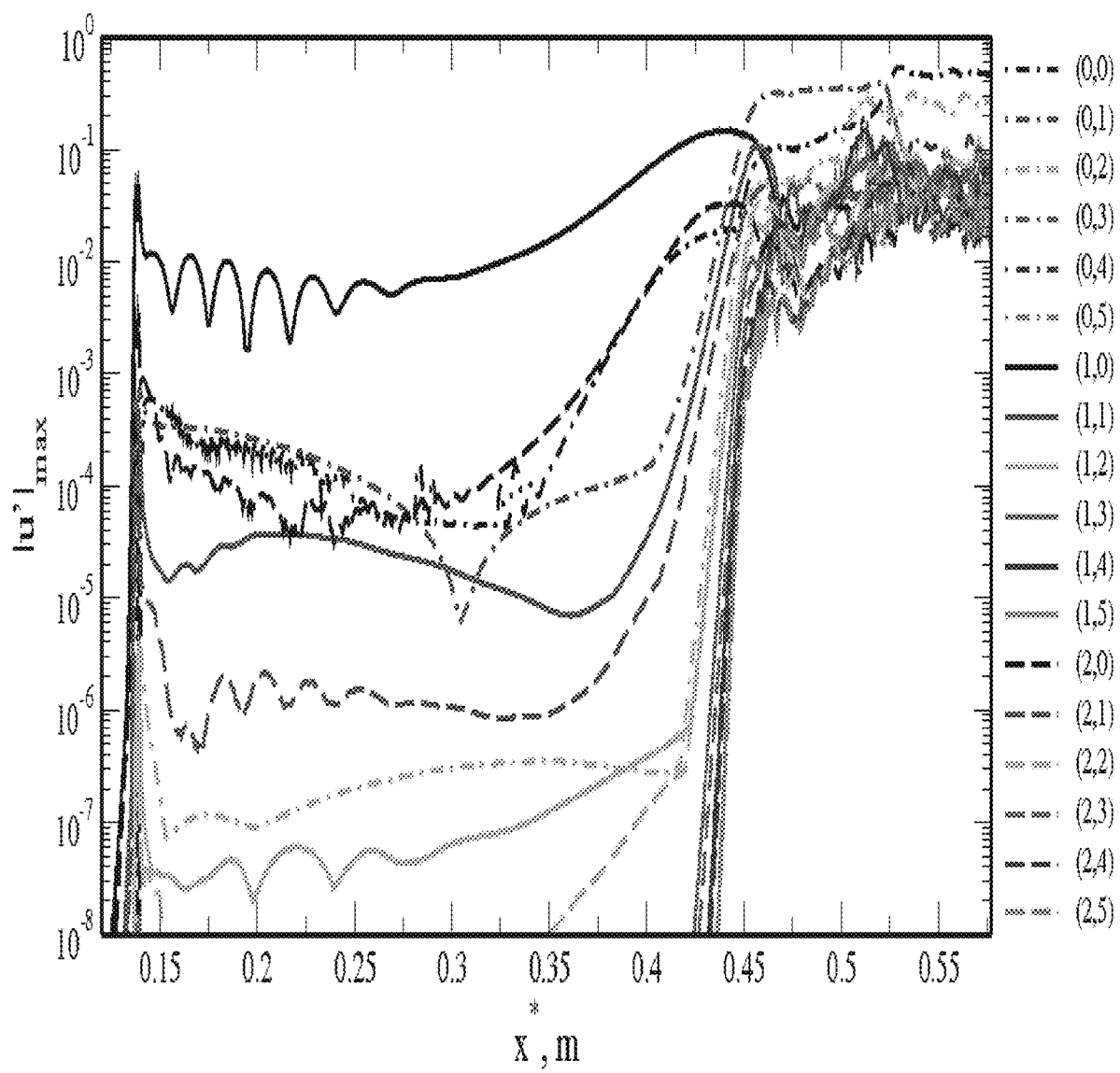
FIG. 7 is a diagram showing streamwise development of the maximum u-velocity disturbance amplitude obtained from the fundamental breakdown simulation. Straight cone at M=6, Re=11 E6 $m^{-1}$.

The downstream development of the wall-normal amplitude maximum of the streamwise velocity disturbance from the fundamental breakdown simulation is presented in FIG. 7. Selected modes that play an important role in the nonlinear stages of the fundamental breakdown are shown. When the axisymmetric primary wave (1, 0) reaches certain amplitude (at $x \square \sim 0.4$ m), resonance sets in and the secondary mode (1, 1) and the steady longitudinal vortex mode (0, 1) start to grow much faster than the primary wave and eventually reach the same amplitude levels as the primary mode (1, 0) at x□~0.45 m. As the steady longitudinal vortex mode (0, 1) starts to grow, it also produces mean flow distortion (mode 0, 0). Higher harmonic modes (2, 0), (2, 1) and (1, 2) are also generated. When the amplitudes of modes (1, 1) and (0, 1) approach the amplitude of the primary mode (1, 0) all higher modes experience rapid streamwise growth and the transition process becomes strongly nonlinear, which is an indication of the onset of the final breakdown to turbulence. As more and more higher steady modes ((0, 2), (0, 3), (0, 4), (0, 5) etc.) are generated, the mean flow deformation (mode 0, 0) increases. Note that in the nonlinear region, the steady longitudinal vortex mode (0, 1) has the highest amplitude (0.45 m<x□<0.57 m). Close to the end of the computational domain the steady longitudinal vortex mode (0, 2) reaches higher amplitudes than (0, 1). However, the steady mode (0, 0) has the highest amplitude indicating a strong mean flow distortion due to transition to turbulence.

Figure 8:
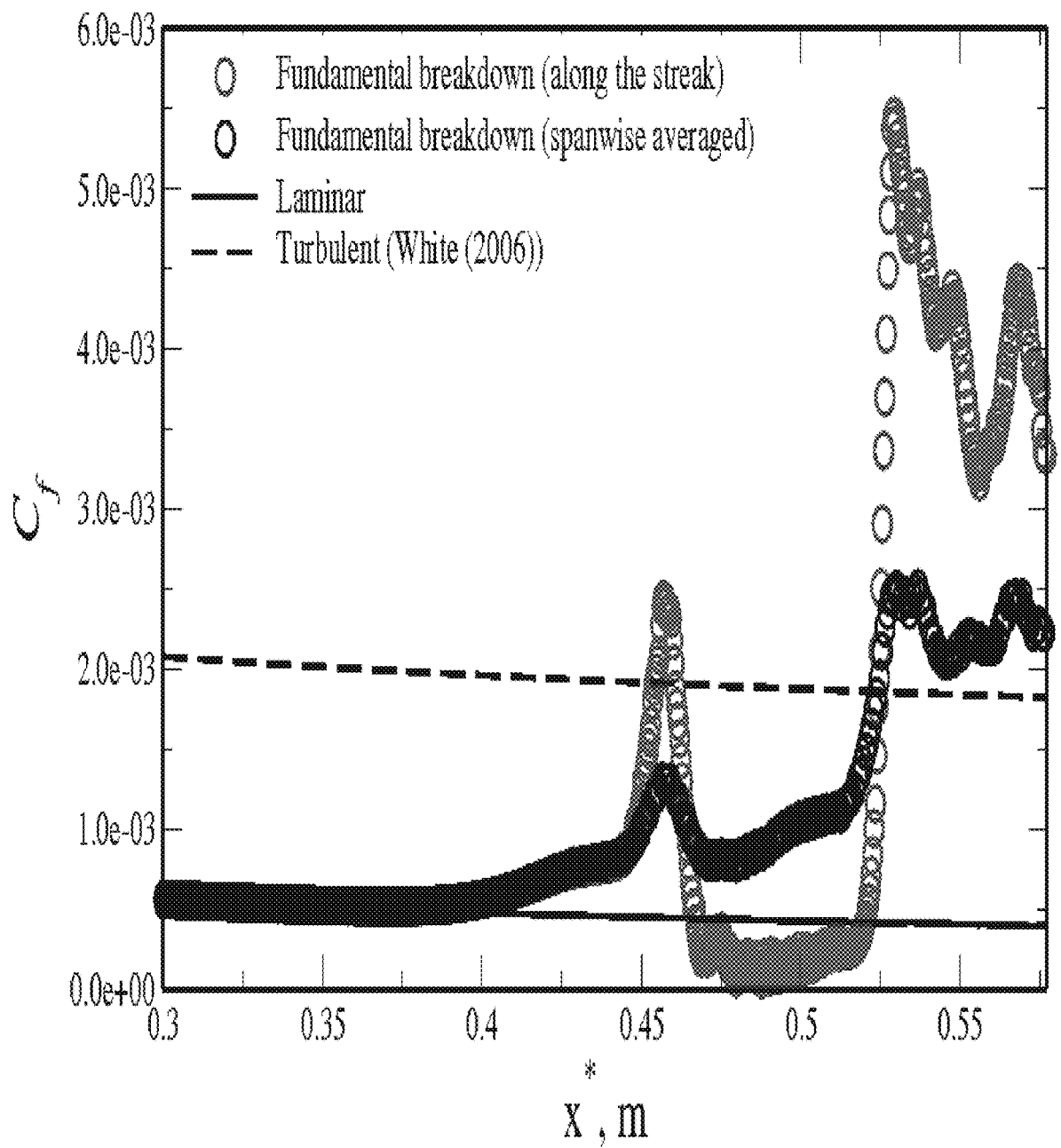
FIG. 8 is a diagram showing time and azimuthal averaged skin friction coefficient from the fundamental breakdown simulation. The initial rise in skin friction is caused by the large amplitude primary wave. This is followed by a dip caused by the nonlinear saturation of the primary wave. Then a steeper rise in skin friction occurs when all higher modes experience nonlinear growth. Straight cone at M=6, Re=11 E6 $m^{-1}$.
Figure 9:
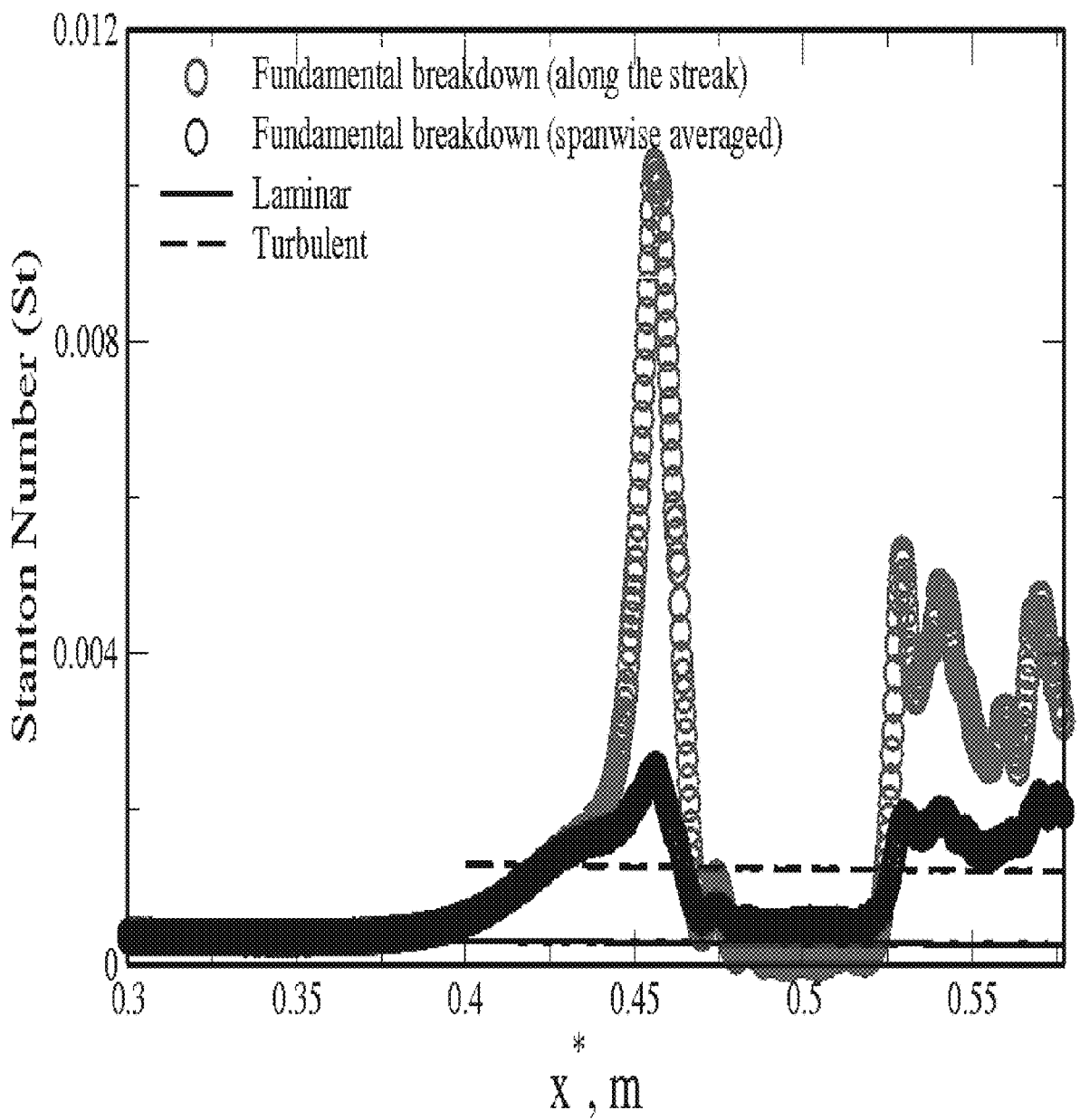
FIG. 9 is a diagram showing time and azimuthal averaged Stanton number from the fundamental breakdown simulation. M=6, Re=11 E6 $m^{-1}$.

The downstream development of the temporally—and azimuthally—averaged skin friction coefficient is shown in FIG. 8. The skin friction initially follows the laminar curve up to x*~0.38 m, and then it increases from the laminar curve towards the turbulent curve. However, farther downstream it unexpectedly drops sharply to almost the laminar value before rising again steeply and eventually overshooting the turbulent skin friction curve. The skin friction curve suggests that the boundary layer is close to a turbulent boundary layer at the end of the computational domain. In FIG. 9, the downstream development of the time- and azimuthal-averaged Stanton number is presented. The Stanton number distribution follows the laminar curve up to x*~0.38 m and then increases towards the turbulent curve. Eventually it overshoots the turbulent curve before dropping almost down to the laminar value. However, downstream it steeply increases again towards the turbulent curve and stays above the estimated turbulent value. The stronger overshoots observed here, even in the transitional stages, at the streamwise location where the first peak appears for skin friction coefficient is very unique and is a direct result of stronger temperature gradients produced by the transition process. Such overshoots during the transitional stages as observed here could lead to localized regions of very large heat transfer. The downstream development of the time-averaged skin friction and Stanton number along the streak is also plotted in FIGS. 8 and 9. The skin friction and Stanton number along the streak have much larger values compared to its azimuthal-averaged values and exhibit massive overshoots over the turbulent values both in the early and late transition region. Note that the particular development of the Stanton number observed here is strongly affected by the isothermal wall boundary condition used in the simulations.

Figure 10:
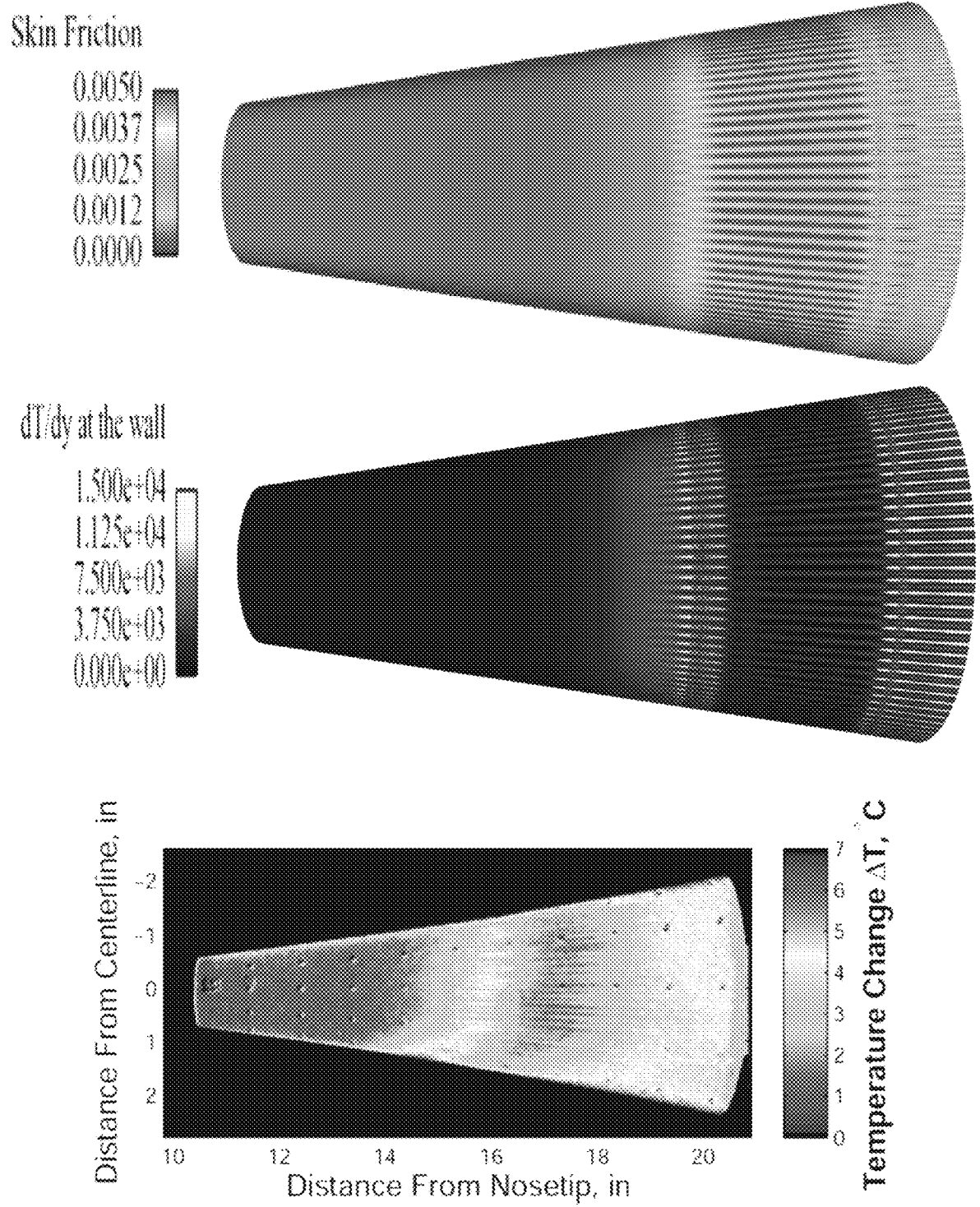
FIG. 10 is a diagram showing time averaged (a) skin friction, (b) wall-normal temperature gradient (dT/dy) at the wall obtained from the fundamental breakdown simulation and (c) flow visualization from the Purdue experiment. Straight cone at M=6, Re=11 E6 $m^{-1}$. The streamwise arranged "hot-cold-hot" streaks look qualitatively similar to the streamwise streaks observed in the Purdue experiments using temperature sensitive paint for a flared cone (Berridge et al. 2010, Ward et al. 2012).

Isocontours of the time-averaged skin friction and wall-normal temperature gradient (dT/dy) at the wall are shown in FIG. 10. Remarkable are the streamwise aligned "hot-cold-hot" streaks, which are a consequence of the large amplitudes reached by the steady longitudinal vortex modes. The steady mode (0, 1) is the first to reach the highest amplitude and it is, therefore, responsible for the first upstream appearing streaks. Downstream, however, these streaks get weaker. As the steady mode (0, 2) reaches the highest amplitude close to the end of the computational domain, there, the azimuthal spacing of the streaks is related to that mode. These streaks look qualitatively similar to the streamwise pattern observed in the Purdue experiments (under quiet-flow conditions) for a flared cone using temperature sensitive paint (see FIG. 10, bottom figure).

Figure 11:
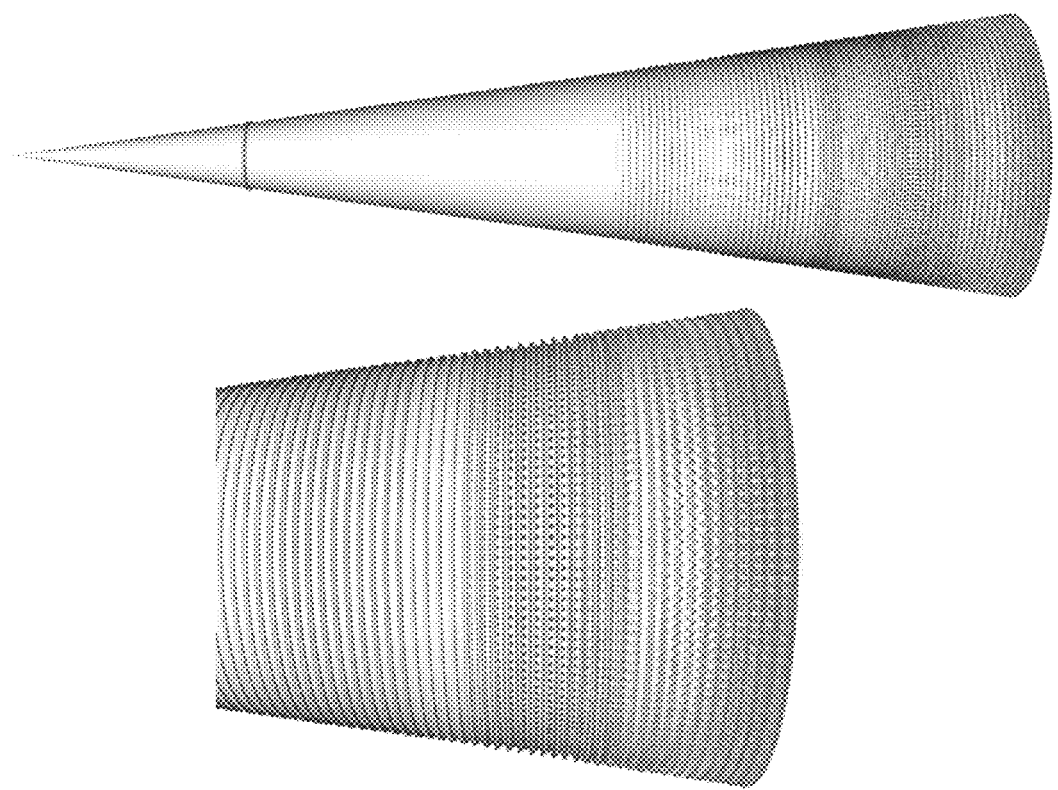
FIG. 11 is a diagram showing visualization of flow structures by isosurface of Q criterion from the fundamental breakdown simulation. The isosurface is colored using the streamwise velocity magnitude. Straight cone at M=6, Re=11 E6 m$^{-1}$.

In FIG. 11 the flow structures from the fundamental breakdown simulation are plotted using the Q-criterion. The flow structures reveal the typical evolution of a K-type breakdown: During the initial stage of the transition process the dominant wave is axisymmetric. Once nonlinear interactions cause the oblique secondary waves to amplify rapidly, the dominant axisymmetric waves become modulated (peak-valley splitting) in the circumferential direction. Eventually, the interaction of the dominant axisymmetric wave and finite amplitude oblique waves leads to the formation of Λ-vortices. The Λ-vortices appear in an aligned pattern because the primary axisymmetric wave and the secondary oblique waves have the same frequency.

Figure 12:
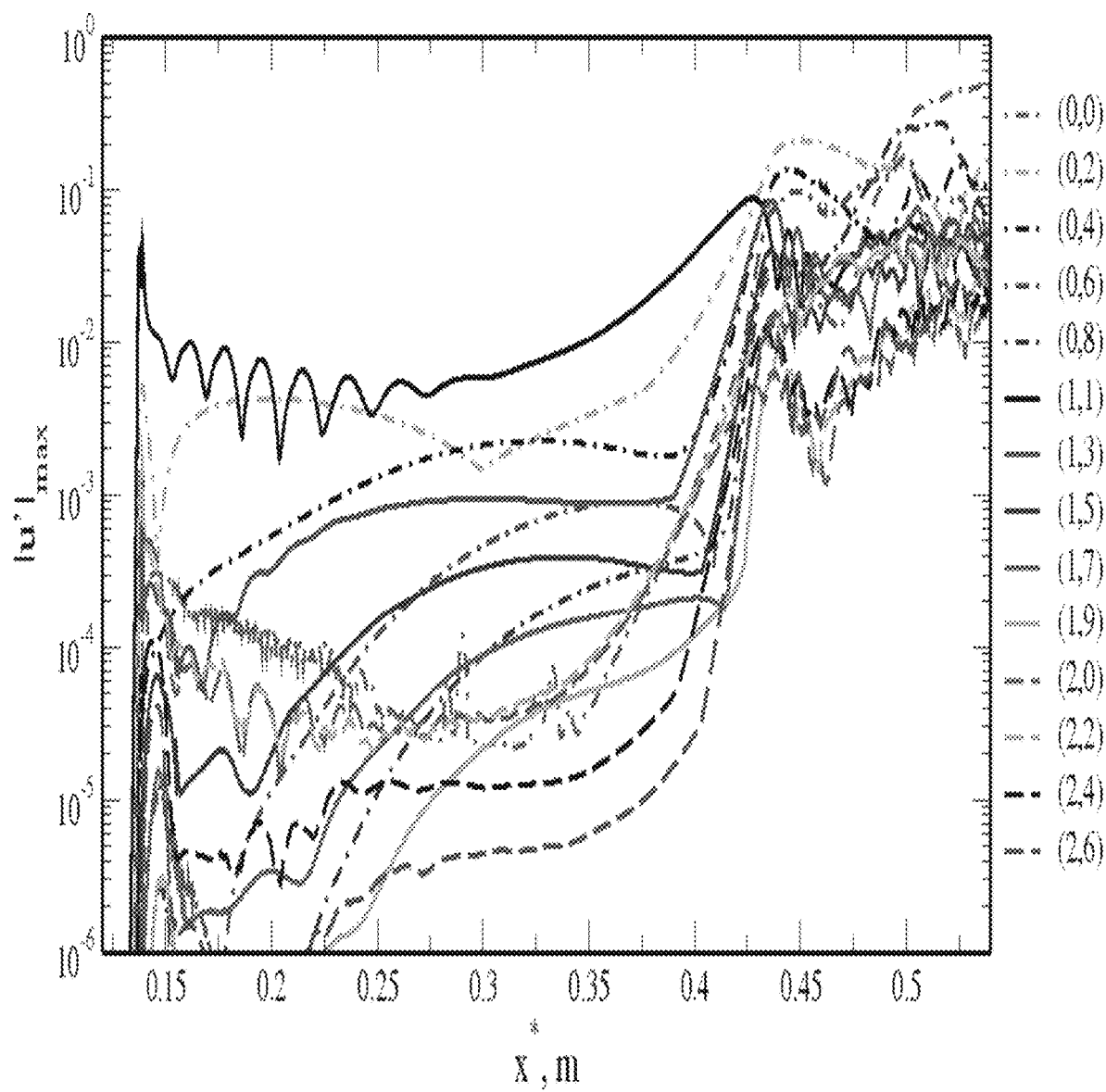
FIG. 12 is a diagram showing streamwise development of the maximum u-velocity disturbance amplitude obtained from the oblique breakdown simulation. Straight cone at M=6, Re=11 E6 m$^{-1}$.

In order to compare with the fundamental breakdown simulations and to find out if oblique breakdown can indeed be a viable path to complete breakdown to turbulence we also performed highly resolved oblique breakdown simulations. The downstream development of the wall-normal amplitude maximum of the streamwise velocity disturbances as obtained from the oblique breakdown simulation is presented in FIG. 12. Shown are the modes that play an important role in the early nonlinear stages of oblique breakdown. Highlighted are the signature modes of oblique breakdown: the initially forced mode (1, 1), the nonlinearly generated steady (longitudinal) modes (0, 2), (0, 4), (0, 6), (0, 8) and the higher modes (1, 3), (1, 5), and (1, 7). In contrast to the "classical" breakdown processes (K-type or N-/H-type), in oblique breakdown, the linear and nonlinear regions cannot clearly be separated. For oblique breakdown, the longitudinal vortex mode (0, 2) and the traveling modes (2, 0) and (2, 2) are generated by the nonlinear interaction of the pair of oblique waves with themselves (first level of nonlinear interaction). The second level of nonlinear interactions produces higher harmonics, e.g., mode (1, 3). Despite being generated by nonlinear interactions, both the steady modes (0, 2), (0, 4) and the higher traveling modes (1, 3) and (1, 5) experience a stronger amplification than the primary wave (1, 1), and eventually reach the same amplitude level. Once, a certain threshold amplitude is reached, all higher modes experienced stronger streamwise growth as the transition process becomes highly nonlinear, which leads to the onset of the final breakdown to turbulence. In the nonlinear regime, the steady longitudinal vortex mode (0, 2) has the highest amplitude (at x*~0.43 m), mode (0, 4) has the second highest amplitude and mode (0, 6) has the third highest. Close to the end of the computational domain, however, it is mode (0, 8) and other higher modes that have the highest amplitude. The transition process seems to be dominated by the generation and final breakdown of these steady longitudinal vortex modes.

The downstream development of the time- and azimuthal-averaged skin friction coefficient is shown in FIG. 13 (left figure). The skin friction initially follows the laminar curve up to x*~0.38 m. This is followed by a small initial rise and then a dip in the skin friction coefficient, similar to the initial rise and drop observed in the fundamental breakdown simulation. As in the case of fundamental breakdown the initial rise in skin friction is related to the high amplitude primary wave. However, the rise is much less pronounced for the present oblique breakdown simulation, which can be explained by the lower amplitude of the primary wave (1, 1), which is not as strongly amplified as the axisymmetric disturbances. Farther downstream, however, the skin friction rises again steeply and reaches the turbulent skin friction curve close to the end of the computational domain. The time- and azimuthal-averaged Stanton number in FIG. 13 (right figure), also shows similar behavior as skin friction coefficient.

Figure 14:
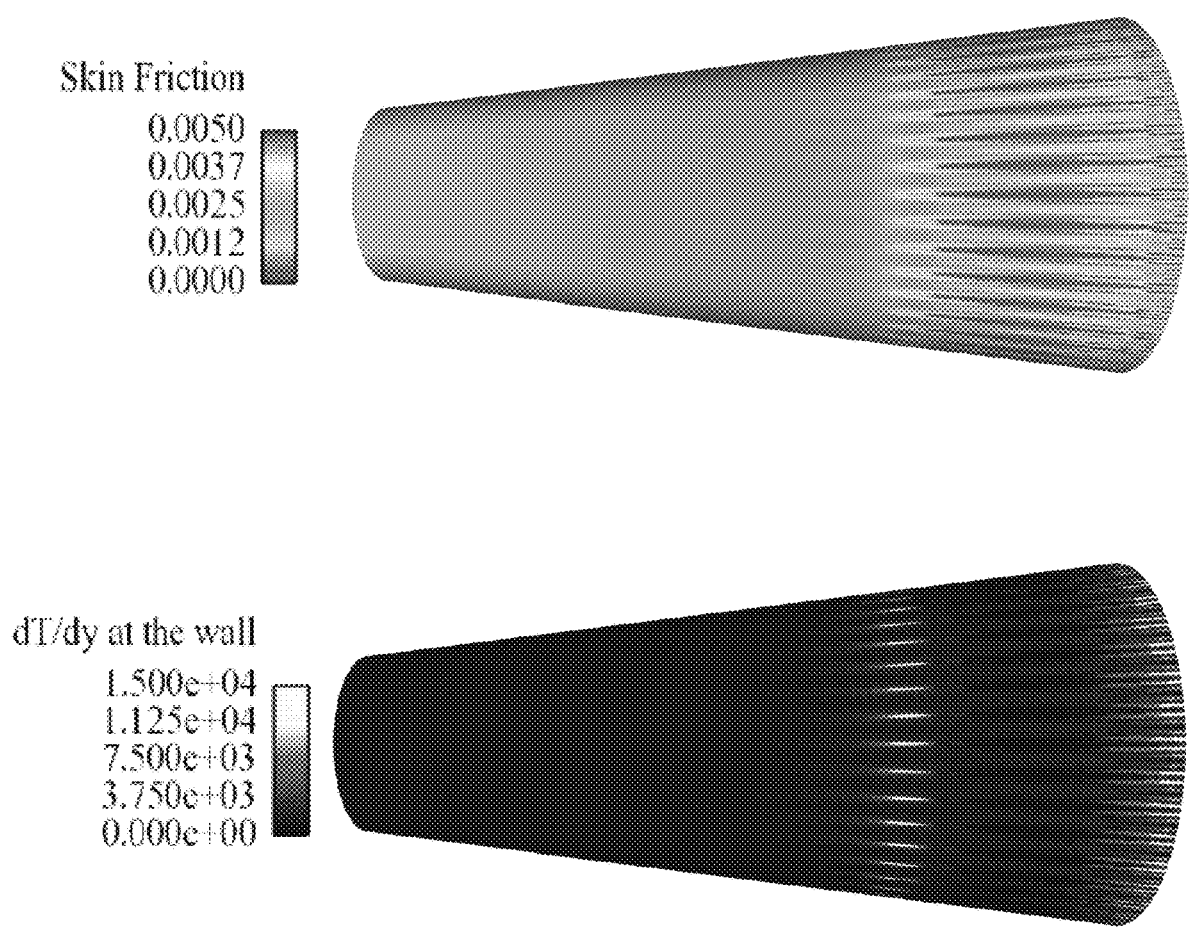
FIG. 14 is a diagram showing time averaged (a) skin friction and (b) wall-normal temperature gradient (dT/dy) at the wall obtained from the oblique breakdown simulation. Straight cone at M=6, Re=11 E6 m$^{-1}$. The streamwise arranged "hot-cold-hot" streaks look qualitatively similar to the streamwise streaks observed in the Purdue experiments using temperature sensitive paint for a flared cone (Berridge et al. 2010, Ward et al. 2012).

In FIG. 14, isocontours of the time-averaged skin friction and wall-normal temperature gradient (dT/dy) at the wall obtained from the oblique breakdown simulation are shown. As for the fundamental breakdown simulation, streamwise arranged streaks were also observed in the oblique breakdown simulation in both skin friction and wall-normal temperature gradient at the wall. However, these streaks look strikingly different from those for the fundamental breakdown. As in the case of fundamental breakdown, these streaks are a consequence of the steady modes (longitudinal vortex). In the case of oblique breakdown, however, the nonlinearly generated steady modes are (0, 2), (0, 4), (0, 6), etc. Therefore the azimuthal spacing of these streaks is different for oblique breakdown compared to the fundamental breakdown scenario. The first upstream appearance of the streaks is due to the steady mode (0, 2). This is also the mode that reaches the highest amplitude first. There are 40 streaks around the circumference of the cone and that spacing is directly related to the (0, 2) mode. Downstream close to the outflow, however, several higher steady modes ((0, 4), (0, 6), etc.) have reached amplitudes that exceed the (0, 2) mode amplitude. Hence, several new streaks that are spaced more closely in the azimuthal direction appear close to the end of the computational domain.

Figure 15:
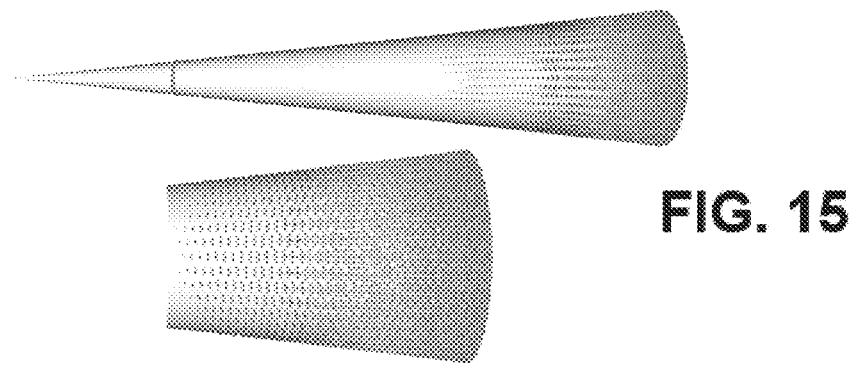
FIG. 15 is a diagram showing visualization of flow structures by isosurface of Q criterion from the oblique breakdown simulation. The isosurface is colored using the streamwise velocity magnitude. Straight cone at M=6, Re=11 E6 m$^{-1}$.

Flow structures from the oblique breakdown simulation are presented in FIG. 15. Upstream close to the nose of the cone, flow structures are visible at the forcing location. Downstream of the forcing location, the linear regime is mainly influenced by the forced modes ((1, 1) and (1,−1)). The flow structures in the linear regime result from the superposition of both waves up to about x□~0.42 m. The checkerboard pattern that is typical for a pair of oblique waves can be clearly seen. Once nonlinear amplitudes are reached, higher modes, especially the vortex modes (0, 2), (0, 4), (0, 6) alter the shape of the flow structures. Finally as the nonlinear interactions become stronger, the flow breaks up into wedge-shaped regions where small-scale flow structures develop (see FIG. 15).

Figure 61:
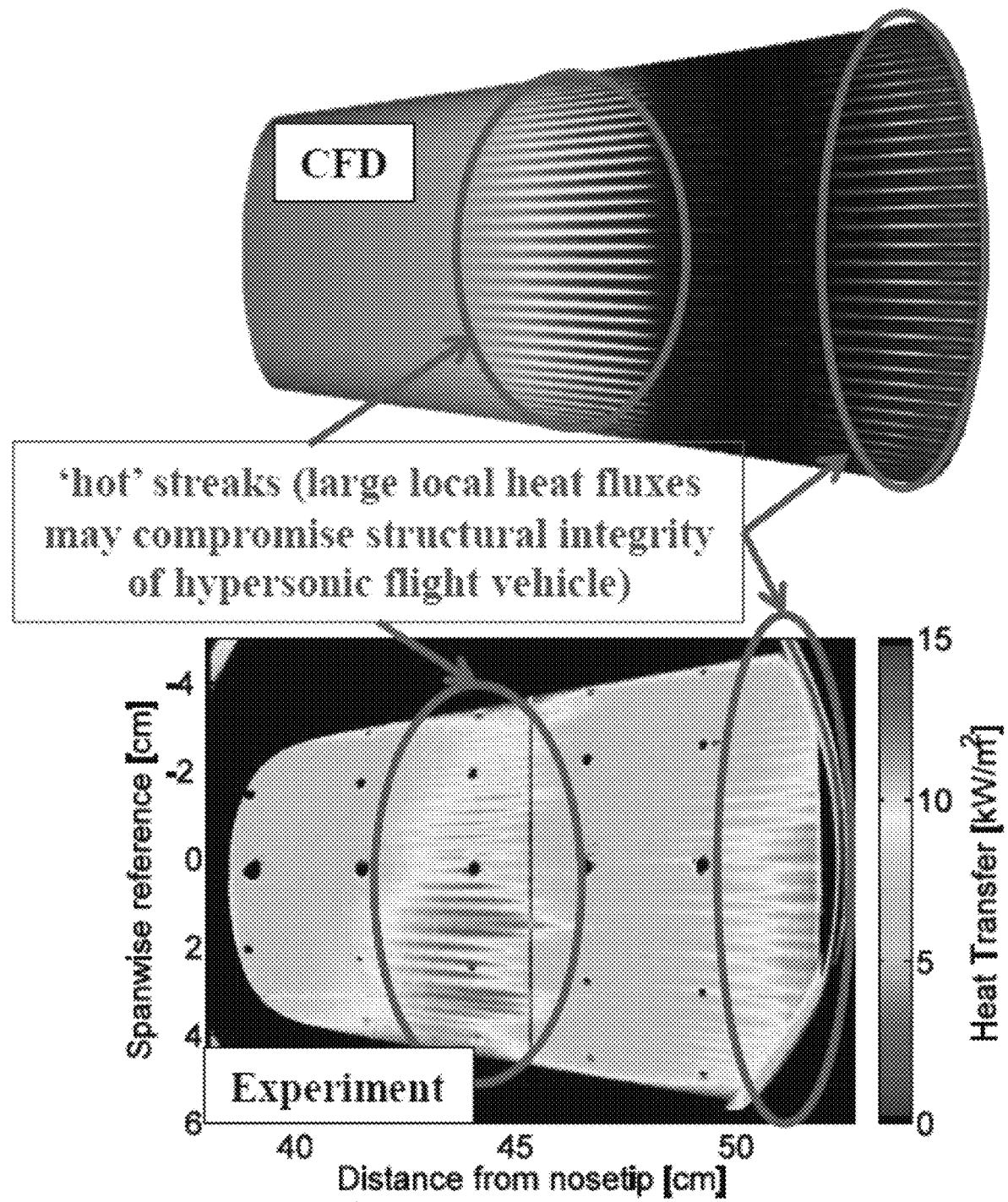
FIG. 61 is a diagram showing observations of 'hot' streaks (in simulations and experiments) which were surprising at first. Experts doubted, believing the streaks were attributable to errors in simulations/experiments. The hot streaks appear, disappear, then reappear at the end (right-side) of cone.

FIG. 61 illustrates 'hot' streaks in simulations and experiments that were surprising at first. Experts doubted the findings, believing the streaks were attributable to errors in simulations/experiments. The hot streaks appear, disappear, then reappear at the end (right-side) of cone.

3.3 Controlled Transition Simulations for a Flared Cone at Mach 6

In order to provide answers to the question if and how the nonlinear regime of transition, and in particular also the transition zone length, is altered by the cone flare, we investigated laminar-turbulent transition for the flared cone studied by Schneider and co-workers in the Mach 6 quiet tunnel at Purdue University.

Figure 16:
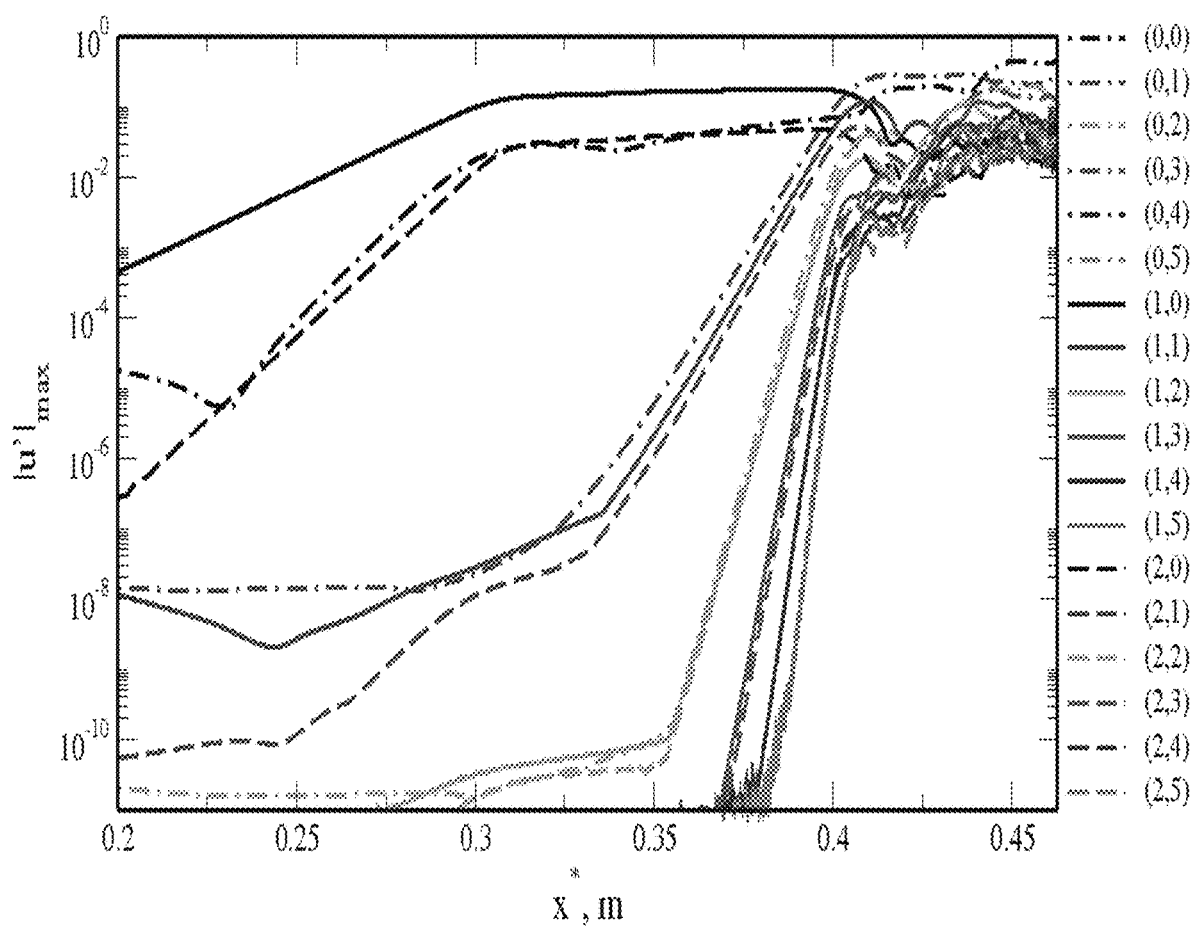
FIG. 16 is a diagram showing streamwise development of the maximum u-velocity disturbance amplitude obtained from the fundamental breakdown simulation. Flared cone at M=6, 10E6 m$^{-1}$.

First, we performed a parameter study in order to find the most strongly resonating oblique wave pair for fundamental resonance. The parameter study for fundamental resonance indicated that oblique waves with an azimuthal mode number kc≈90 were the most strongly resonating oblique waves at x*=0.38 m. Therefore, a highly resolved fundamental breakdown simulation was performed using a pair of secondary waves with azimuthal mode number kc=90. In this simulation, the axisymmetric primary wave (1, 0) with a frequency of f*≈296 kHz was forced with a large amplitude and the oblique secondary waves (1, ±1) were forced at a low amplitude. FIG. 16 shows the spatial development of selected Fourier components of the maximum streamwise velocity disturbance that play an important role in the early nonlinear stage of the fundamental breakdown. As observed before for the straight cone geometry, when the axisymmetric primary wave (1, 0) reaches a certain amplitude, the secondary waves (1, ±1) and the steady longitudinal vortex modes (0, ±1) start to grow faster than the primary wave and eventually reach the same amplitudes as the primary mode (1, 0) at x*≈0.41 m. Higher harmonic modes ((2, 0), (2, ±1), (1, ±2) etc.) are also generated and when the amplitudes of modes (1, ±1) and (0, ±1) approach the amplitude of the primary wave (1, 0) all higher modes experience rapid streamwise growth (at x*≈0.41 m) and the transition process becomes strongly nonlinear. Also, all the modes appear to saturate beyond x*>0.43 m, where they reach the same order of magnitude in amplitude. Note that in the strongly nonlinear region (x*>0.41 m), the steady longitudinal vortex mode (0, ±1) has the highest amplitude. However, close to the end of the computational domain, the steady mode (0, 0) reaches the highest amplitude, indicating a strong mean flow deformation due to transition to turbulence.

With the results provided in FIG. 17 (left figure), certain features of the wall shear development can be explained. The onset of transition is caused by the large amplitude primary axisymmetric wave. Following the initial increase, the value of the skin friction remains almost constant, because the primary wave has now saturated and cannot lift the value of the wall shear any higher by itself. The first peak in the skin friction (at x*≈0.41 m) coincides with the streamwise position where the secondary disturbances (i.e. (1, ±1) and (0, ±1)) reach finite amplitude levels, which in turn cause a mean flow deformation (0, 0). Due to the mean flow deformation, the primary wave starts to decay following its "nonlinear saturation" and the skin friction dips almost back to the laminar value. Following the dip, a much steeper rise in the skin friction occurs as higher modes experience strong nonlinear amplification. As a result of this steep rise, the skin friction overshoots the turbulent skin friction estimate. The skin friction curve suggests that the boundary layer is nearly turbulent at the end of the computational domain. The streamwise development of the temporally- and azimuthally-averaged Stanton number is presented in FIG. 17 (right figure). The downstream development of the Stanton number shows a similar behavior as the skin friction coefficient. However, a stronger overshoot was observed even in the transitional stage, which is a direct result of the strong temperature gradients produced by the transition process. As observed for fundamental resonance in a straight cone boundary layer, such overshoots during the transitional stages could lead to localized regions of very large heat transfer.

Isocontours of the time-averaged wall shear (du/dy) and wall-normal temperature gradient (dT/dy) at the wall are shown in FIG. 18. Streamwise aligned streaks can be observed for both wall shear and wall-normal temperature gradient. These streaks are a consequence of the large amplitude steady longitudinal vortex modes. The steady mode (0, ±1) reaches the highest amplitude in the nonlinear transition regime and it is, therefore, responsible for the streaks. These streaks look qualitatively similar to the streamwise structures observed in the experiments at Purdue University using temperature sensitive paint images. This may be an indication that fundamental resonance or K-type breakdown might have been present in the unforced "natural" transition experiments conducted at Purdue University. Note that such streaks were also observed in our simulations of fundamental breakdown for a straight cone.

Instantaneous flow structures visualized by the Q-vortex identification criterion are plotted in FIG. 19. The flow structures reveal the typical evolution of the fundamental (K-type) breakdown and look similar to the flow structures in the straight cone boundary layer. During the initial linear stage of the transition process the dominant wave is axisymmetric. In the weakly nonlinear transition region, once nonlinear interactions cause the oblique secondary waves to amplify strongly and reach finite amplitudes, the dominant axisymmetric waves become modulated in the circumferential or azimuthal direction (peak-valley splitting). Downstream, in the strongly nonlinear transition region, the interaction of the dominant axisymmetric wave and finite amplitude oblique waves, leads to the formation of aligned Λ-vortices. Eventually these structures breakdown to smaller scales close to the end of the computational domain as the flow starts to become turbulent.

Although for Mach numbers greater than 4, two-dimensional second-mode disturbances are most amplified; low-wave-number second-mode oblique waves can experience similar linear growth. Hence, oblique breakdown of shallow angle waves may also be relevant for a hypersonic cone boundary layer at Mach 6. Therefore, in order to find out if oblique breakdown can indeed be a viable path to complete breakdown to turbulence a highly resolved oblique breakdown simulation was performed. In this simulation, a pair of shallow angle second mode waves with azimuthal mode number kc=20 was forced in order to initiate oblique breakdown. The frequency was chosen by comparing the N-factors for oblique disturbance waves with azimuthal wave number kc=20 for various frequencies. The selected frequency was f□≈296 kHz, because it is linearly the most amplified frequency for the azimuthal mode number kc=20. Note that the dominant second-mode axisymmetric wave (kc=0) and the dominant second-mode oblique wave with kc=20 have about the same frequency.

Figure 20:
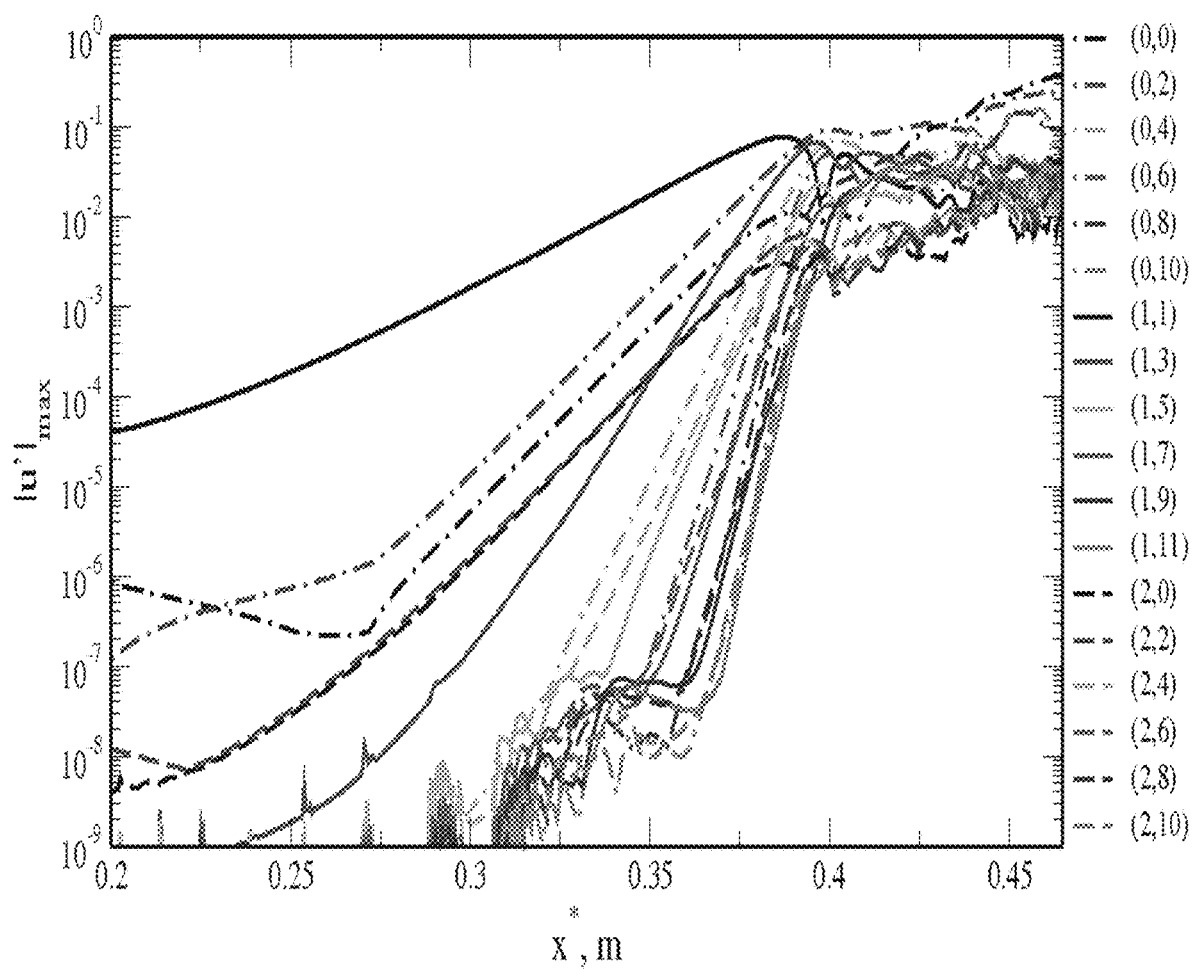
FIG. 20 is a diagram showing streamwise development of the maximum u-velocity disturbance amplitude obtained from the oblique breakdown simulation. Flared cone at M=6, Re=10E6 m$^{-1}$.

The downstream development of the wall-normal amplitude maximum of the streamwise velocity disturbances obtained from the oblique breakdown simulation is presented in FIG. 20. Shown are the modes that play an important role in the early nonlinear stages of oblique breakdown and which are directly created through nonlinear wave interactions. Highlighted are the signature modes of oblique breakdown: the initially forced modes (1, ±1), the nonlinearly generated steady (longitudinal) modes (0, ±2), (0, ±4), (0, ±6), (0, ±8) and the higher modes (1, ±3), (1, ±5), (1, ±7) and (1, ±9). The longitudinal modes (0, ±2) and the traveling modes (2, 0) and (2, ±2) are generated by the nonlinear interaction of the pair of oblique waves with themselves (first level of nonlinear interaction). The second level of nonlinear interactions produces higher harmonics, e.g., mode (1, ±3). Despite being generated by nonlinear interactions, both the steady modes ((0, ±2), (0, ±4), (0, ±6)) and the higher traveling mode (1, ±3) experience a stronger amplification than the primary waves (1, ±1), and eventually reach the same amplitude level. As observed for the straight cone at M=6, once, a certain finite amplitude is reached, all higher modes experienced stronger streamwise growth as the transition process becomes highly nonlinear, which leads to the onset of the final breakdown to turbulence. In the nonlinear regime, the steady longitudinal vortex modes (0, ±2) have the highest amplitude (at x*~0.4 m), modes (0, ±4) have the second highest amplitude and modes (0, ±6) have the third highest. The transition process on the flared cone geometry seems also to be dominated by the generation and final breakdown of these steady longitudinal vortex modes, which were already observed for the straight cone geometry. Near the end of the computational domain, the steady mode (0, 0) has the highest amplitude indicating a strong mean flow distortion due to transition to turbulence.

The downstream development of the time- and azimuthal-averaged skin friction coefficient is shown in FIG. 21 (left figure). The skin friction initially follows the laminar curve up to x*~0.37 m followed by an initial rise and drop as observed in the fundamental breakdown simulation as well as or the oblique breakdown observed for the straight cone. As in the case of fundamental breakdown the initial rise in skin friction is related to the high-amplitude primary wave. However, the rise is much less pronounced for the present oblique breakdown simulation, which can be explained by the lower growth rate and therefore the lower amplitude of the primary waves (1, ±1), which are not as strongly amplified as the axisymmetric disturbances. Similarly to the oblique breakdown scenario on the straight cone the skin friction rises steeply farther downstream and reaches the turbulent skin friction curve close to the end of the computational domain. The streamwise development of the temporally—and azimuthally—averaged Stanton number is presented in FIG. 21 (right figure). Again, the Stanton number development shows a similar behavior as the skin friction coefficient. However, the first peak in the Stanton number development in the transition region is stronger than the first peak observed for the skin friction coefficient. This is due to the stronger temperature gradients produced during the transition process. Eventually the Stanton number from the simulation overshoots the estimated turbulent value near the end of the computational domain.

In FIG. 22, isocontours of the time-averaged wall shear (du/dy) and wall-normal temperature gradient (dT/dy) at the wall obtained from the oblique breakdown simulation are shown. As in the case of fundamental breakdown, streamwise streaks are also observed in the oblique breakdown simulation in both wall shear and wall-normal temperature gradient at the wall. However, these streaks look strikingly different from those for the fundamental breakdown. As in the case of fundamental breakdown, these streaks are a consequence of the steady modes (longitudinal vortex modes). In the case of oblique breakdown, however, the nonlinearly generated steady modes are (0, ±2), (0, ±4), (0, ±6), etc. Therefore the azimuthal spacing of these streaks is different for oblique breakdown compared to the fundamental breakdown. The first upstream appearance of the streaks is due to the steady modes (0, ±2), as this mode reaches the highest amplitude first. There are forty streaks around the circumference of the cone and the spacing is directly related to the (0, ±2) modes. Downstream close to the outflow, however, several higher steady modes ((0, ±4), (0, ±6), etc.) have reached higher amplitude levels. Hence, several new streaks that are spaced more closely in the azimuthal direction appear close to the end of the computational domain.

Figure 23:
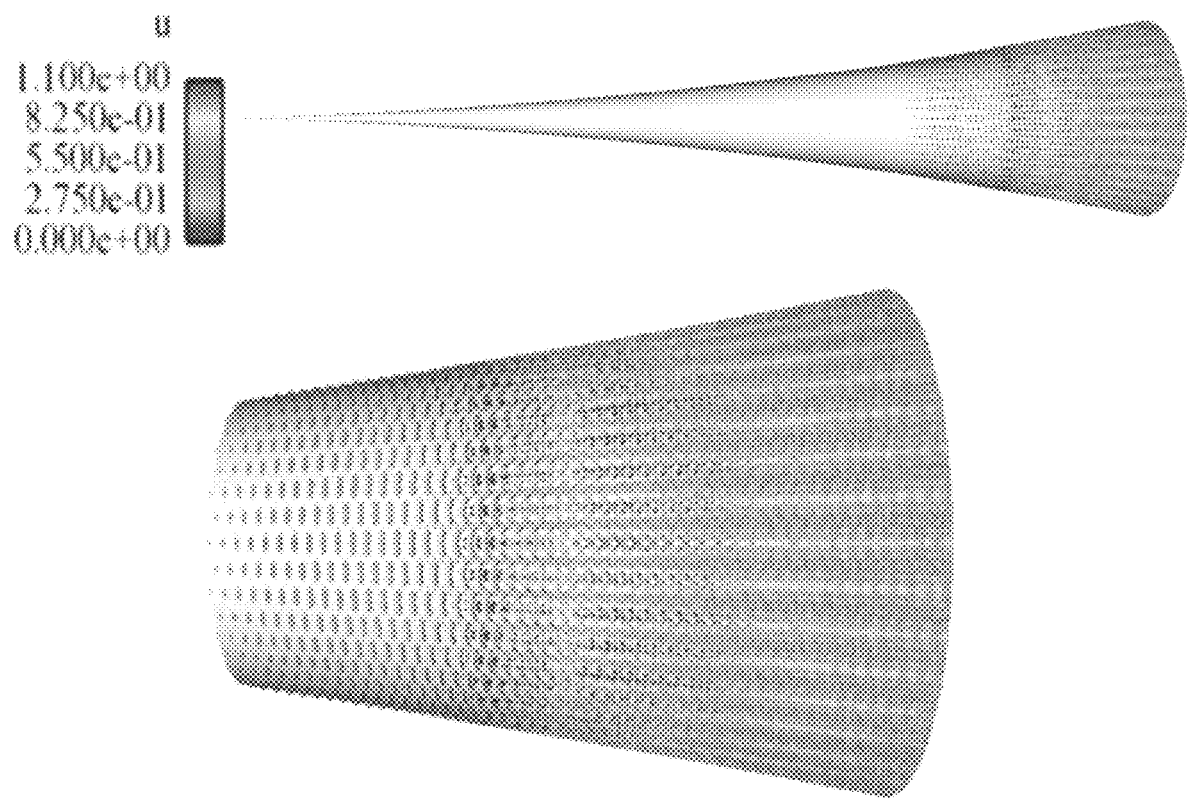
FIG. 23 is a diagram showing visualization of flow structures by isosurface of Q criterion from the oblique breakdown simulation. The isosurface is colored using the streamwise velocity magnitude. Flared cone at M=6, Re=10E6 m$^{-1}$.
Figure 24A:
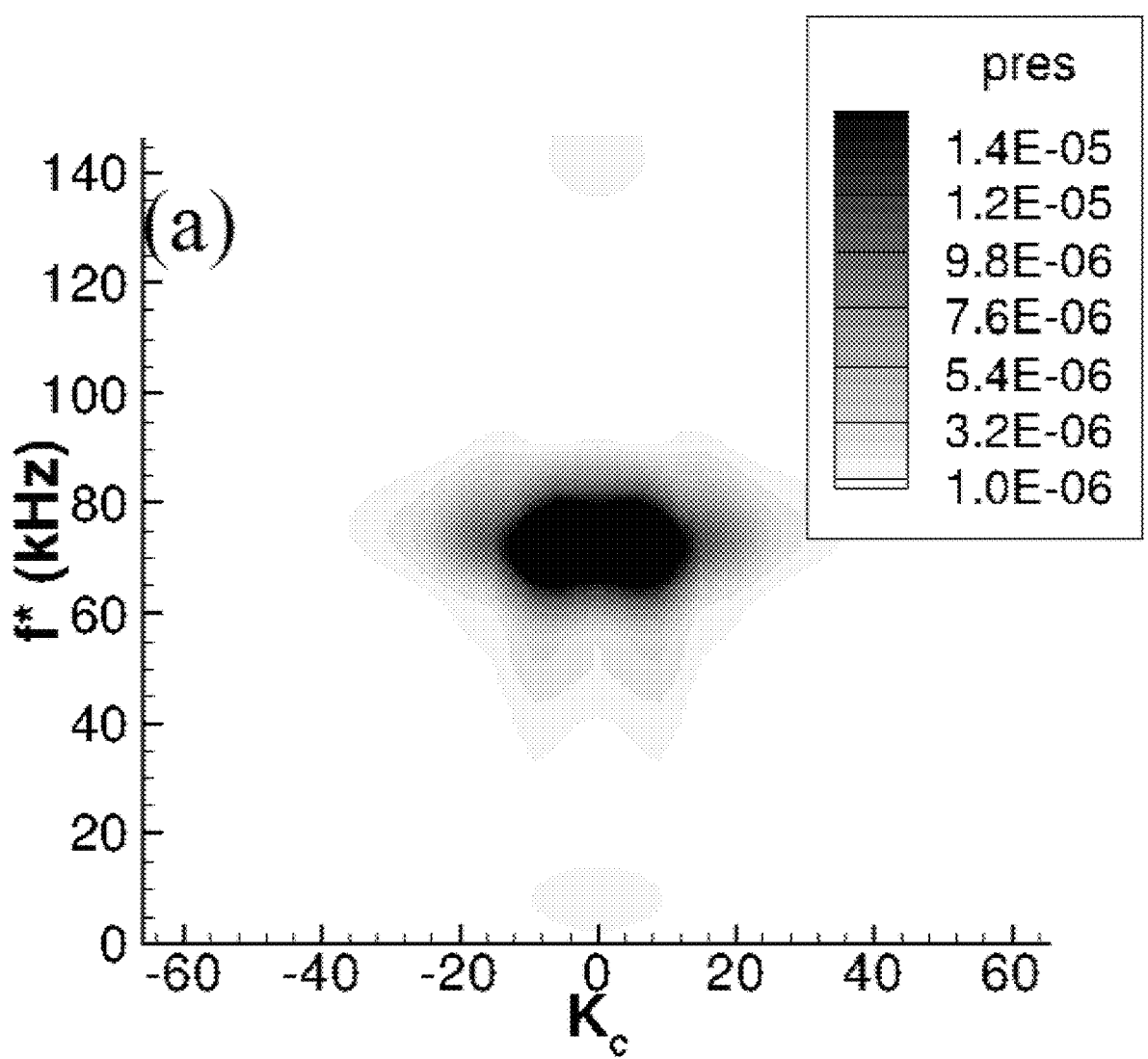
FIG. 24A-D is a diagram showing wall-pressure disturbance spectrums of the high-amplitude wave packet at locations farther downstream. Nonlinear interactions begin occurring and become quite strong by the final downstream position. The modes with the most sudden increase in amplitude, an indicator of strong nonlinear growth, are higher azimuthal harmonics in the band of amplified frequencies. Sharp cone, M=7.95, T=53.35 K, Re=3,333,333. a) x*=1.25 m ($R_x$=2421) b) x*=1.37 m ($R_x$=2535) c) x*=1.61 m ($R_x$=2749) d) x*=1.85 m ($R_x$=2947).
Figure 24B:
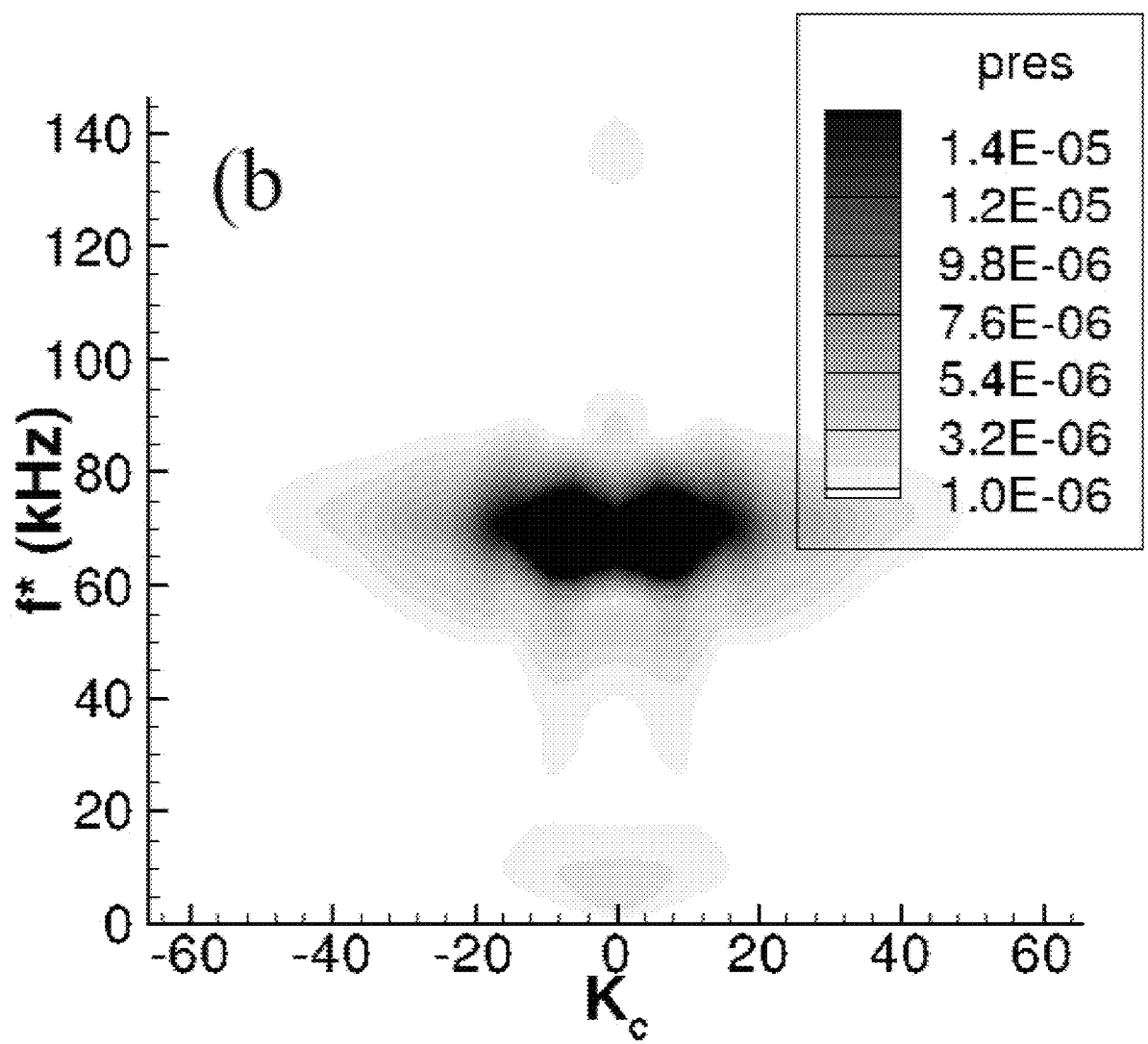
Figure 24C:
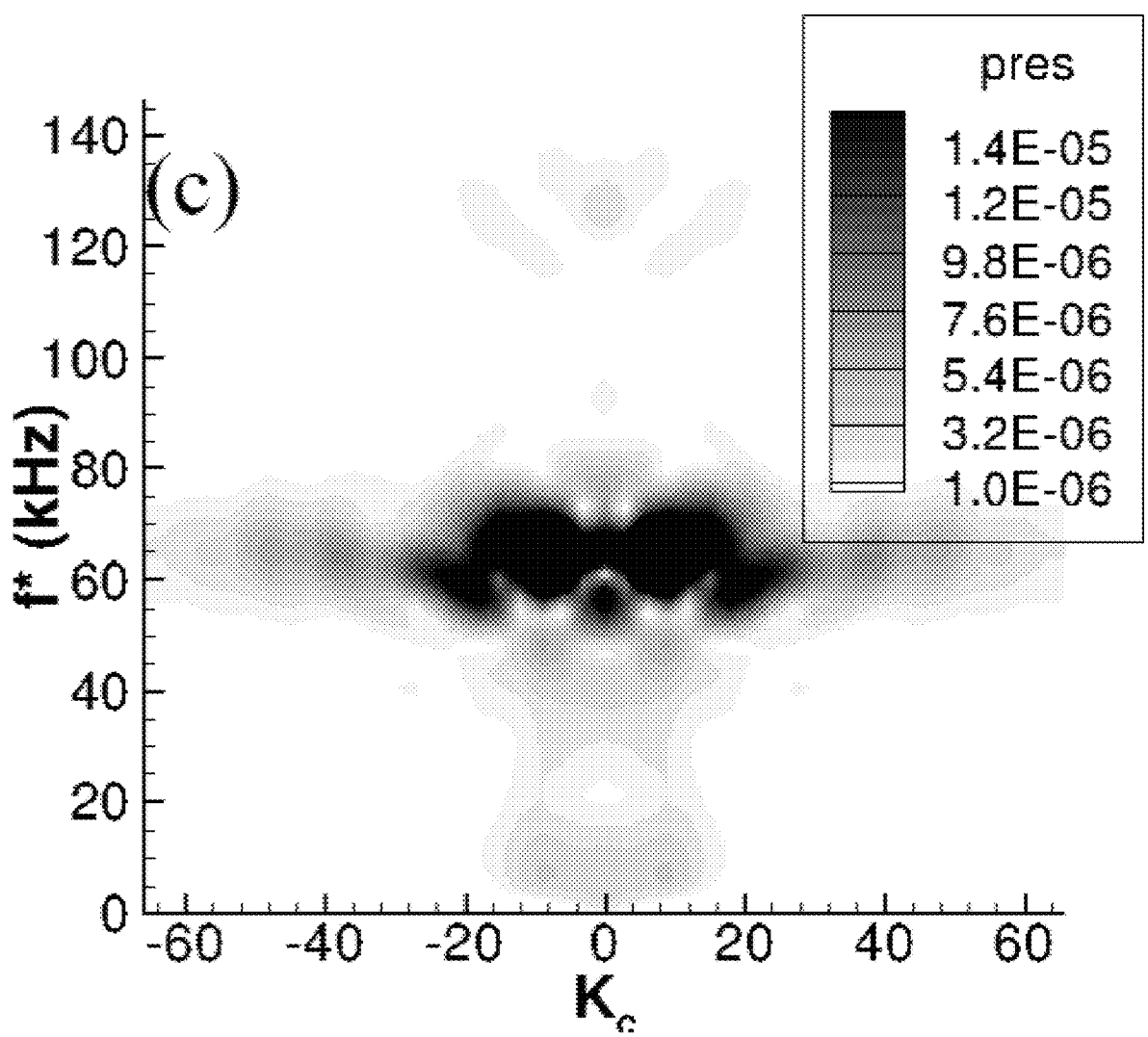
Figure 24D:
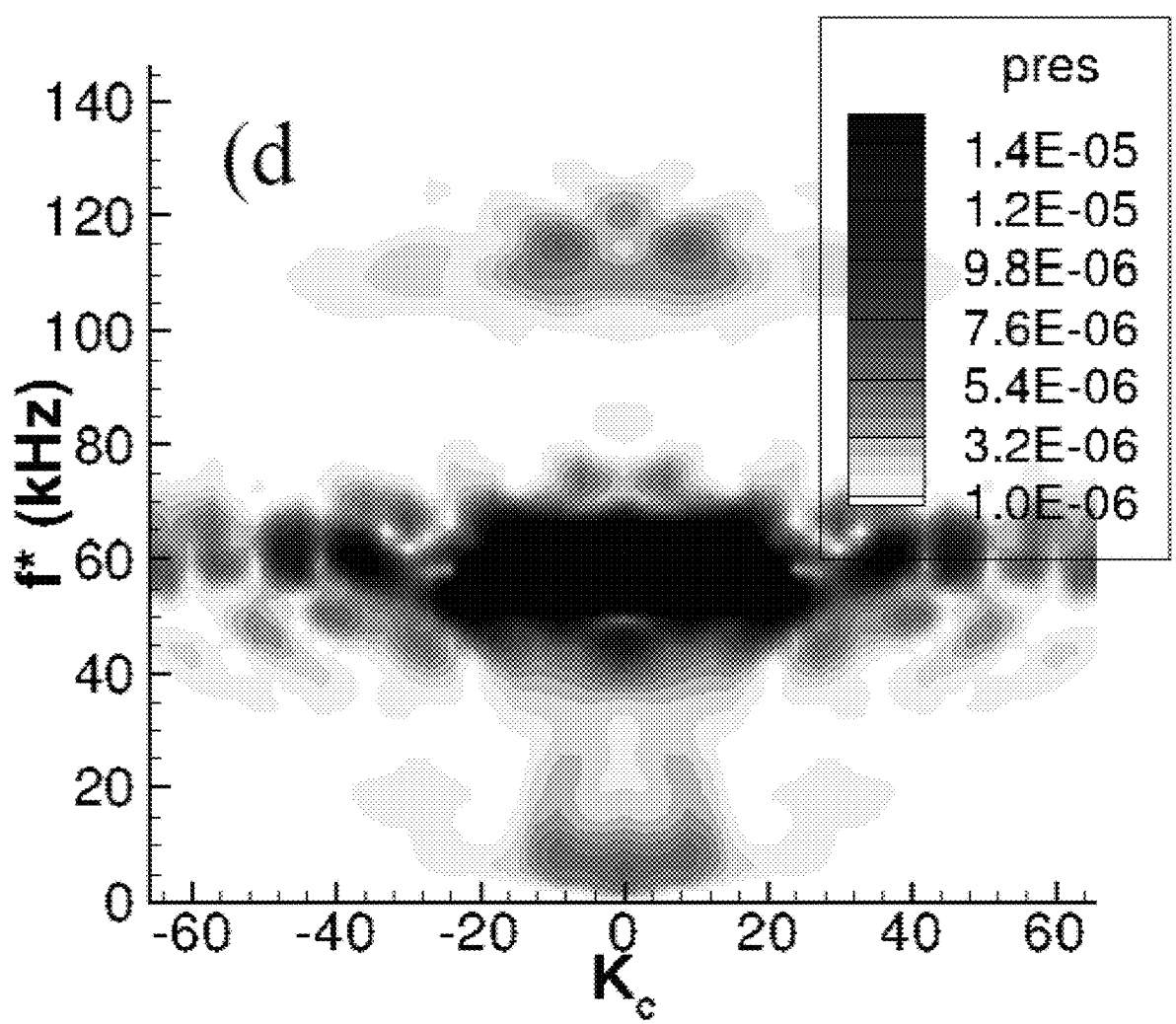

Flow structures from the oblique breakdown simulation are visualized utilizing isosurfaces of the Q-criterion on the whole cone (FIG. 23). Downstream of the forcing location, the linear transition regime is mainly influenced by the forced modes, (1, 1) and (1, −1). The flow structures in the linear regime result from the superposition of both waves up to about x*~0.38 m. The checkerboard pattern, that is typical for oblique breakdown can be clearly seen in FIG. 23 (bottom figure). Once nonlinear amplitude levels are reached, higher modes, especially the vortex modes (0, ±2), (0, ±4) etc. alter the shape of the flow structures. Finally as the nonlinear interactions become stronger, the flow breaks up into wedge-shaped regions, where small-scale flow structures develop (see FIG. 22, bottom) and transition to turbulence occurs.

By comparing the simulations performed for the flared and the straight cone, it became apparent that the transition zones, that is where the flow is neither laminar nor turbulent, showed similar features. The development of the wall shear and the development of the surface heat transfer are also qualitatively similar. Therefore, we speculate that although transition onset for the flared cone is located farther upstream when compared to the straight cone (due to stronger linear growth rates and therefore larger N-factors in the case of the flared cone), the transition zone will be of similar length for both straight and flared cones, at least if the controlled transition simulations are considered. Since, the transition zone length covers a significant downstream distance; we concluded that linear N-factor calculations are not sufficient to estimate the location where the flow becomes fully turbulent in experiments.

3.4 Wave Packet Simulations for a Circular Cone Boundary Layer at Mach 8

The numerical simulations discussed in the following were performed for the conditions of the Stetson Mach 8 experiments (Stetson et al. 1983), which are summarized in Table 1.

TABLE 1

| Flow properties | | |
|---|---|---|
| | before the shock | after the shock |
| Mach number | 8.0 | 6.8 |
| Temperature | 53.35 K | 71.2 K |
| Pressure | 165.5 Pa | 415.5 Pa |

In order to investigate which nonlinear mode interactions become dominant in a broad-spectrum disturbance environment, as before for the M=6 case, a wave packet was introduced into the boundary layer over a sharp circular cone. The wave packet was created by a short duration pulse disturbance in the wall normal velocity from a small hole in the cone surface. The impulse type disturbance in time and space creates a broad spectrum of frequencies and azimuthal modes (wave angles). These disturbances travel downstream and grow or decay according to linear theory when the disturbance amplitudes are small. When the amplitudes have grown large enough, nonlinear interactions begin occurring. No particular nonlinear mechanism is forced, and thus the wave packet can be considered as a model for "natural" transition that would occur with a broad spectrum of disturbances.

The computational domain extends in the streamwise direction from $x^*\approx 0.11$ m to $x^*\approx 1.86$ m ($718 < R_x < 2957$), not including the buffer zone applied at the outflow boundary. The azimuthal extent of the domain is ⅓ of the cone's circumference. Several different simulations with varying initial amplitudes were conducted. For brevity, only results for a wave packet forced with an initial amplitude of 1% of the freestream velocity are shown. This forcing amplitude is sufficiently small in order to allow for an initially linear development of the wave packet. However, farther downstream, close to the end of the computational domain, nonlinear interactions significantly alter the shape of the wave packet.

FIG. 24 displays wall pressure disturbance spectra further downstream at $x^*=1.25$ m ($R_x=2421$), $x^*=1.37$ m ($R_x=2535$), $x^*=1.61$ m ($R_x=2749$), and $x^*=1.85$ m ($R_x=2947$). The disturbances grow as they travel downstream and eventually reach amplitudes that initiate strong nonlinear interactions. The spectrum initially broadens as the disturbances spread to higher azimuthal modes. The disturbances also seem to spread to slightly lower frequencies, which create two "legs" extending downward. At $x^*=1.37$ m, the spectrum continues to broaden and a low frequency, 2D component appears. At the next location, $x^*=1.61$ m, a higher harmonic of the 2D disturbance component can be observed and the disturbances continue to spread to higher azimuthal modes near the most amplified frequency. Notably absent is any evidence of subharmonic resonance, which was reported in the Mach 6 experiments by Bountin et al. (2008) and in the wave packet simulations by Sivasubramanian and Fasel (2010).

The generation of higher harmonics (both frequency, and azimuthal) is a clear indication of strong nonlinear interactions. The strongest nonlinear interaction, identified by the modes, which show sharp increase in growth from one downstream position to the next, is the spreading of disturbances to higher azimuthal modes in a relatively narrow band of frequencies. This feature of the spectrum suggests that fundamental resonance between 2D and 3D disturbance waves may be the dominant nonlinear interaction for these flow conditions.

Figure 25:
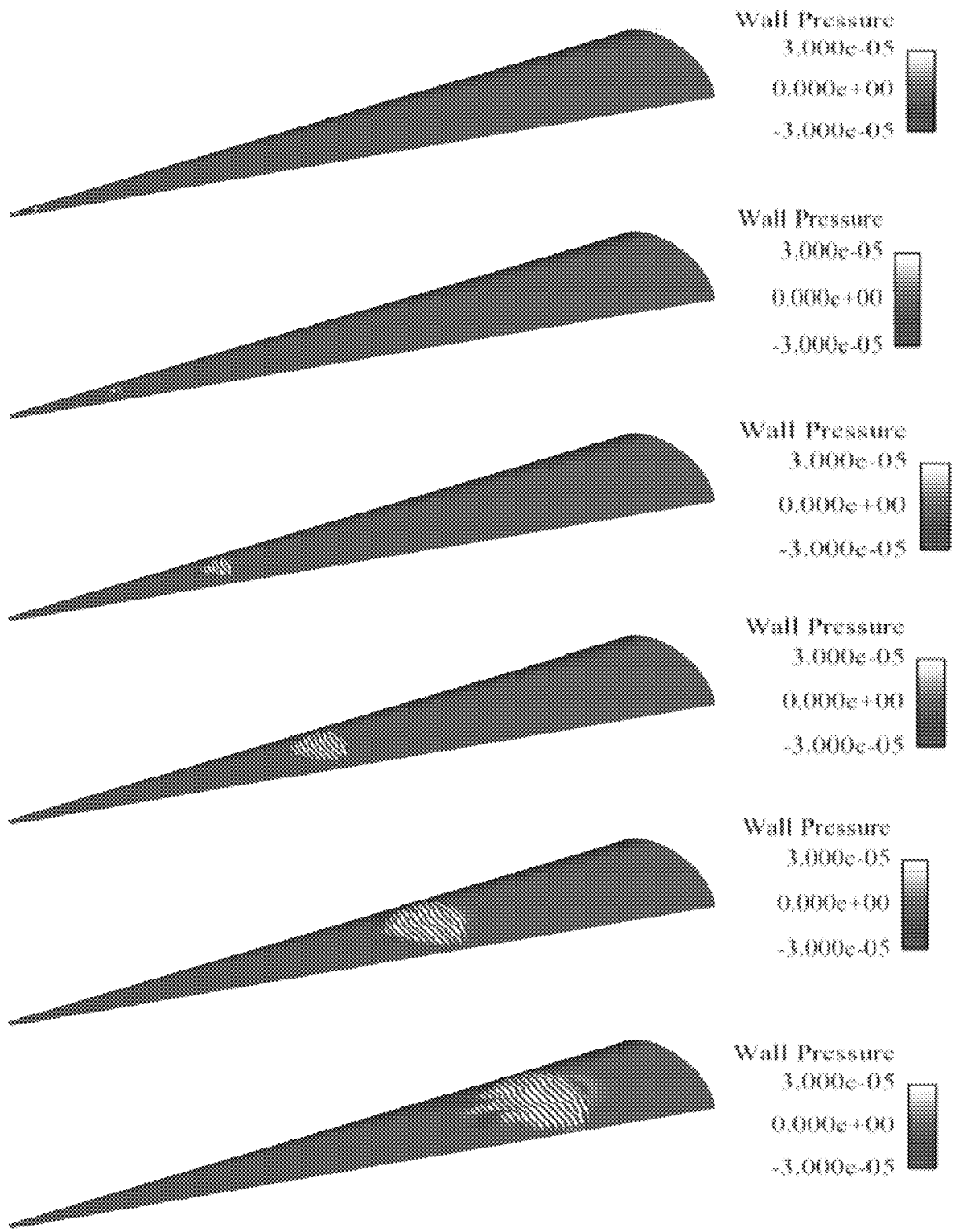
FIG. 25 is a diagram showing instantaneous contours of wall pressure disturbances in the high-amplitude wave packet on the cone surface illustrating the development of the physical structure of the wave packet and the extent to which it spreads by the time it has reached the end of the computational domain. Sharp cone, M=7.95, T=53.35 K, Re=3,333,333.

The downstream development of the wave packet on the cone surface (FIG. 25) is shown by isocontours of wall pressure disturbance. The initial structure of the wave packet is two-dimensional in the center with lower amplitude oblique wave components evident near the azimuthal edges and especially in the tail. The packet spreads in the azimuthal direction and elongates in the streamwise direction as it travels downstream. As the wave packet reaches downstream locations where nonlinear interactions start occurring, it becomes increasingly modulated in the spanwise direction. The wavelength of the spanwise modulation is rather large, but near the end of the computational domain there is evidence of shorter azimuthal-wavelength modulations of the main two-dimensional wave fronts. These are most likely due to the side peaks at high wave numbers evident in the disturbance spectrums.

Figure 26:
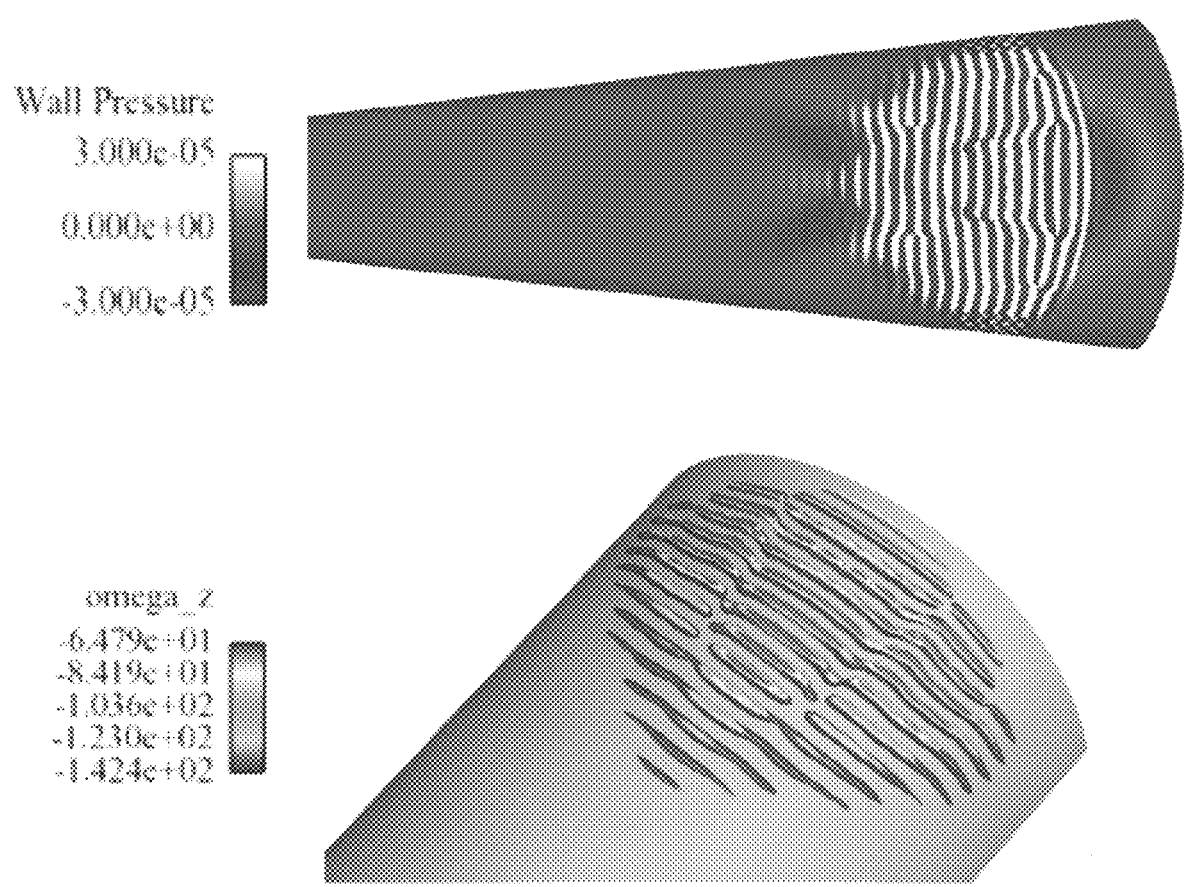
FIG. 26 is a diagram showing (on the left side) a detailed view of the wall pressure disturbances near the downstream end of the computational domain. On the right side, isosurfaces of Q=50 colored with contours of spanwise vorticity. The two-dimensional structure of the wave packet is strongly modulated in the azimuthal direction. Clearly evident in the vorticity contours are the shorter azimuthal wavelength modulations of the structure near the front of the wave packet. Sharp cone, M=7.95, T=53.35 K, Re=3,333, 333.

Detailed views of the late-stage structure of the wave packet on the cone surface are presented in FIG. 26. Shown are wall pressure contours (left) and vortical structures in the wave packet identified with isosurfaces of Q=50 (right) near the end of the computational domain. The Q-surfaces are colored with contours of azimuthal vorticity. The general structure of the packet is similar regardless of the disturbance quantity. The short wave length spanwise modulations are clearly evident in the vorticity contours.

3.5 Controlled Transition Simulations for Boundary Layers on Sharp Circular Cones at Mach 8

Spatial and temporal DNS of controlled transition were performed for the circular cone at Mach 8. The wave packet simulations revealed the possibility of fundamental resonance of second mode waves. Therefore, fundamental resonance was thoroughly investigated using both temporal and spatial DNS. Additionally, oblique breakdown of second mode waves, which was shown to be a viable transition mechanism at Mach 8 by Husmeier (2008), was further investigated using new temporal and spatial simulations.

3.5.1 Temporal DNS

A series of temporal DNS were performed investigating oblique breakdown and fundamental breakdown using the mean flow conditions at the cone location $R_x=2024$. For all breakdown scenarios, parameter studies were performed to optimally select disturbance waves for the investigated breakdown mechanisms.

For the setup of a fundamental breakdown (Klebanoff-type) simulation the axisymmetric mode with the strongest temporal growth ($\alpha_r$=465.6, $\omega_r$=429) was chosen to be the primary wave (mode 1,0). Several simulations were performed to find the azimuthal wave number of the secondary oblique wave (mode 1,1), which exhibits the strongest resonance growth. The results of this study are summarized in FIG. 27 (left figure), which shows the growth rate before and after resonance of mode (1,1) for azimuthal wave numbers between 10 and 80. Based on these results, $k_c$=50 was chosen as the azimuthal wave number of the secondary disturbance wave. Highly resolved simulations up to the late stages of transition were performed by forcing modes (1,0) and (1,1) with amplitudes of $10^{-4}$. Although both waves are initially forced with the same amplitude, these simulations can still be considered to represent a classical fundamental resonance since due to the strong linear growth of mode (1,0), at the point of resonance mode (1,1) is at significantly lower amplitude than mode (1,0).

Figure 27A:
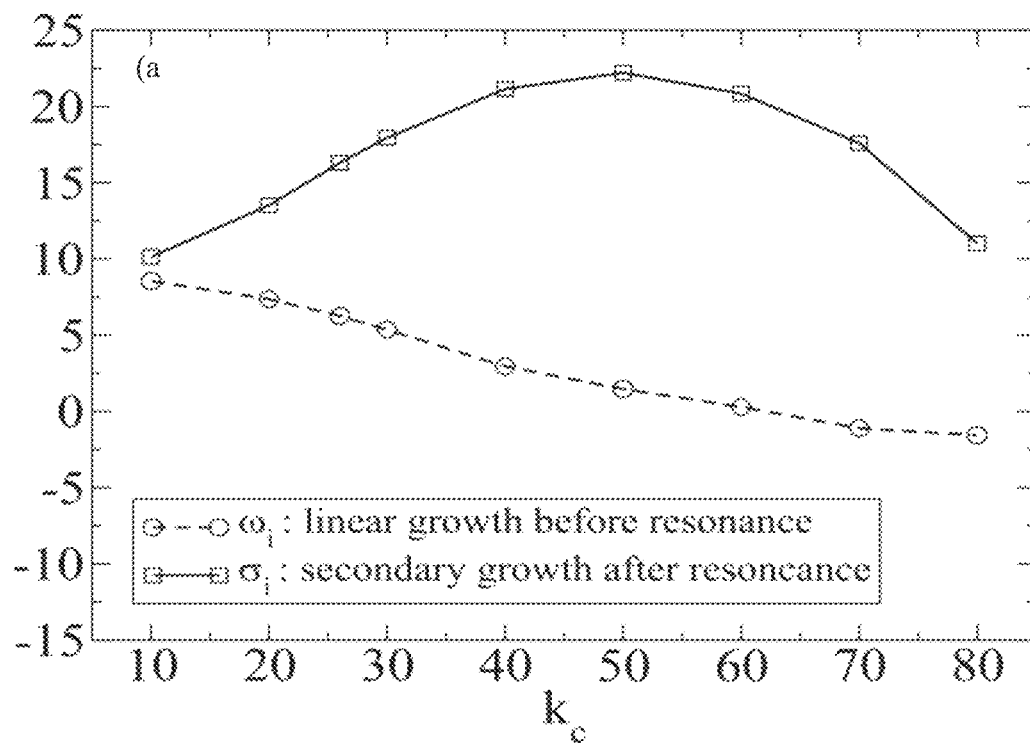
Figure 27B:
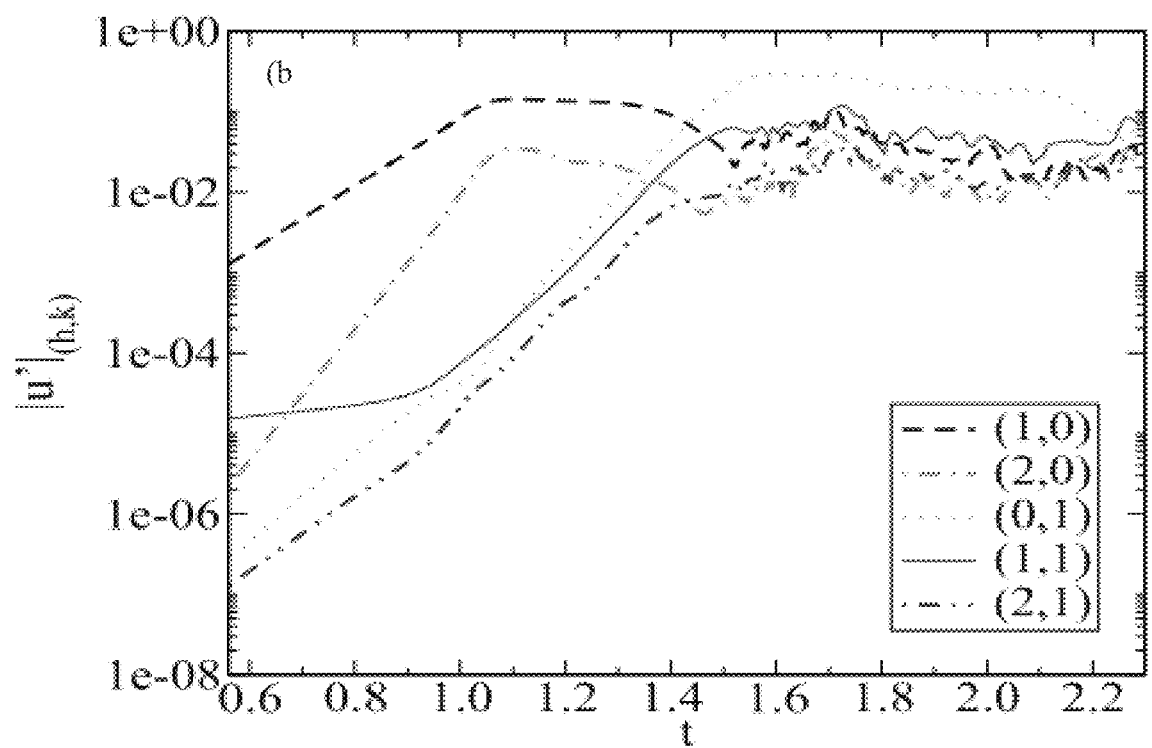
Figure 28:
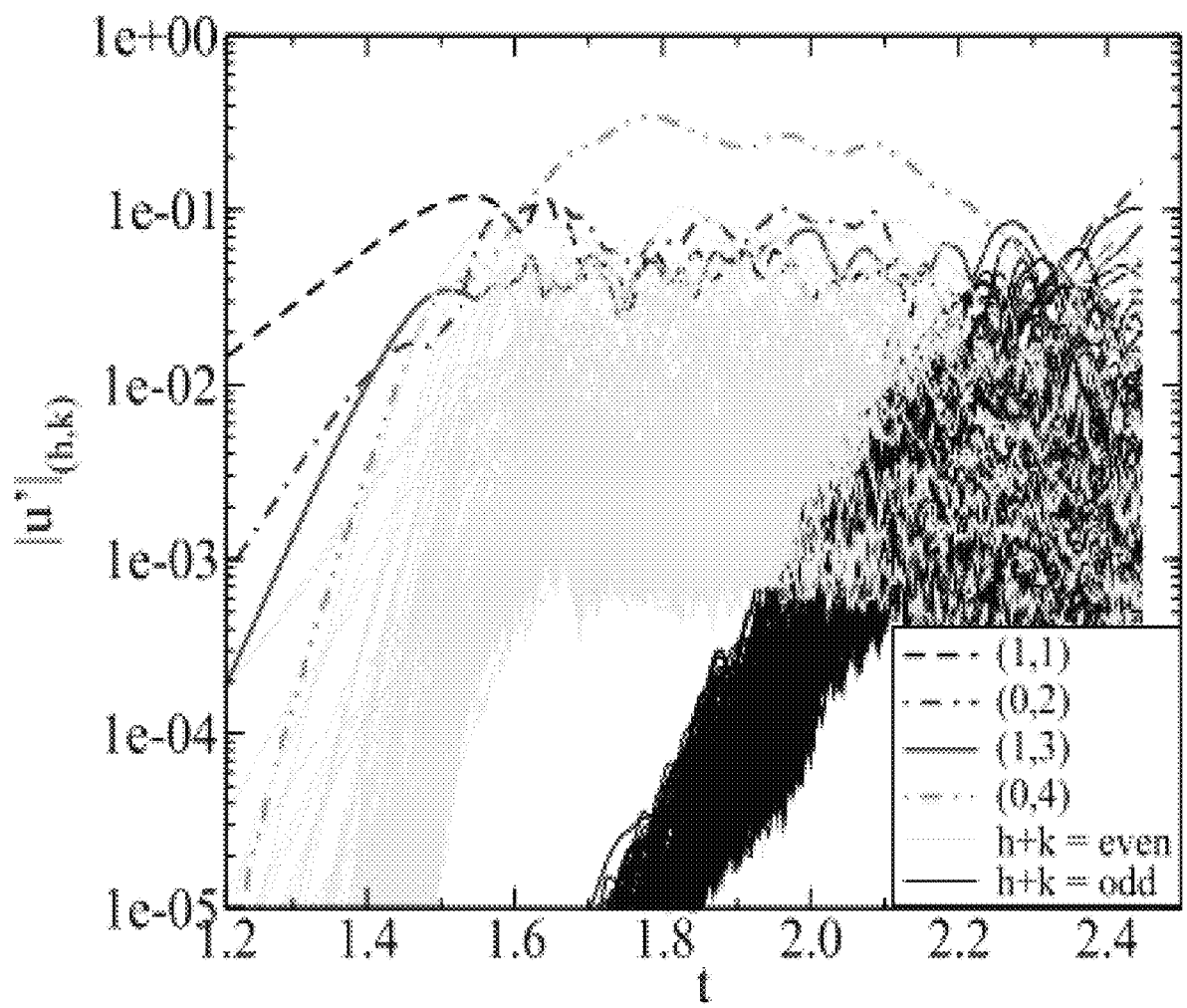
FIG. 28 is a diagram showing oblique breakdown: Temporal development of the maximum disturbance velocity in streamwise direction |u'|(h,k) for $k_c$=20. A(1,1)=10$^{-4}$, $R_x$=2024, M=7.95, T=53.35K, Re=3,333,333.
Figure 30:
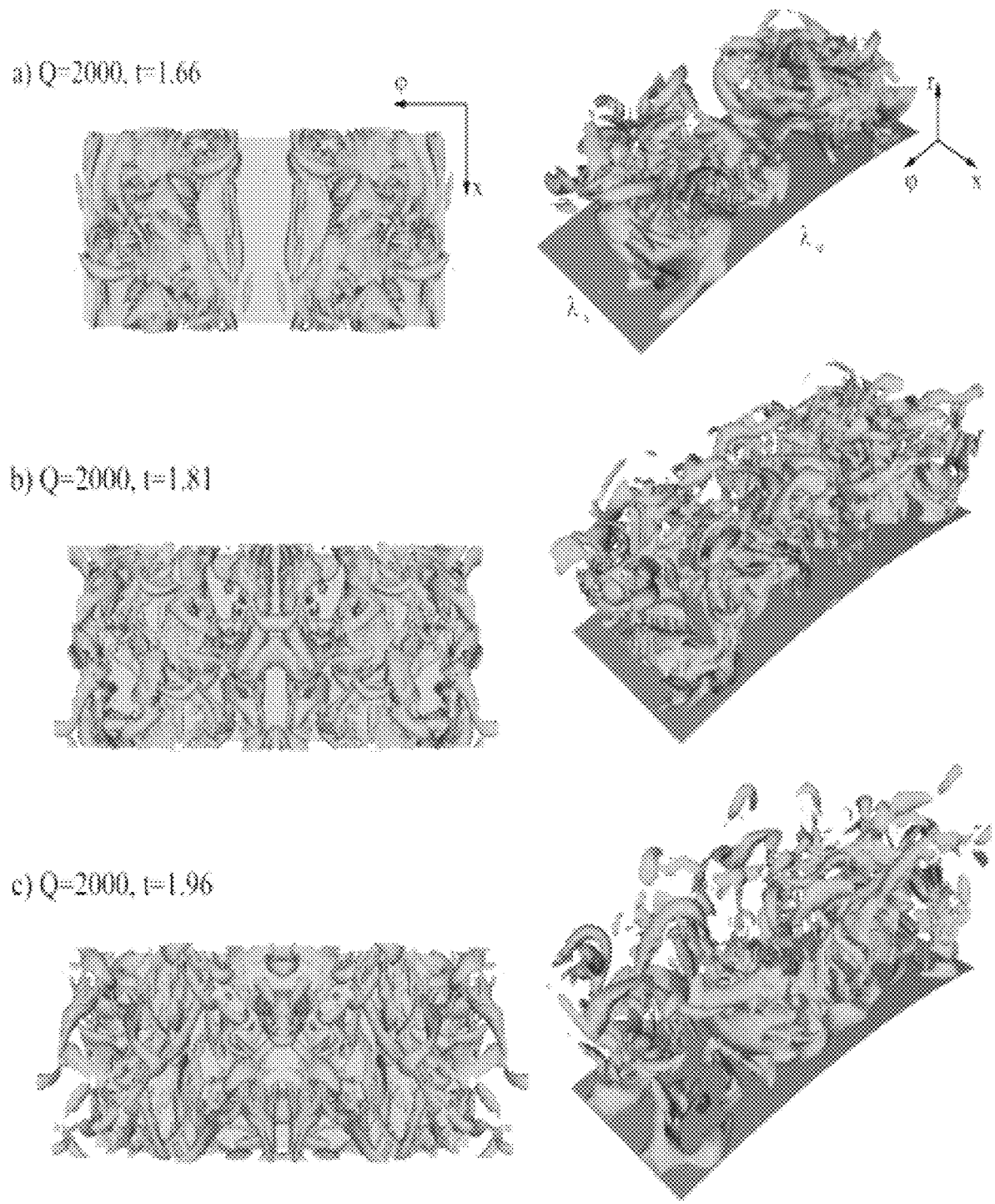
FIG. 30 is a diagram showing oblique breakdown: Temporal evolution of flow structures visualized by isosurfaces of Q during the late stages of transition. A(1,1)=10$^{-4}$, $R_x$=2024, M=7.95, T=53.35K, Re=3,333,333.

FIG. 27 (right figure) shows the temporal development of streamwise velocity disturbance amplitudes. At approximately t=0.8, mode (1,1) departs from linear behavior and rapidly grows, exceeding the amplitude of the primary wave (1,0) at approximately t=1.5. In addition, the steady vortex mode (0,1) is the first disturbance to exceed the amplitude of the primary wave and has the largest amplitude for t>1.4. Thus, the vortex mode is obviously a critical component of this breakdown mechanism. Temporal DNS was also performed for oblique breakdown of second mode disturbance waves. A parameter study was conducted in order to choose the azimuthal wave number that will lead to the earliest onset of transition. Based on these results, highly resolved simulations were performed forcing an oblique disturbance wave with $k_c$=20 (mode 1,1) at an amplitude of $10^{-4}$. In FIG. 28 the temporal development of streamwise velocity disturbance amplitudes is presented. The signature modes of oblique breakdown, modes (0,2) and (1,3), exceed the amplitude of mode (1,1) at t≈1.6. By this point, many higher modes have also reached large amplitude. FIG. 29 shows Favre-averaged velocity and temperature profiles, which indicate a transitional boundary layer. Flow structures identified by isosurfaces of the Q-criterion are given in FIG. 30 for three different time instances. Two wedges of small scale structures merge together as the flow begins to become less coherent indicating late stages of transition.

3.5.2 Spatial DNS

Since our temporal DNS suggested that the fundamental breakdown might be a viable route to transition for the cone boundary layer at Mach 8, subsequent spatial DNS were performed. The frequency for the primary 2D wave was chosen based on linear behavior. Similarly to the temporal simulations the azimuthal wave number ($k_c$) of the secondary pair of oblique waves was determined by conducting a parameter study. For the investigated setup, a secondary wave with $k_c$=46 exhibits the strongest resonant growth. Several other modes feature strong resonant growth and this may possibly explain the appearance of several high amplitude 3D waves near the frequency of the dominant 2D wave in the wave packet simulations.

Highly resolved simulations (ranging from approximately 50-170 million points) were performed forcing both an axisymmetric mode (1,0) with non-dimensional frequency F=9.1×$10^{-5}$ at an amplitude $A_{1,0}$=4×$10^{-2}$ as well as a symmetric pair of oblique waves (modes (1, ±1)) at the same frequency with the previously determined azimuthal mode number $k_c$=46 and amplitude $A_{1,1}$=1×$10^{-2}$. From the downstream development of the u'$_{max}$ amplitudes (FIG. 31), the onset of fundamental resonance is clear. Modes (1,1) and (0,1) grow nonlinearly and eventually overtake the primary disturbance wave (1,0). There is also the generation of higher harmonics, modes (2,0) and (2,1), which was also observed in the experiments by Stetson et al. (1983) and in our wave packet simulations. When modes (0,1) and (1,0) approach the amplitude of the primary disturbance mode (1,0), all higher modes grow rapidly and the flow seems to enter the final stage of transition.

Flow visualizations (using isosurfaces of Q=500 colored with azimuthal vorticity) in FIG. 32 reveal remarkable similarities to fundamental breakdown in incompressible flows (Kachanov 1994). The 2-D disturbance becomes modulated in the azimuthal direction as oblique waves experience nonlinear amplification. This modulation eventually forms the characteristic aligned Λ-vortex pattern which begins inclining from the cone surface. The contours of azimuthal vorticity in the symmetry plane visualized with isosurfaces of Q=500 (FIG. 33) illustrate that the shear layer is beginning to "roll up" as the flow breaks up into small scale structures. One key feature of this transition process is the very large extent in the downstream direction over which it takes place (relative to the incompressible case). The formation and eventual breakup of the Λ-structures occurs over quite a large number of fundamental wave lengths. The azimuthal and time averaged skin friction (FIG. 34, left figure) departs from the laminar value at the onset of transition and begins to approach the theoretical turbulent value suggested by White (1991). The initial rise in the skin friction appears to be completely governed by the large amplitude 2-D primary wave. The dip in the skin friction is likely caused by the saturation of the primary wave (mode (1,0)) and the second rise occurs as many higher 3-D modes experience rapid growth and reach large amplitudes.

Figure 34A:
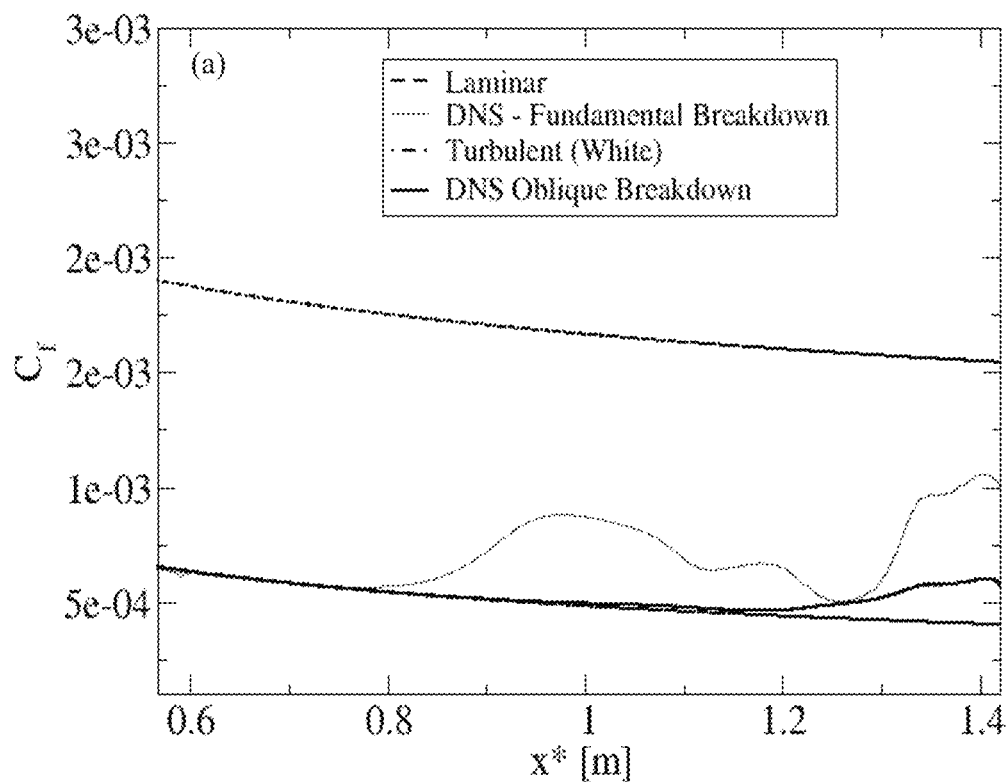
FIG. 34A-B is a diagram showing (a) Streamwise development of averaged skin friction for oblique breakdown (purple) and fundamental breakdown (red). For oblique breakdown, $k_c=20$, $A(1,1)=2*10^{-2}$. For fundamental breakdown, $k_c=46$, $A(1,0)=4*10^{-2}$, $A(1,1)=1*10^{-2}$. Sharp cone, M=7.95, T=53.35K, Re=3,333,333. (b) Oblique Breakdown: Streamwise development of u-velocity disturbance amplitudes, $k_c=20$, $A(1,1)=2*10^{-2}$. Sharp cone, M=7.95, T=53.35K, Re=3,333,333.
Figure 34B:
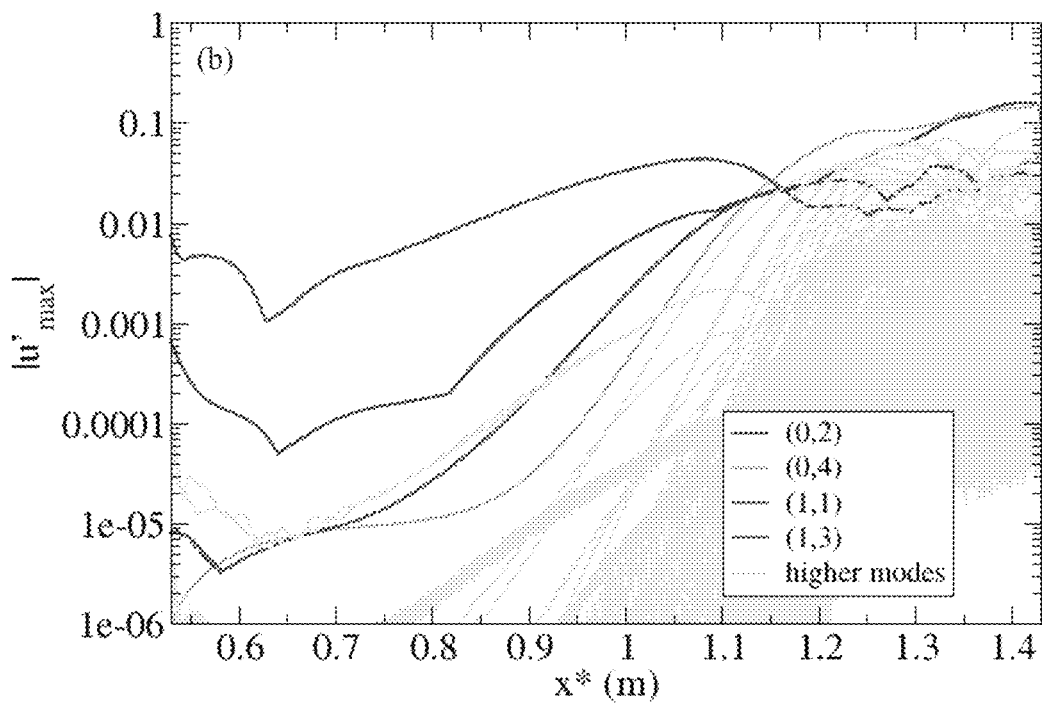

A simulation of oblique breakdown initiated by a symmetric pair of 3-D second mode disturbances (modes 1,1 and 1,–1) was performed for comparison with the fundamental breakdown. The parameters for the oblique breakdown simulation were chosen based on the parameter study performed using temporal DNS. The oblique waves were forced with an amplitude of 2% of the freestream velocity. In FIG. 34 (right figure) streamwise velocity disturbance amplitudes of selected modes are plotted versus downstream location ($R_x$). Similarly to the temporal DNS, modes (0,2) and (1,3) are nonlinearly generated and exceed the amplitude of mode (1,1). At this point, strong nonlinear interactions are present and the flow begins to transition. Flow structures visualized by isosurfaces of Q=500 (FIG. 35) indicate that the oblique disturbances interact and cause rope-like structures which subsequently break down to small scale flow structures. These regions begin to widen in downstream direction. The averaged skin friction for this case is displayed in FIG. 34 (left figure). In comparison to the fundamental breakdown, the onset of transition is less dramatic. Linearly, the primary pair of oblique waves, which initiates the breakdown, is not as strongly amplified as the 2D primary wave in the fundamental breakdown. Therefore, the onset of transition, i.e. the point where the skin-friction deviates from its laminar value, is farther upstream for the fundamental breakdown. However, due to the entirely different nature of the two breakdown mechanisms, conclusions about the downstream extent of the transition zone cannot be drawn at this point and further investigations will be necessary.

3.6 Transition in a High Enthalpy Hypersonic Boundary Layer

Hypervelocity (reflected shock) tunnels, such as the T5 at Caltech, allow for short-duration hot flow experiments that result in conditions which more closely resemble those encountered during hypersonic atmospheric flight, including high boundary-layer edge temperatures and associated temperature ratios, $T_w/T_e<1$ ("cold wall"). However, in contrast to the considerable body of research available for the cold flow, hypersonic transition for the hot flow case (i.e. cold wall $T_w/T_e<1$) is much less understood. Wagnild (2012) has performed computational stability analyses using LST and PSE (i.e. STABL code, Johnson & Candler 2005) for high-enthalpy conditions as in the T5 experiments at Caltech. However, to date no Direct Numerical Simulations for investigating possible transition scenarios in the T5 experiments of Jewell et al. (2012, 2013) had been performed for comparison with the experimental data. Understanding transition under such conditions is crucial for atmospheric high-enthalpy flight.

Figure 37:
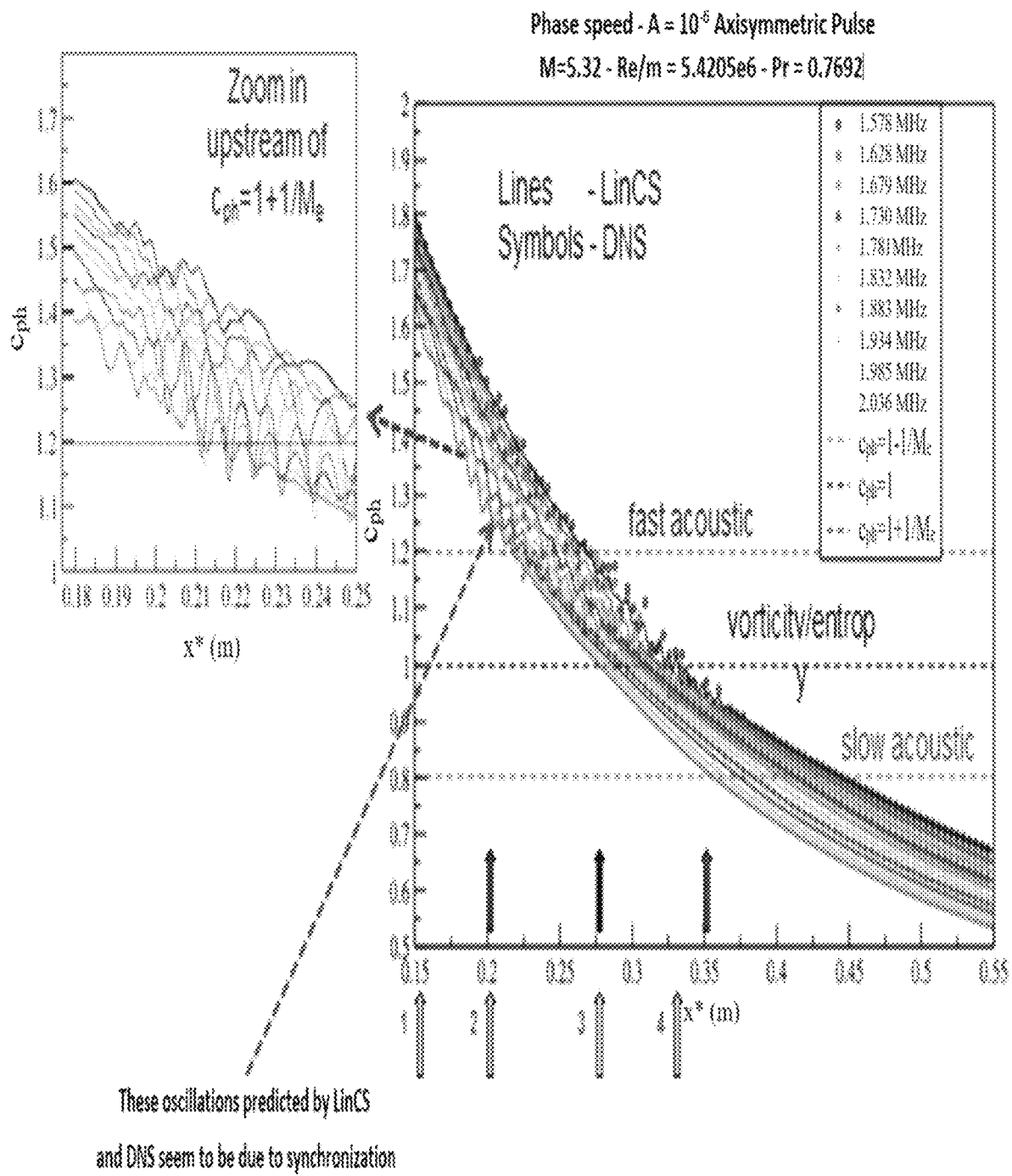
FIG. 37 (1-4) is a diagram showing synchronization of different wave frequency components with boundary layer modes (i.e. acoustic, vorticity/entropy) change character of Mack's second mode (for a 5 degree half angle cone at Caltech T5 condition). Lines are from linearized Navier-Stokes solver and symbols are from DNS.
Figure 37:
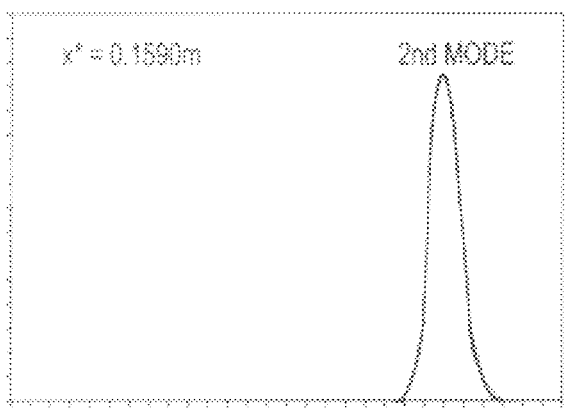
Figure 37:
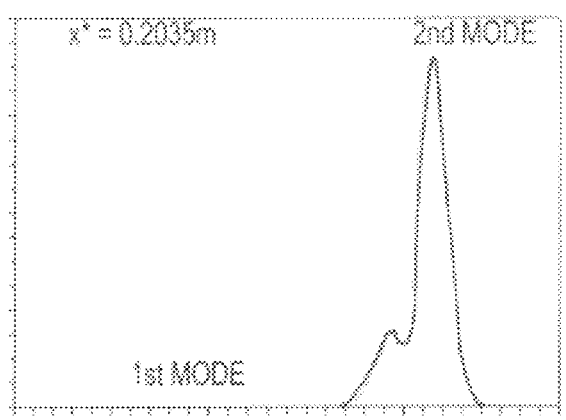
Figure 37:
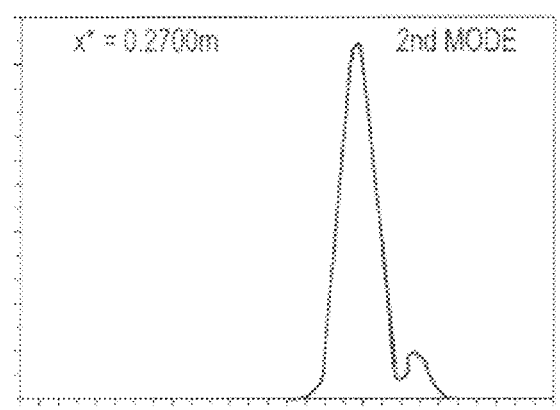
Figure 37:
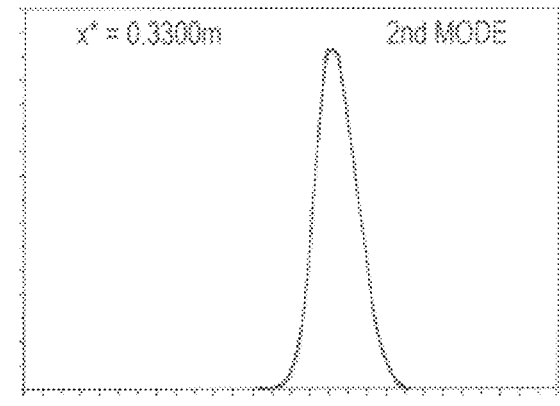
Figures 38C, 38D:
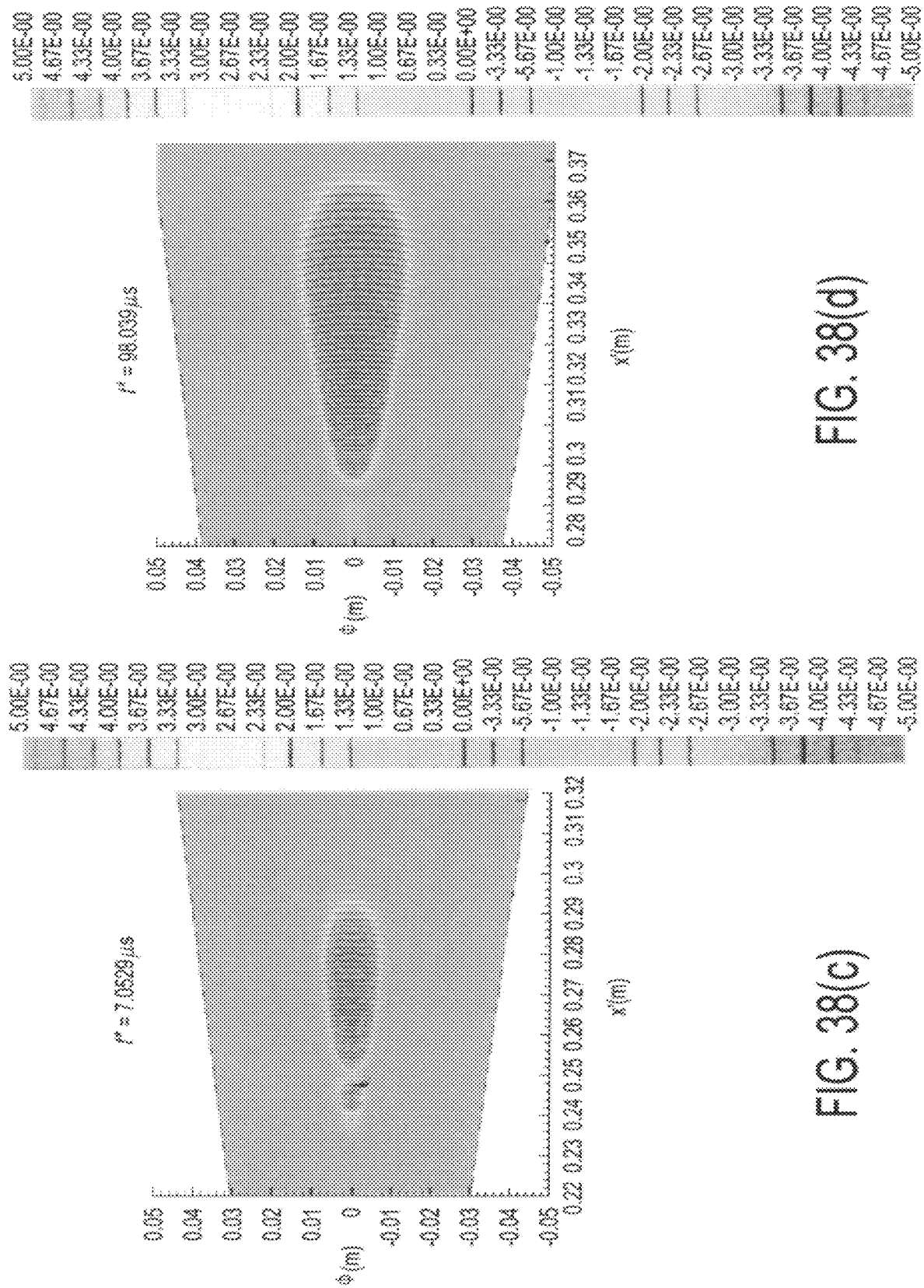
Figures 38E, 38F:
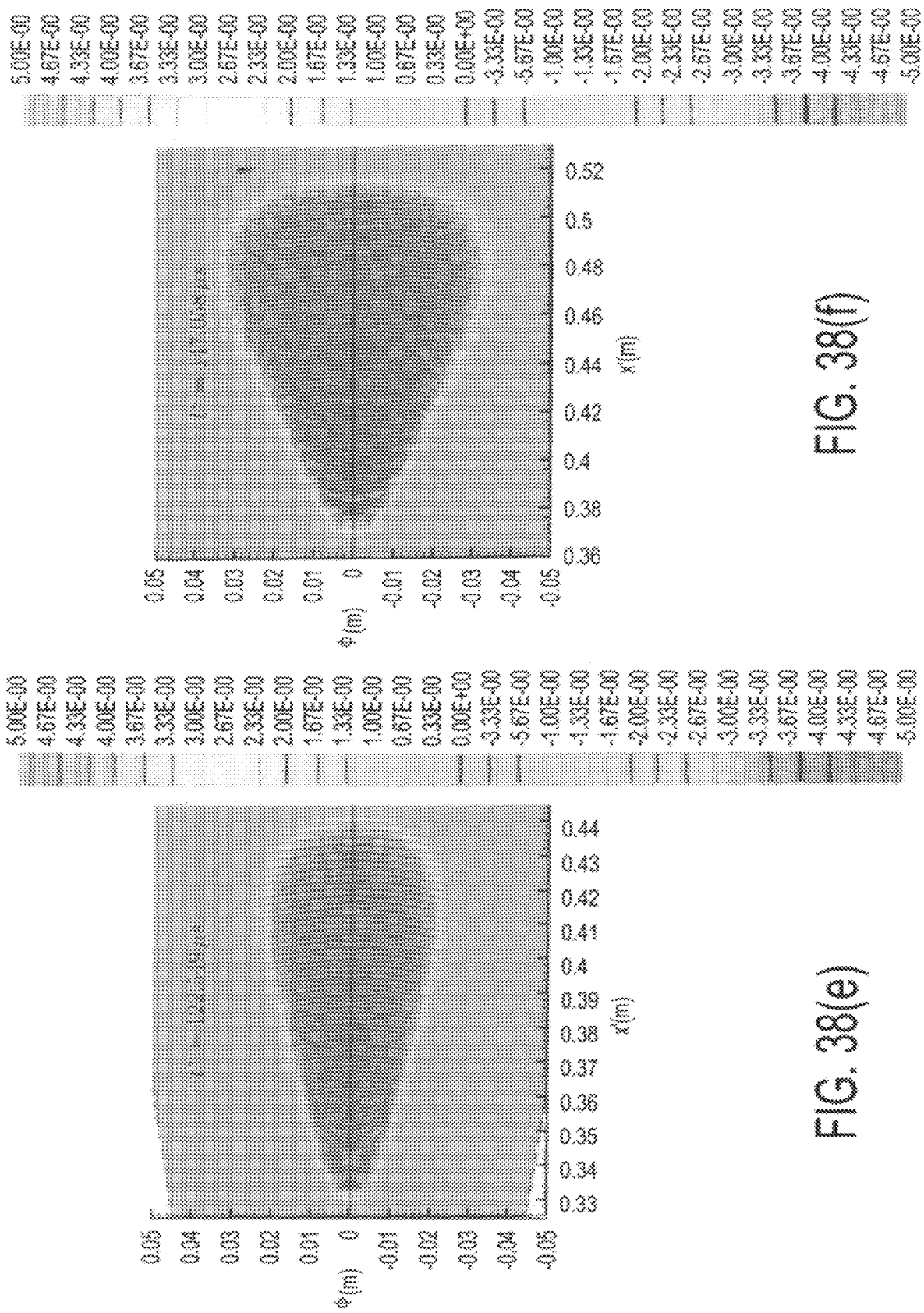
Figure 39:
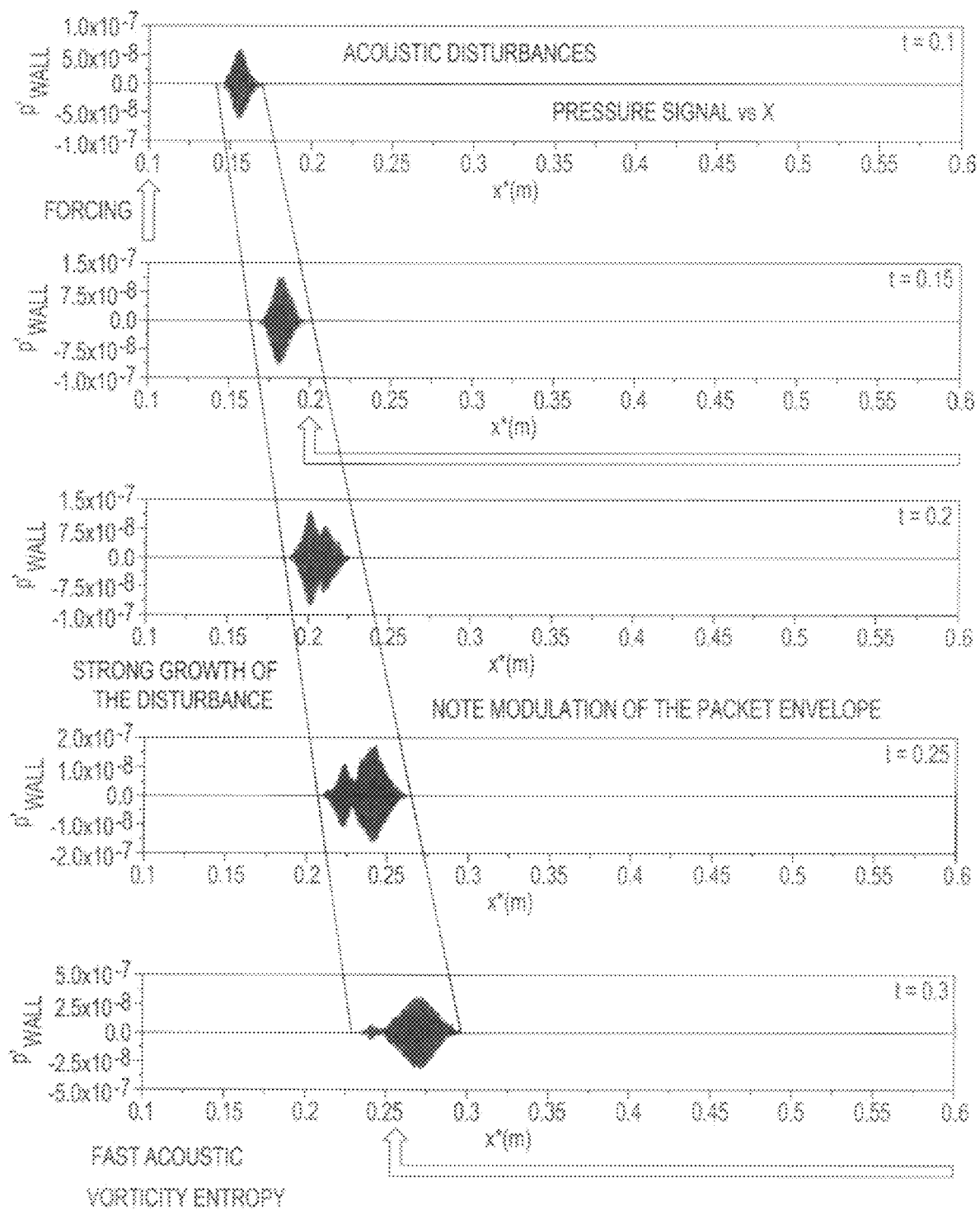
FIG. 39 is a diagram showing synchronization of different wave frequency components with boundary layer modes (i.e. acoustic, vorticity/entropy) changes character of Mack's second mode (for a 5 degree half angle cone at Caltech T5 condition) and results in wave packet modulation.

In order to fill this gap, the stability of a high-enthalpy boundary-layer on a 5° sharp cone was investigated using a linear wave packet. Towards this end, a short-duration pulse generated by blowing through a small hole on the surface of the cone was utilized to excite a broad spectrum of frequencies and streamwise/azimuthal wave numbers. The linear regime has been investigated using a linearized compressible Navier-Stokes solver and Direct Numerical Simulations, and also the STABL solver based on the Parabolized Stability Equations (PSE) (Salemi et al. 2014a,b). Results from these different techniques have been compared for an axi-symmetric disturbance pulse and good agreement was found for the growth of the pulse disturbance (FIG. 36). Our stability investigations (Salemi et al. 2014) have also shown an interesting coupling of phase speeds for various wave components (FIG. 37), which results in a profound modulation of the envelope of the wave packet (FIGS. 38 and 39). The DNS results reveal that the envelope of the wave-packet changes its character, as the amplified wave components within the packet synchronize their phase speeds with the fast acoustic, vorticity/entropy and slow acoustic modes (FIGS. 38 and 39).

With the present DNS, we have demonstrated that a wave-packet generated by a small-amplitude disturbance undergoes rapid linear growth under the conditions of the Caltech T5 experiment (FIG. 36). As the next step, the DNS investigations are being expanded towards the nonlinear regime. Of particular interest will be to explore if the nonlinear resonance mechanisms that were found to be relevant for cold free stream conditions will still be important for the Caltech experimental conditions, or if other nonlinear scenarios will prevail in the breakdown to turbulence.

3.7 Numerical Simulations of Boundary Layer Stabilization Using Porous Walls The effect of porous walls on boundary layer stability in a Mach 6 flow for the linear and the nonlinear stability regime (Hader & Fasel 2011, Hader et al. 2013a, Hader et al. 2013b, Hader et al. 2014) was investigated using temporal DNS. Different methods were explored to physically resolve the pores in the simulations. A lower order direct forcing method was employed for preliminary studies in the linear stability regime (Hader & Fasel 2011). Due to the high resolution requirements of this method the non-linear stability regime could not be investigated with this approach. A locally stabilized higher-order immersed boundary method (Brehm et al. 2012, Brehm et al. 2014, Brehm et al. 2015) proved to be much more successful in capturing the relevant effects and enabled us to perform studies in the non-linear stability regime.

Temporal simulations are employed to study the effect of porous walls on boundary layer stability because the spatial approach is computationally too expensive for this problem. For spatial simulations many fundamental wavelengths have to be resolved whereas for the temporal approach the computational domain size can be limited to one fundamental wavelength in the streamwise and the spanwise direction. For the porous wall simulations approximately 8 pores per disturbance wavelength have to be resolved. This would require a vast number of grid points for spatial DNS. Due to these requirements the temporal approach was chosen for the current investigations.

Figure 40:
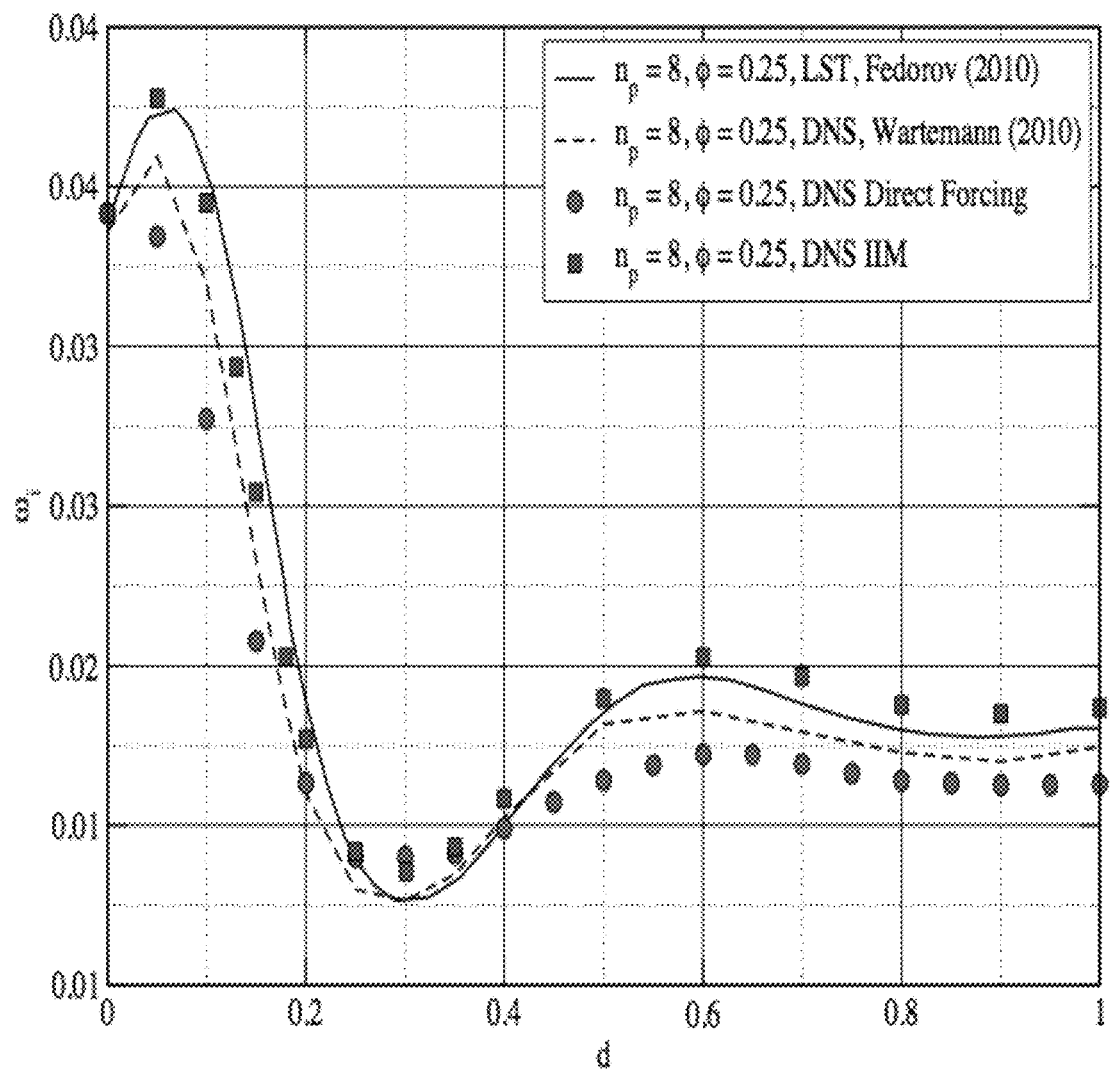
FIG. 40 is a diagram showing temporal growth rate vs. cavity depth, d for a coating with $n_p=8$ pores and 25% porosity.

A parameter study for the smooth wall case showed that largest growth rate for the given conditions (M=6, adiabatic wall, $T_\infty=216.65K$, Pr=0.72, gamma=1.4, see Sandham et al. 2009) was obtained for a streamwise wavenumber of ar=3.0. This wavenumber was used as the reference case to study the effect of different porous wall configurations on the linear and on the non-linear regime. To verify the order-of-accuracy of the new immersed boundary method an order study was carried out and confirmed that the locally stabilized immersed boundary method is formally third order accurate. To validate the immersed boundary method the growth rate attenuation of the most amplified disturbance was computed for an increasing cavity depth ($0 \le d \le 1$) for 8 cavities per disturbance wavelength ($n_p=8$) and a porosity of $\varphi=0.25$. Results of temporal LST and DNS studies utilizing boundary conditions to account for the presence of the porous wall (Fedorov 2010, Wartemann et al. 2010) and results obtained with a temporal DNS using a lower order direct forcing method to physically resolve the pores (Hader & Fasel 2011) match well with the temporal DNS results obtained with the new immersed boundary method (see FIG. 40). For shallow pores the primary wave is slightly destabilized. With increasing cavity depth the growth rate of the primary wave is drastically reduced. An 'optimal' cavity depth of d=0.30 leads to a maximum growth rate reduction of approximately 60%. Further increasing the pore depth leads to a less stabilizing configuration. After exceeding a certain cavity depth the effect on the growth rate becomes negligible. With the new immersed boundary method the destabilization of the primary wave observed for shallow pores is captured as predicted by theory. This destabilized regime was not captured with the lower order direct forcing method. This shows that the results are very sensitive to the treatment of the immersed boundary. An improvement of the direct forcing method was necessary to obtain more accurate results and improve the computational efficiency and robustness of the immersed boundary simulations to expand the investigations of the porous walls into the nonlinear stability regime.

Figure 41:
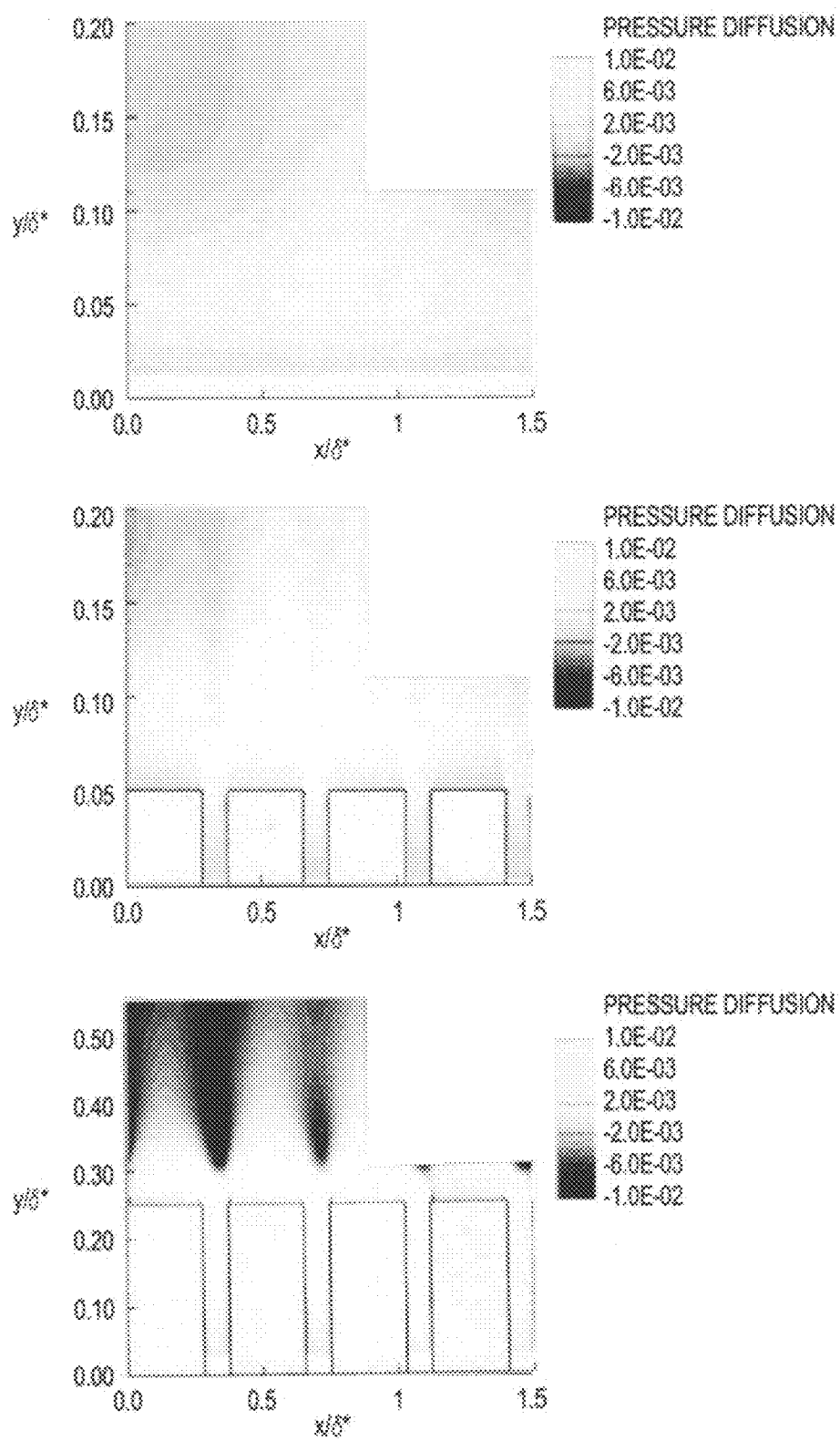
FIG. 41 is a diagram showing pressure diffusion for (a) smooth wall case, (b) destabilizing porous coating and (c) strongly stabilizing porous coating.
Figure 42:
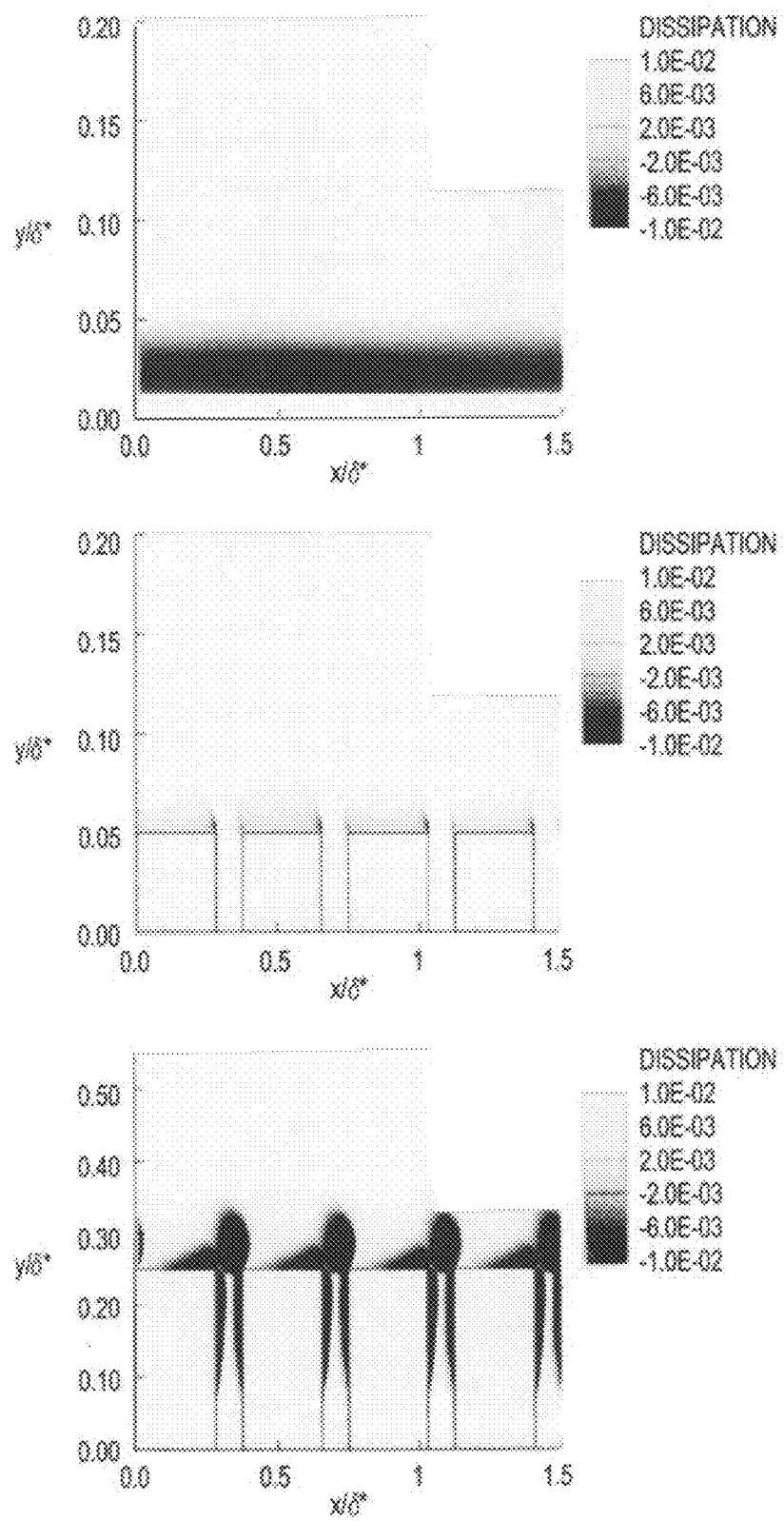
FIG. 42 is a diagram showing kinetic energy dissipation for (a) smooth wall case, (b) destabilizing porous coating and (c) strongly stabilizing porous coating.

To gain more insight into the underlying physical processes of the stabilization various terms of the turbulent kinetic energy were computed. The most dominant terms are the dissipation and the pressure diffusion. A comparison of these terms between a smooth wall case, a destabilizing and a strongly stabilizing porous wall configuration show that the pressure diffusion and the dissipation are large within the cavities for the stabilized configuration (see FIGS. 41 and 42). In the destabilized case the dissipation within the pores becomes negligible and appears to be even smaller compared to the smooth wall case. Similar observations are made for the pressure diffusion. The reduction of dissipation within the shallow cavities might be responsible for the destabilization observed for small cavity depths.

To explore the possibility of porous walls as a passive laminar flow control technique the effect of the pores on the nonlinear stability regime was investigated. Laminar to turbulent transition can occur along various paths. Here, the effect of porous walls on two different controlled breakdown scenarios (fundamental and subharmonic resonance) was investigated. The fundamental resonance breakdown scenario (K-Type breakdown) is initiated by a primary 2D wave, mode (1,0), and a pair of oblique secondary disturbance waves, modes (1,±1), that have the same frequency and streamwise wavelength, $\lambda_x$, as the primary wave. The subharmonic resonance scenario (N/H-Type breakdown,) is characterized by a 2D primary wave, mode (2,0), and a pair of oblique secondary waves, modes (1,±1), with half the frequency and twice the streamwise wave length of the primary wave.

Figure 43:
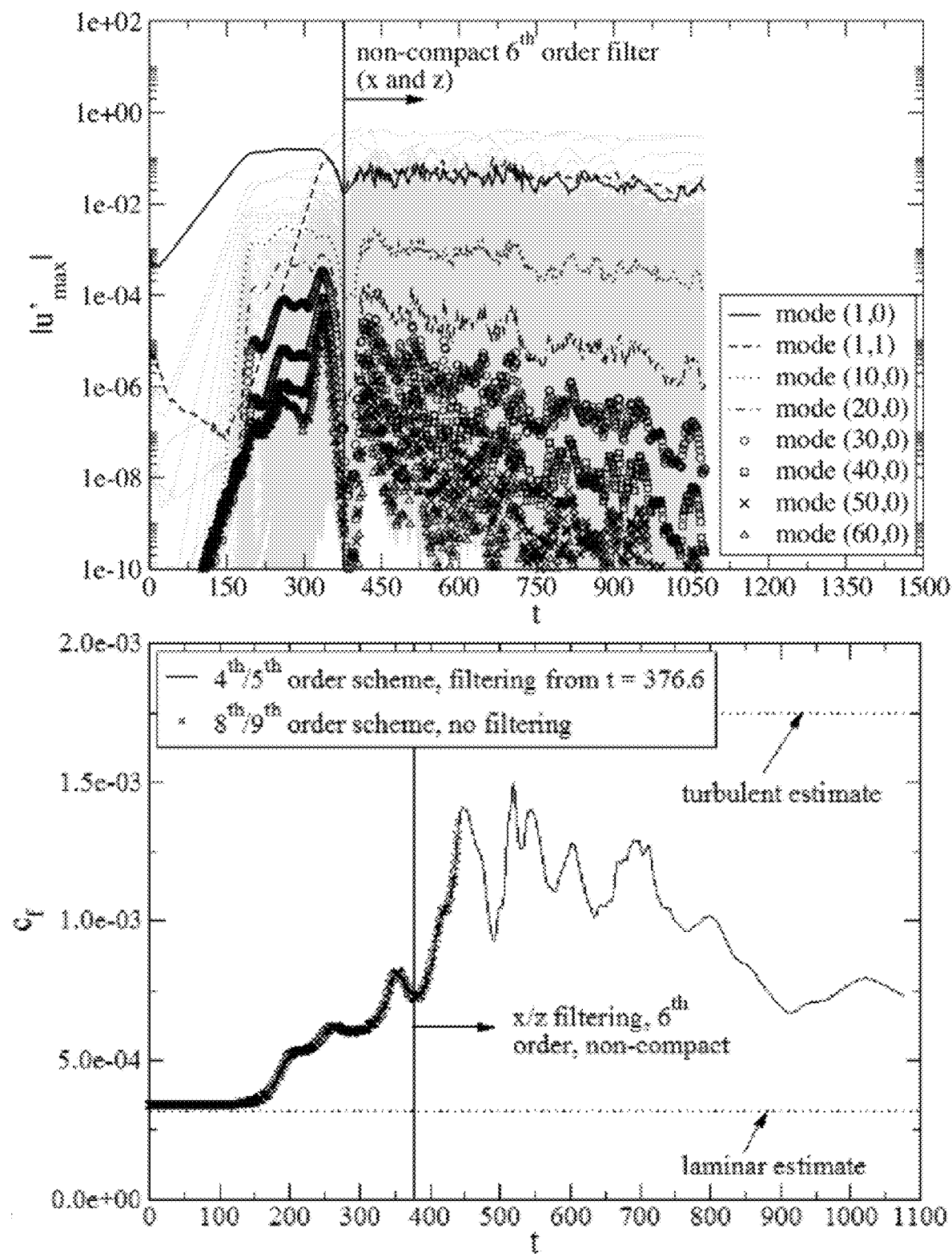
FIG. 43 is (a) Mode evolution of maximum streamwise velocity disturbance amplitude when employing a non-compact 6th order filter. (b) Skin friction evolution for numerical schemes with different order and filtering switched on at t=376.6.

Highly resolved non-linear stability simulations are computationally very expensive and the results might be sensitive to the employed numerical schemes. Consequently, the numerical schemes have to be chosen carefully for high resolved simulations. A comparison of the averaged skin friction evolution for the fundamental resonance scenario obtained with a $4^{th}$ order scheme for the diffusion terms and a $5^{th}$ order scheme for the convective terms is compared to a solution computed with an $8^{th}$ order scheme for the diffusion terms and a $9^{th}$ order scheme for the convective terms (see FIG. 43, right figure). The skin friction evolution obtained with both schemes exhibit no noticeable differences. For these high order simulations the natural dissipation of the numerical schemes is too small, which allows unphysical, high frequency content to accumulate in the solution. These high frequencies can cause mesh oscillations, which eventually lead to divergence of the simulations. To eliminate these mesh oscillations a high order non-compact filter is employed. Initially the filter has no noticeable effects on the skin friction evolution or the mode evolution (see FIG. 43, left figure). After a certain time, however, it appears as if the filter leads to a relaminarization of the flow. This indicates that the filter might be too dissipative and a higher-order filtering scheme should be used when employing the filter for a significant amount of time to stabilize the solution.

The parameter space of the resonance breakdown scenarios is very large. Covering the whole parameter space with DNS would be too costly. Consequently, a few cases have to be selected for a more detailed investigation. A parameter study was carried out for the smooth wall geometry to identify the most 'critical' wave angles for the resonance breakdown scenarios. The investigation of the linear regime showed that the most amplified wavelength of a 2D wave is $\lambda_x=3.0$. Consequently, this wavelength is chosen as the wavelength of the primary 2D wave for the resonance breakdown scenarios. The most 'critical' wave angle of mode (1,1) in the context of this work is defined as the wave angle for which the growth rate of the secondary disturbance wave becomes maximal after the resonance onset. In the parameter study the growth rate of mode (1,1) is extracted at a time instant before ($\omega_{i(1,1)}$) and after the resonance onset ($\sigma_{i(1,1)}$). The growth rate of the secondary wave after the resonance onset is significantly larger for the fundamental resonance scenario compared to the subharmonic resonance case. The wave angles exhibiting the strongest resonance are found for $\psi_{max, fundamental}=45°$ for the fundamental resonance and for $\psi_{max, subharmonic}=60°$ in the subharmonic resonance scenario. Therefore, these cases will be investigated in more detail with and without porous wall geometry.

Figure 44:
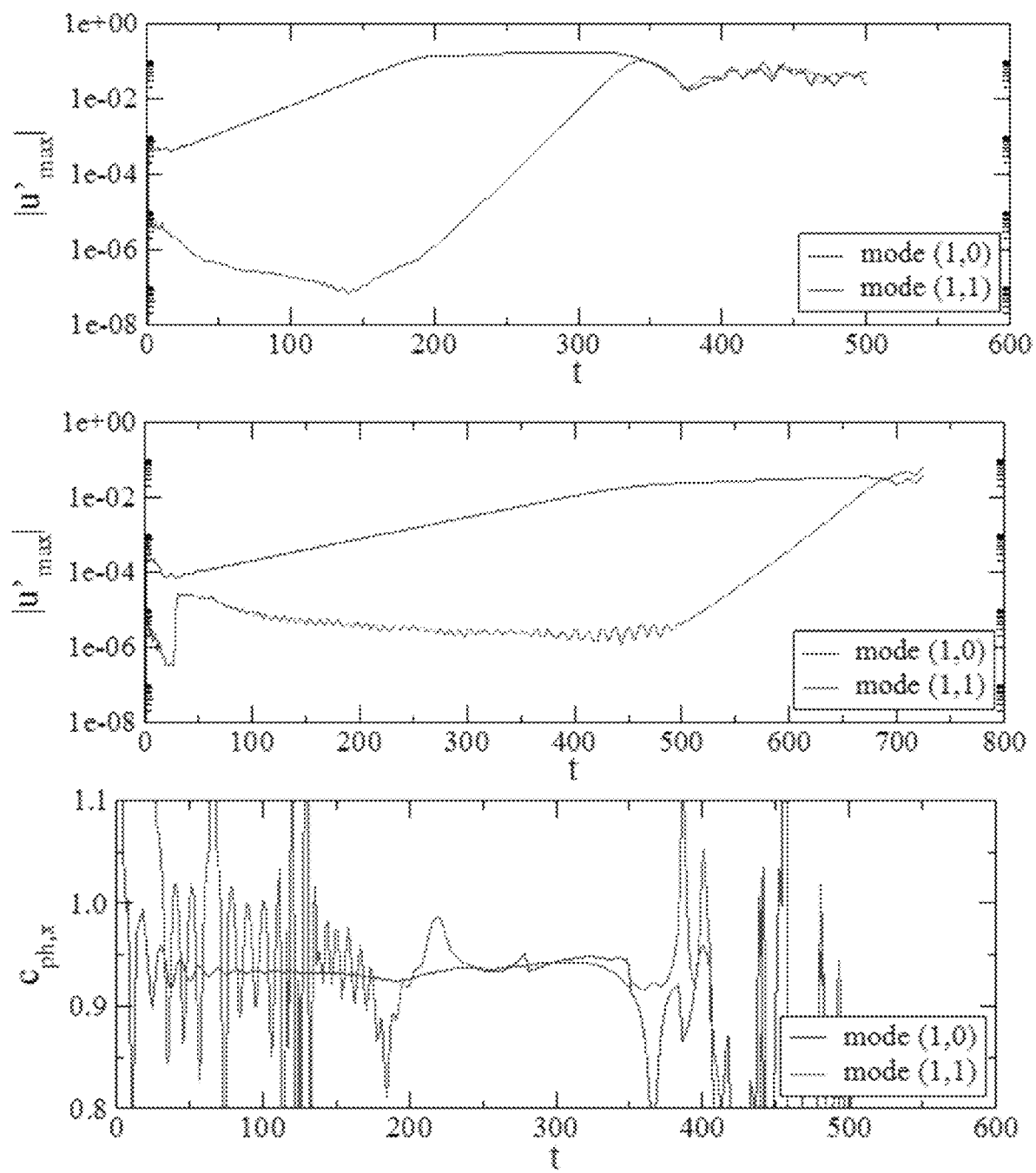
FIG. 44 is a diagram showing maximum streamwise velocity disturbance amplitude evolution and streamwise phase speed evolution for mode (1,0) and mode (1,1) for (a) smooth wall, (b) $n_p=8$, d=0.30, $\varphi=0.25$ and (c) $n_p=8$, d=1.00, $\varphi=0.25$.
Figure 44:
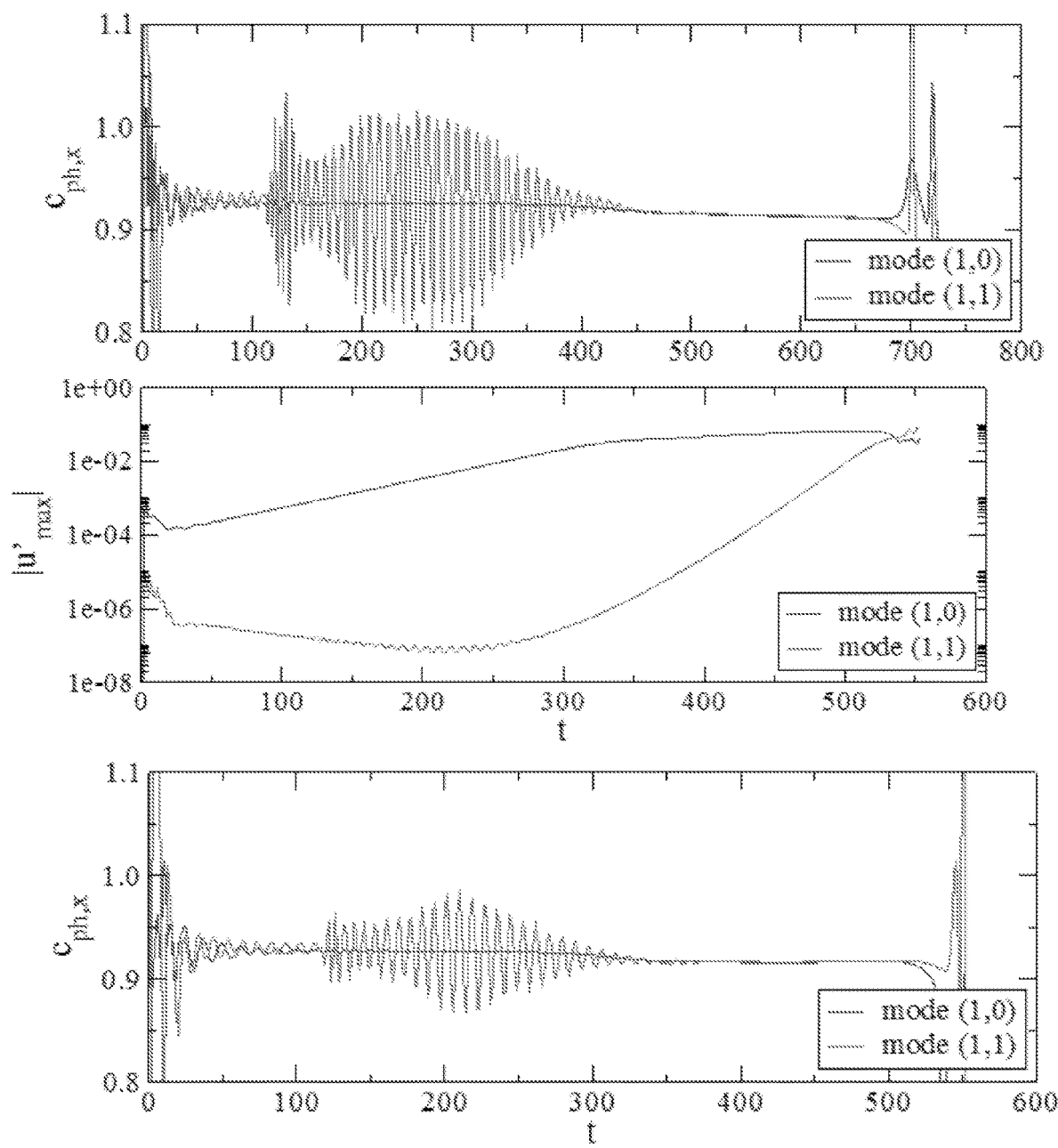

The phase speed locking process between the primary wave (mode (1,0)) and the secondary wave (mode (1,1)) is investigated in more detail for the smooth and porous wall configurations for the fundamental resonance scenario (see FIG. 44). For the smooth wall case (see FIG. 44, top) a small 'dip' in the amplitude evolution of the secondary wave is observed right before the resonance onset. In the phase speed plot this 'dip' corresponds to the phase speed locking of the primary and the secondary wave. The streamwise phase speeds coincide for both porous wall cases once the primary wave saturates and the nonlinear growth of the secondary wave sets in (see FIG. 44).

Figure 45:
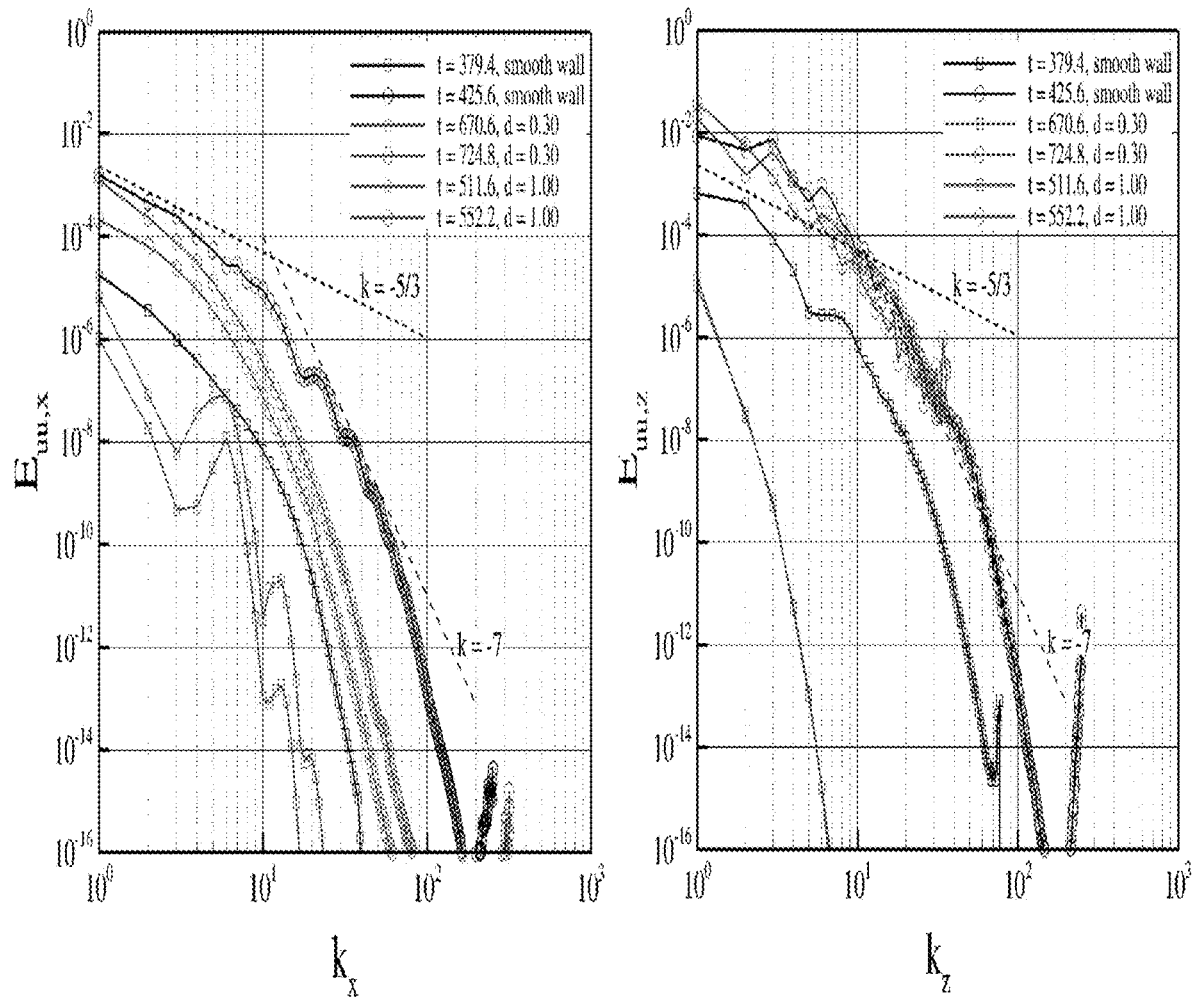
FIG. 45 is a diagram showing (a) Streamwise power spectra and (b) spanwise power spectra extracted at y=1 at different time instances for smooth and porous wall geometry for fundamental resonance scenario.
Figure 46:
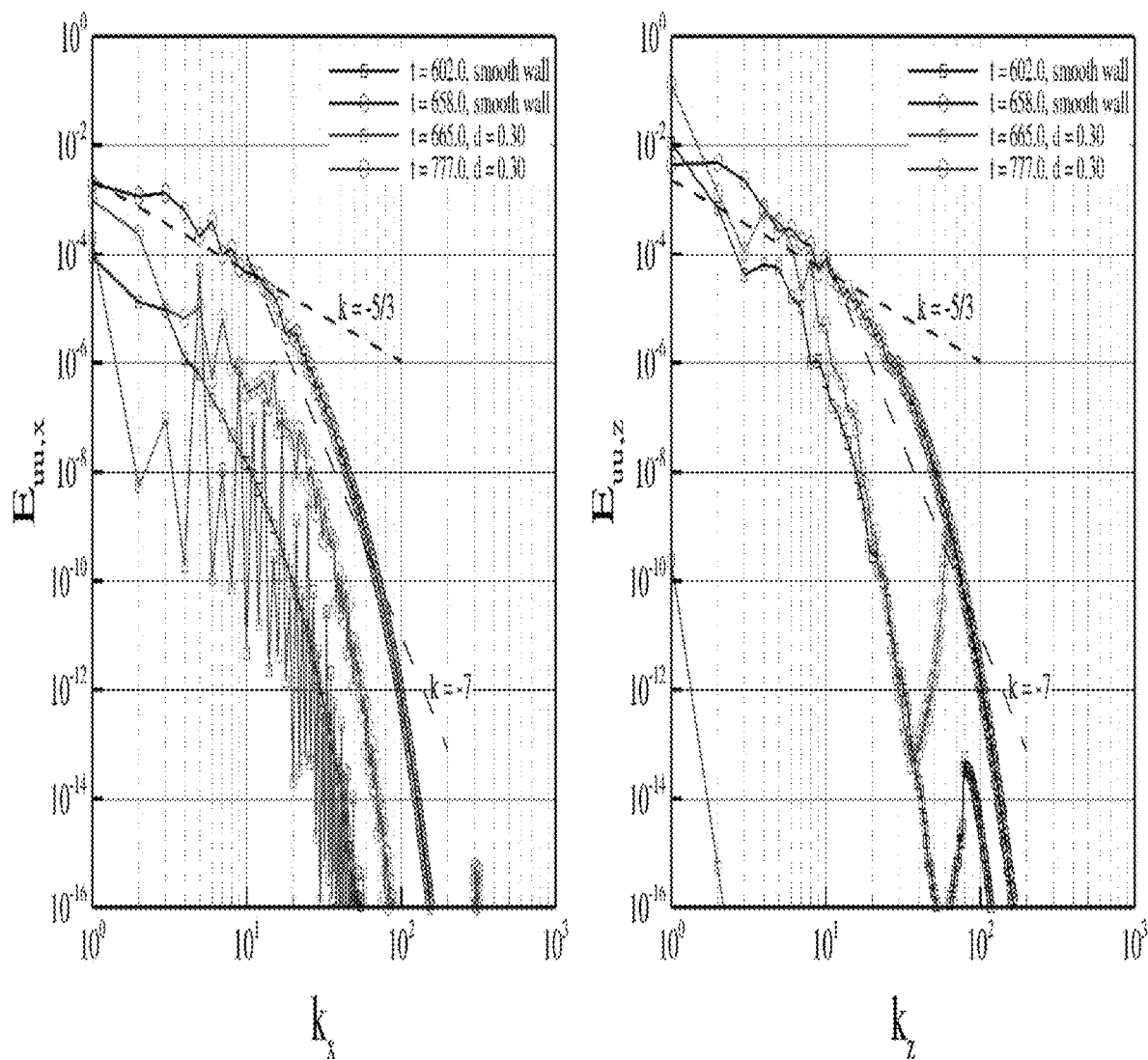
FIG. 46 is a diagram showing (a) Streamwise power spectra and (b) spanwise power spectra extracted at y=1 at different time instances for smooth and porous wall geometries for subharmonic resonance scenario.

An indicator of how far the flow has progressed into the turbulent regime is provided by the streamwise and spanwise energy spectra (see FIGS. 45 and 46). The spectra were extracted at y≈1 above the wall, which is close to the wall normal location of the critical layer. The rate of energy decay for the low and high wave number range was predicted by Heisenberg (1948) and is indicated by dashed lines in the FIGS. 45 and 46. For the smooth wall case the energy spectra for the streamwise as well as azimuthal modes become broader as time progresses. For t=425.6, the energy decay is in reasonable agreement with the theoretical predictions indicating that the flow has progressed far into the transition regime. At later times, however, the energy spectra show that energy is accumulated at the high wave number end of the spectrum. The high order scheme employed for these simulations has very little numerical dissipation and, therefore, this accumulation of energy is not naturally damped by the numerical scheme. As a result mesh oscillations occur and shortly after the energy shifts to the high wave numbers the simulations terminate. Filtering can prevent the sudden accumulation of energy at the high wave number end and allows to progress the simulation further into the turbulent regime. The energy spectra for the porous wall cases extracted at a much later time instance compared to the smooth wall case show that the energy contained in the streamwise modes is significantly lower compared to the smooth wall case (see FIG. 45, left figure). The spanwise spectrum fills up very quickly with increasing time (FIG. 45b). The energy contained in the spanwise modes for the porous wall cases is comparable to the smooth wall case. From the energy spectra for the porous wall cases it can be concluded that the flow has not progressed as far into the turbulent regime as the smooth wall case even though the spectra were extracted at much later time instances. This indicates that the presence of the porous walls can delay transition onset to later times. The findings for the subharmonic resonance scenario (FIG. 46) are similar to the findings for the fundamental resonance scenario (FIG. 45).

Figure 47:
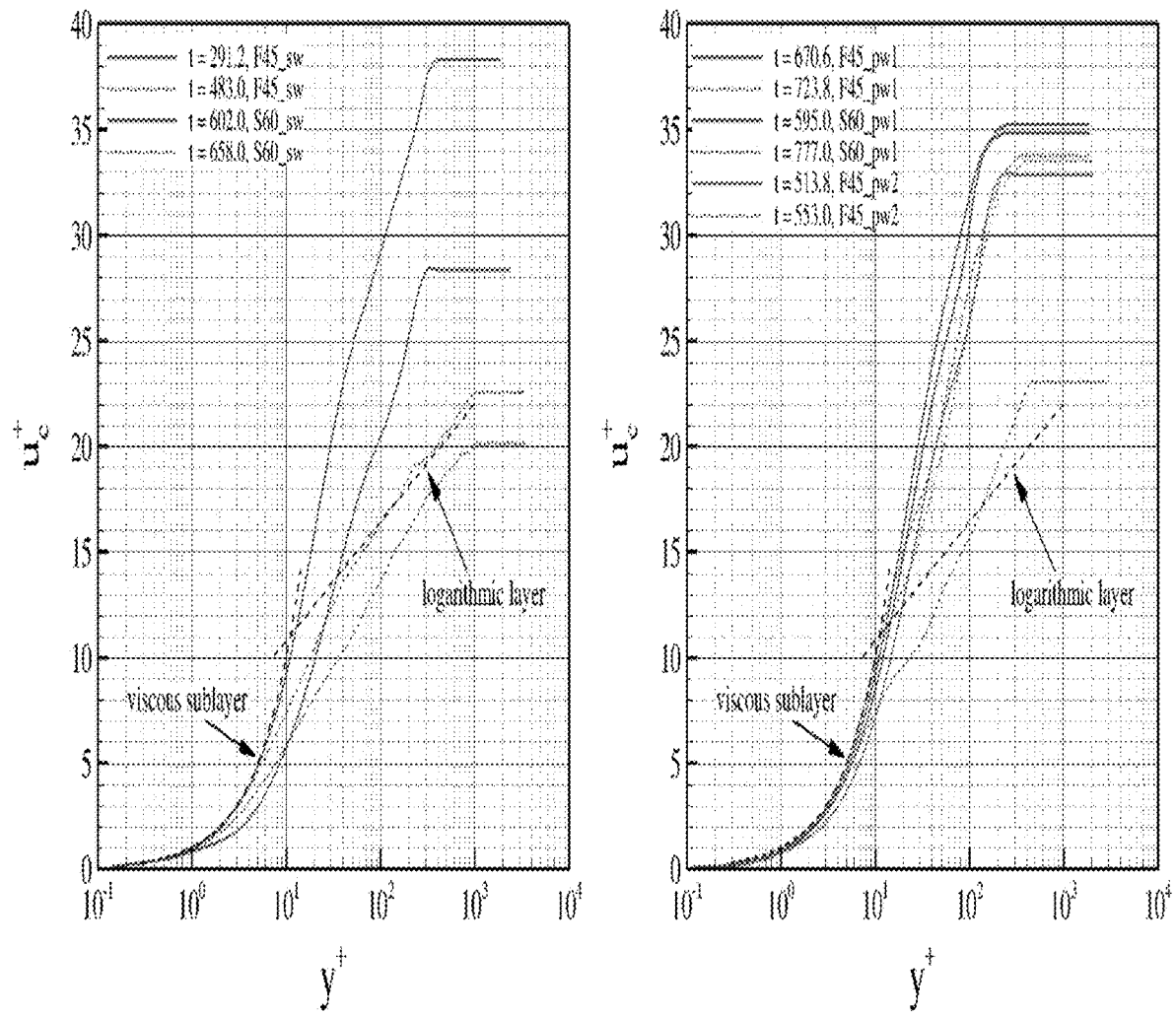
FIG. 47 is a diagram showing Van Driest transformed profiles for (a) fundamental and subharmonic resonance scenario for smooth wall geometry and (b) for fundamental resonance and subharmonic resonance scenario for porous wall geometries at different time instances.

An additional method to determine how far the flow has progressed towards turbulence is the analysis of the so-called van Driest transformed streamwise velocity profiles (see White 2006). A comparison of the smooth and porous wall cases for the fundamental and subharmonic resonance scenario shows that the averaged streamwise velocity profiles change much later from the laminar to the turbulent state for the porous wall case (see FIG. 47). The smooth wall cases (FIG. 47a) exhibit an averaged velocity profile that is very close to the turbulent estimates while at much later times the profiles for the porous wall cases for the fundamental resonance scenario are still essentially laminar (FIG. 47b). The results of the subharmonic resonance scenario for the smooth wall as well as the porous wall show profiles with a nearly established logarithmic layer (see FIG. 47). This suggests that both cases are nearly fully transitioned. The fact that the logarithmic layer development for the porous wall is delayed significantly underlines the capability of porous walls to delay transition for the subharmonic resonance scenario.

Figure 48:
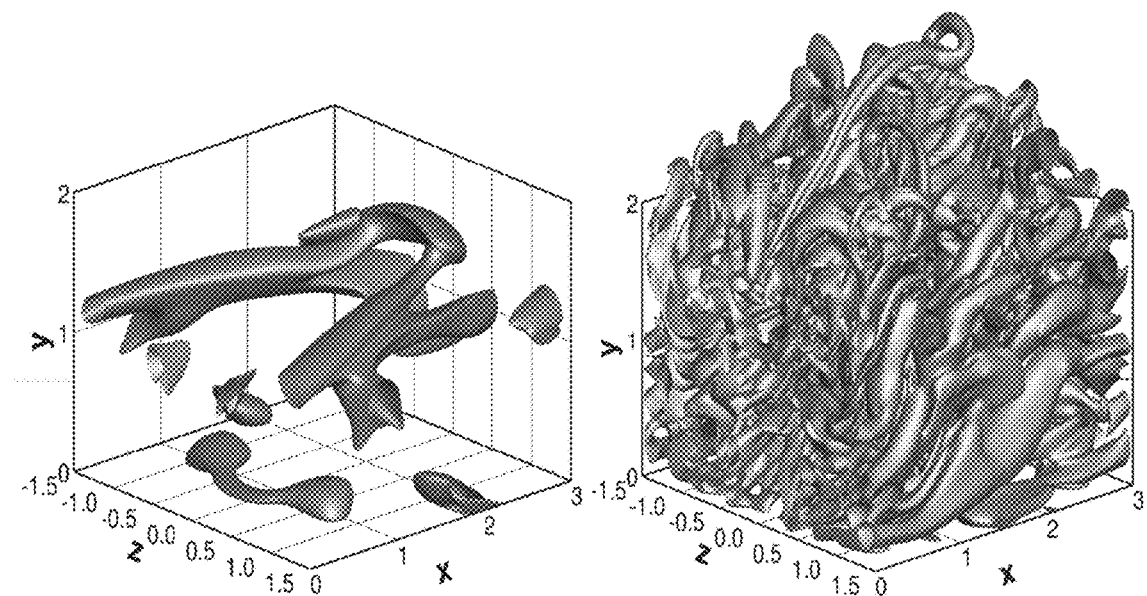
FIG. 48 is a diagram showing isocontours of Q=0.02, for the smooth wall fundamental resonance case (F45_sw) at (a), (b) t=291.2 and (c), (d) t.
Figure 49:
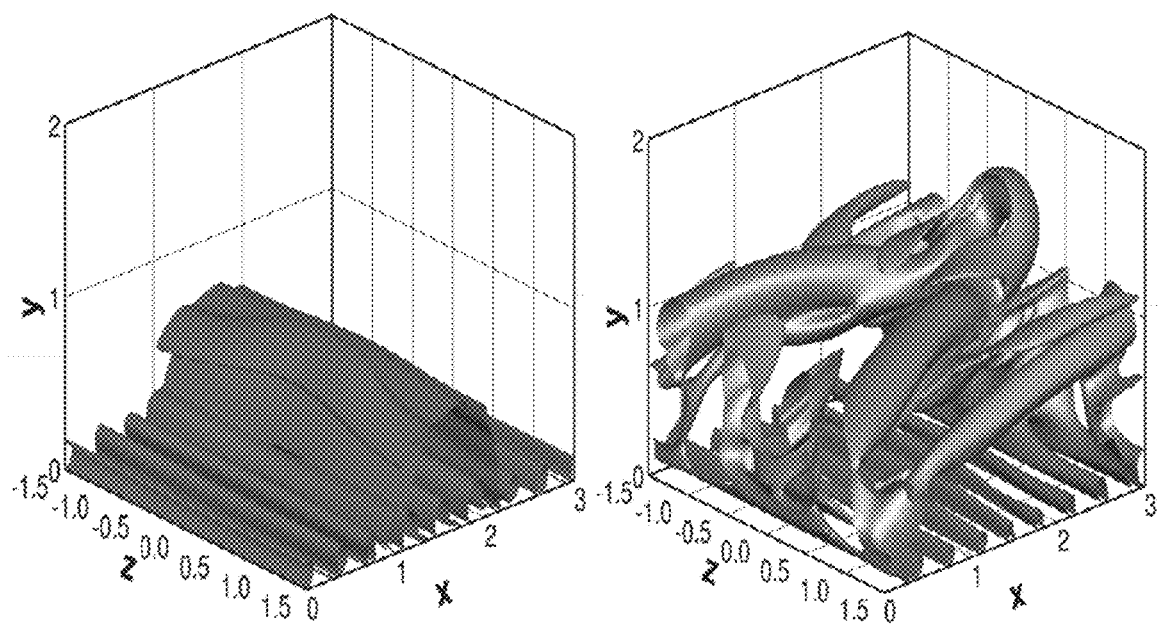
FIG. 49 is a diagram showing isocontours of Q=0.02 for the porous wall fundamental resonance case (F45_pw1) at (a) t=670.6 and (b) t=714.0.
Figure 50:
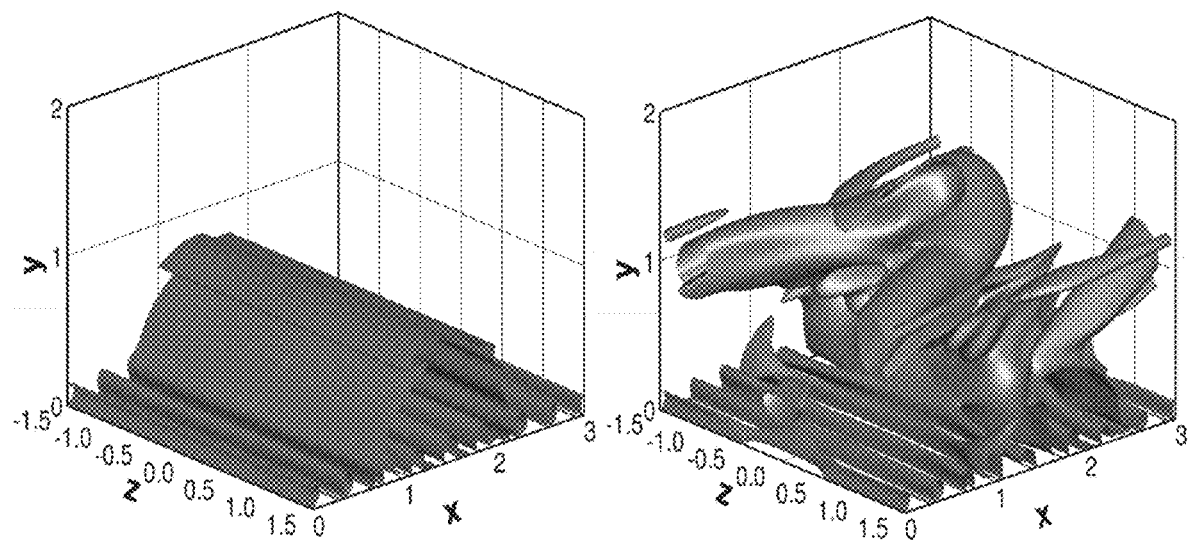
FIG. 50 is a diagram showing isocontours of Q=0.02 for the porous wall fundamental resonance case (F45_pw2) at (a) t=350.0 and (b) t=543.2.
Figure 51:
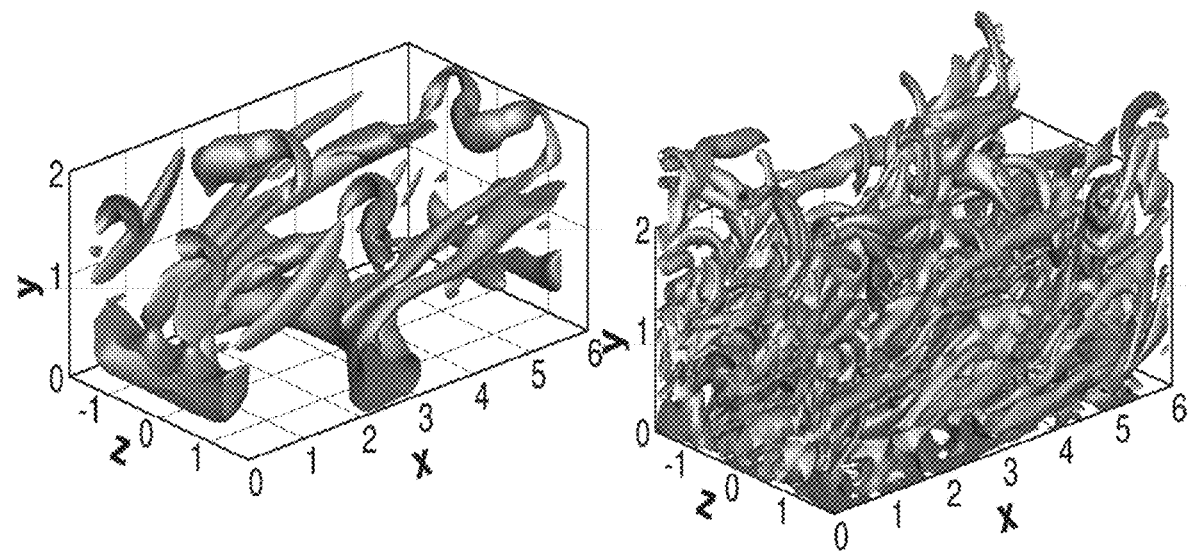
FIG. 51 is a diagram showing isocontours of Q=0.02 for the smooth wall subharmonic resonance case (S60_sw) at (a) t=613.2 and (b) t=655.2.
Figure 52:
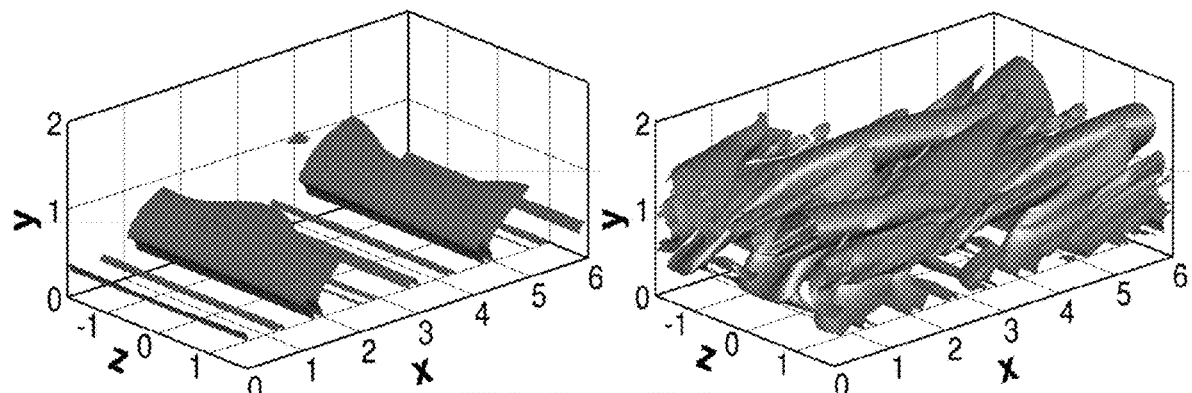
FIG. 52 is a diagram showing isocontours of Q=0.02 for the porous wall subharmonic resonance case (S60_pw1) at (a) t=697.2 and (b) t=760.2.

To identify the small-scale structures present in the flow field isocontours of the Q-criterion are visualized (see FIGS. 48, 49, 50). The snapshots extracted for the smooth wall case shows aligned lambda vortex structures (FIG. 47, left figure) that are typical for the fundamental resonance breakdown scenario. These lambda structures break down to smaller scale structures for later times and hairpin vortices form (see FIG. 48, right figure). For the porous wall cases the Q-criterion is computed above the immersed wall and not within the cavities. The results show that even at much later time instances compared to the smooth wall case the vortical structures are predominantly two dimensional and located near the wall (see FIGS. 49 and 50). A significant difference compared to the smooth wall case is the vortical structures observed at the cavity mouths. As for the smooth wall case the structures show a spanwise variation at a later time and move upward in wall normal direction and the formation of aligned lambda vortices can be observed. However, even though the results are extracted at much later time steps the breakdown to small-scale structures as for the smooth wall case could not be observed. This underlines that the porous wall geometries significantly delay the transition onset as well as breakdown to small-scale structures. The observations for the subharmonic breakdown scenario are similar to the ones made for the fundamental resonance case. Three-dimensional vortical structures are observed. These vortical structures are staggered which is typical for the subharmonic breakdown. At a later time these vortical structures break down to small-scale structures (FIG. 51). For the porous wall case (FIG. 52) the breakdown to smaller scales is not as pronounced as for the smooth wall case. A strong three-dimensional modulation of the flow can be observed. This case also exhibits streamwise vortices right above the cavities. In addition, the three dimensional vortical structures are significantly altered by the presence of the porous wall.

Figure 53:
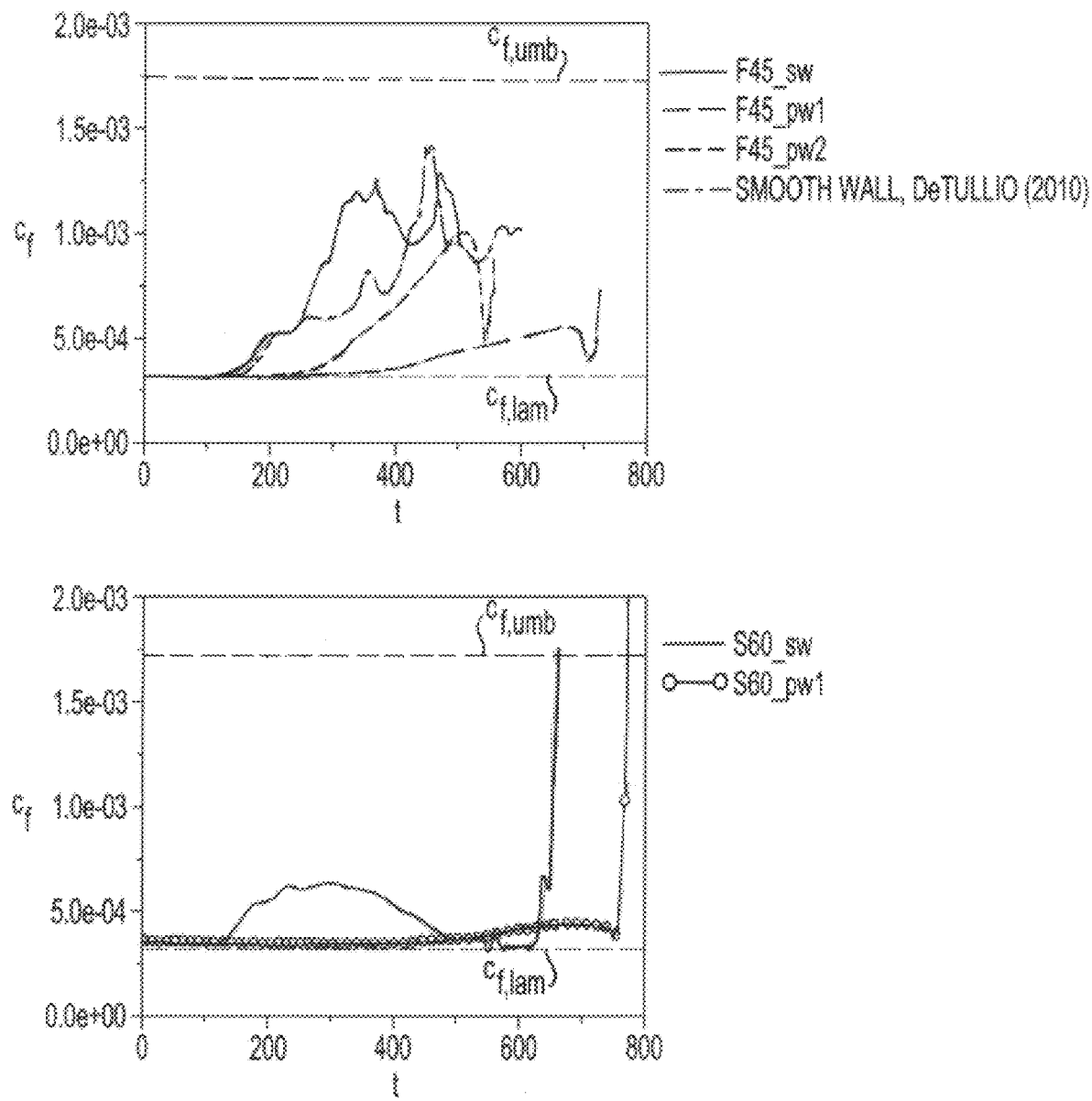
FIG. 53 is a diagram showing comparison of skin friction evolution of smooth and porous wall cases for the (a) fundamental resonance scenario and (b) subharmonic resonance scenario.

To investigate if the presence of the porous wall can effectively delay transition or transition onset, the time evolution of the spanwise and streamwise averaged skin friction coefficient is analyzed. Transition onset is defined here as the time instant, where the skin friction coefficient, cf, starts departing from its laminar value. The skin friction evolution shows that the porous walls effectively delay the transition onset for the fundamental resonance breakdown scenario (FIG. 53). For the smooth wall case the transition onset occurs at t≈126 while for the porous wall cases the skin friction starts deviating from its laminar value at t≈230, for d=1.0, and at t≈360, for d=0.30. For the smooth wall case the skin friction exhibits multiple maxima and minima after transition onset occurs. In comparison, the skin friction grows nearly linearly for the porous wall cases (FIG. 53, left figure). The cavity depth, d=0.3, was identified to be the 'optimal' cavity depth reducing the temporal growth rate of the 2D second mode most significantly in the linear stability regime. This 'optimal' cavity also delays the transition onset in the fundamental resonance case most effectively. The skin friction evolution for the subharmonic resonance scenario (FIG. 53, right figure) shows that the transition onset is also significantly delayed by the presence of the porous walls.

4. Exemplary Solutions
Summary of Objectives and Proposed Tasks

The overarching objective of the proposed research is a profound contribution towards the understanding of the fundamental physics of the nonlinear stages in hypersonic boundary layer transition. Based on this understanding we will then explore flow control strategies with the goal of modifying or delaying the nonlinear transition process. In practical scenarios, receptivity plays an important role in both the fundamental flow physics of the nonlinear regime, and especially also with respect to flow control, and therefore will be addressed in the proposed research. A thorough understanding of the flow physics of the nonlinear transition regime is crucially needed for several reasons: i) Since compressibility effects considerably extend the nonlinear transition regime in the downstream direction (compared to low-speed boundary layers), the nonlinear transitional flow can cover very large downstream extents of actual hypersonic flight vehicles, such as for example for Hypersonic Glide Vehicles (HGVs). As our previous research has shown (and experiments at Purdue and TAMU have confirmed), this nonlinear transitional behavior can cause streamwise streaks that are associated with locally very high skin friction and heat loads (that can far exceed the turbulent values), thus negatively affecting the aerodynamic performance and compromising the structural integrity of the flight vehicle due to the high localized heat loads. ii) New transition prediction tools are needed for the design and safe operation of high-speed flight vehicles that incorporate the nonlinear transition mechanisms that we are investigating. iii) Effective and efficient flow control (both passive and active) for delaying or modifying the transition process, such that the detrimental consequences of the nonlinear transition process (as stated above) are mitigated or avoided, will not be possible without a thorough identification and understanding of the physical mechanisms. For the proposed investigations we will mainly employ Direct Numerical Simulations and stability theory (both primary and secondary). Receptivity mechanisms relevant for the fundamental physics of the nonlinear transition stages, and relevant for flow control strategies to be investigated in our proposed work will be addressed by theory and specially tailored DNS, respectively.

Specifically, the proposed research tasks, and sub-objectives to be addressed with these tasks, are as follows:
4.1 Investigate Fundamental Flow Physics of Nonlinear Stages for the Quiet Flow Conditions at Purdue and TAMU for Various Model Geometries:

Sub-Objective: First understand the nonlinear physics for the "clean" (quiet) conditions before the effects of free-stream turbulence, noise, etc. are introduced. This will also allow for a cross validation between experimental measurements (which are difficult and therefore associated with uncertainties) and DNS results. Different model geometries are investigated in order to understand the effects of geometry on the nonlinear behavior. The following model geometries will be investigated:
4.1.1 Purdue Standard Straight 7° (Half-Angle) and 3° (Half-Angle) Cones, Both at Zero Angle of Attack.

Figure 59:
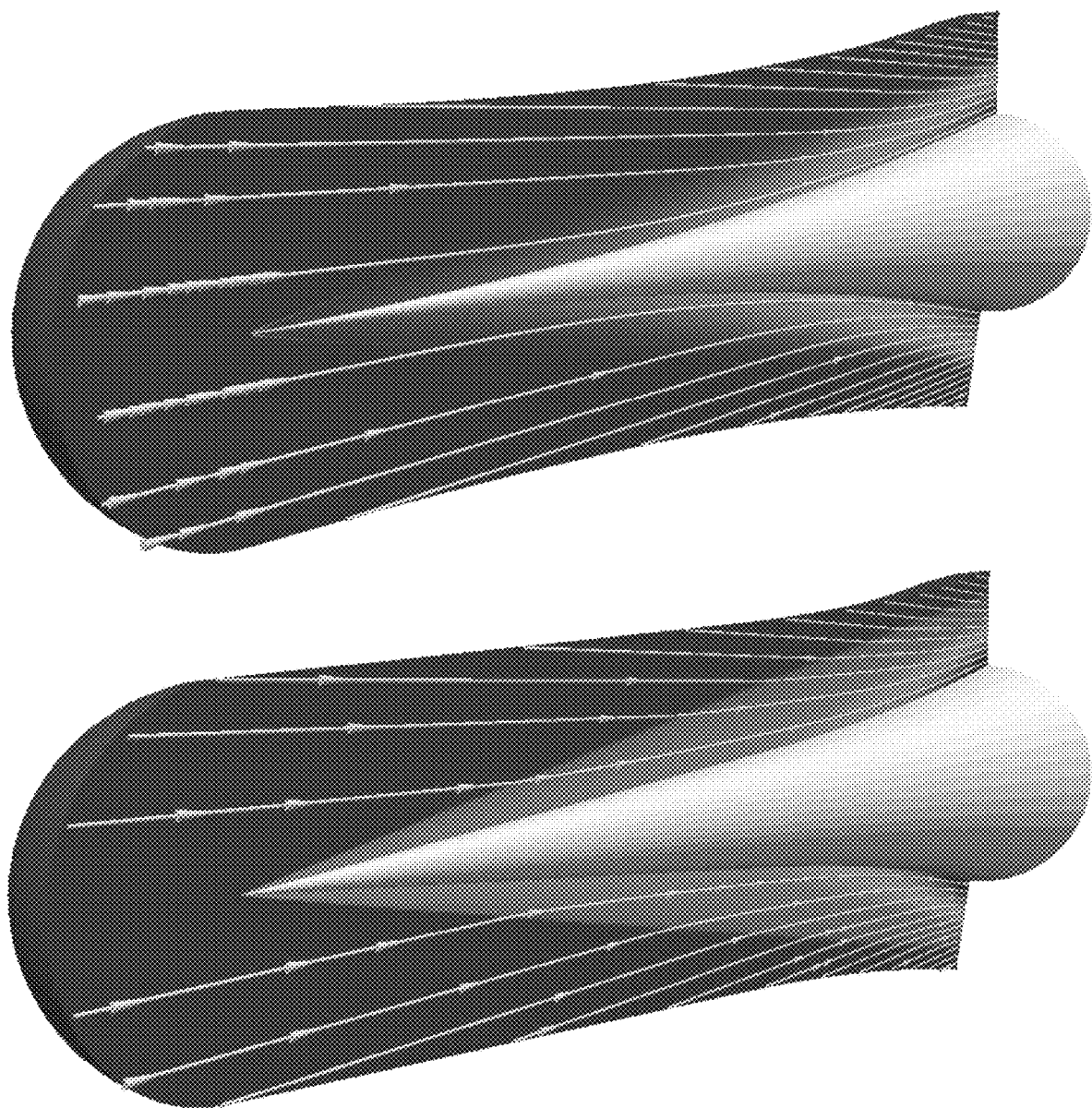
FIG. 59 is a diagram showing axisymmetric base flow for (a) the Purdue flared cone (Berridge et al. 2010) and (b) the NASA flared cone (Lachowicz et al. 1996). Isocontours of pressure with streamlines indicate the oblique shock emanating from the nose tip and the region of adverse pressure gradient towards the end of the flared cone. From our calculations.

Note that the slender 3° cone led to breakdown in the experiments at quiet conditions, while the standard 7° cone did not. Thus the differences of the nonlinear development between the different cone boundary layers may yield new crucial insight. An exact comparison of streak development due to nonlinear breakdown processes between simulations and experiments will be performed. Our goal is to unequivocally identify/confirm that the streaks in experiments are due to the same mechanisms as predicted by DNS.
4.1.2 Purdue and NASA (TAMU) Flared Cones:

Cone flare is destabilizing due to the adverse pressure gradient it produces (see FIG. 59). Therefore, the late nonlinear stages and breakdown to turbulent flow occurs in the experiments even at quiet conditions, while for the 7°

(half-angle) straight cone the flow does not break down to turbulence. In addition, adverse pressure gradients occur at realistic flight vehicles, thus investigating its effects on the nonlinear stages and breakdown is highly relevant.

4.1.3 Standard Cone and Flared Cone at Angles of Attack:

When certain critical angles of attack are exceeded, the basic flow (see FIG. 60) becomes unstable w.r.t. cross-flow vortices, which can dominate the transition onset. Of interest in our research will be the nonlinear development of the cross-flow vortex modes and in particular the nonlinear interaction with the traveling second mode waves that dominate the transition process for circular cones at zero angle of attack.

4.1.4 Elliptic Cone (Elliptic Cross-Section; 2:1 Ratio).

This is the geometry that is cross-flow unstable even at zero angle of attack. Thus it allows investigations of transition initiated by cross-flow instability without the complicating effects due to angle of attack. Thus already at zero angle of attack the interaction of cross flow modes with second mode traveling waves can be investigated. By including angles of attack for the elliptic cone geometry the crossflow instability can be enhanced and thus the nonlinear development of the cross-flow modes is altered. This model geometry is also investigated in flight tests (HIFiRE-5, Dolvin 2008, 2009), in addition to the ground tests in the Purdue tunnel (see for example Kimmel et al. 2010; Borg et al. 2012, 2013).

4.2 Investigate Fundamental Flow Physics of Nonlinear Stages for the Caltech T5 Flow Conditions:

Contrary to the conditions in the Purdue and TAMU quiet tunnels, the free stream in the T5 experiments is hot while the temperature of the model surface remains cold relative to the freestream. This enhances the instability (thus increases growth rates) w.r.t. second mode waves and therefore the nonlinear development is likely different from the quiet tunnel conditions. Most important, the T5 conditions are much closer to those in actual free flight than those for the quiet tunnels. The Caltech test model is a 5° straight cone (see Jewell et al. 2012, 2013). The most pertinent questions to be answered with our research are: What are the dominant nonlinear mechanisms: Fundamental, Subharmonic, Oblique? Are the dominant mechanisms similar or entirely different compared to the quiet tunnels? Answers to these questions are hugely important as they will confirm or question (hopefully confirm) the usefulness/relevance of cold flow experiments (such as in Ludwieg tubes, etc.) for investigating the nonlinear transition stages. Also, these simulations can provide answers to what temperatures the gas would have to be heated (in currently cold flow facilities) in order to capture the relevant nonlinear mechanisms. This is crucially important as several such facilities are brought online currently and in the future. Furthermore, the T5 experiments have shown the development of turbulent spots in their natural disturbance environment. Therefore we will perform DNS for the same conditions where turbulent spots were observed in order to back out what nonlinear mode interactions were responsible for the breakdown of these turbulent spots.

4.3 Flow Control (Passive and Active) to Modify the Nonlinear Transition Regime.

Our previous simulations for the Purdue and TAMU conditions have shown that the dominant nonlinear mechanisms are fundamental and oblique breakdown. Both mechanisms generate streamwise vortices (streaks) within the boundary layer of certain ("optimal") spanwise spacing. ("Optimal" is used here in the sense that it results in the most rapid transition). Thus, the proposed flow control strategies discussed below are based on the idea, that transition would be delayed—and in addition the detrimental effects of high localized wall shear and heat loads associated with the streaks be mitigated—if the onset and downstream growth of the streaks could delayed or prevented altogether.

The proposed control investigations discussed below will be carried out first for the Purdue and TAMU quiet conditions for the straight and flared cones. If proven successful in the simulations and experiments, the best strategies can be investigated for the T5 hot flow conditions that are closer to realistic free flight conditions) to determine if these control strategies are still relevant for free flight.

4.3.1 Passive Control Using Localized 3D Roughness Elements:

The basic idea is to generate longitudinal vortex modes in the boundary layer that can then interact nonlinearly with the dominant instability modes present in the natural (uncontrolled) transition scenario. We have already confirmed in preliminary simulations, that the secondary instability mechanisms, resulting in the streaks for the natural (uncontrolled) case, can also be triggered by forcing with a low amplitude stationary streamwise vortex mode and let it interact with the nonlinear second mode traveling waves. The essence of the control strategy is then to use a spanwise spacing for the forced longitudinal vortex modes such that the secondary instability growth rate is less than for the "optimal" spacing (that leads to the most rapid transition in the natural case), and as a consequence, transition will be delayed. A practically simple way to generate the longitudinal vortices is by placing a ring of very small 3D roughness elements (or pores, i.e. "negative" roughness) with a regular spanwise spacing on surface of the cones. Preliminary experiments by Schneider and coworkers at Purdue have shown already that longitudinal vortices can be generated by small 3D roughness elements in a M=6 boundary layer. The effects of shape and size of the roughness (and/or pores) will be explored in order to arrive at an effective and efficient control strategy, such that the enhanced receptivity and the increased drag due to the roughness, does not offset the benefits of the transition delay.

4.3.2 Passive Control Using 2D Roughness Elements (Bumps or Grooves) Modify/Delay the Nonlinear Regime:

The basic idea here is to employ 2D roughness elements (bumps and/or grooves, i.e. "negative" roughness) to enhance the growth of the 2D second mode waves directly (and/or indirectly by the increased receptivity w.r.t. freestream disturbances) in order to prevent or delay the interaction with the 3D oblique waves, which is required for the nonlinear generation of the longitudinal vortex modes. Or stated differently, the 2D roughness (or grooves) would act like a barrier that may block the development of the 3D waves (and favor 2D waves instead), and thus prevent/delay the generation of the longitudinal vortices. Note that this control strategy is different from that proposed by Zhong and co-workers (see Fong et al. 2014, 2015) as their control objective is to reduce the growth rates of the traveling second modes waves in the linear stability regime while the control strategy proposed here addresses the nonlinear regime, where in fact we want to enhance (and not mitigate) the growth of the 2D traveling wave so that the 3D breakdown and the associated detrimental streaks are delayed or even prevented.

Again, here the effects of the shape and size of the 2D roughness (or grooves) will be investigated in order to arrive at an effective and efficient control strategy, so that the increased drag due to the roughness does not offset the benefits of the delayed transition.

4.3.3 Active Control Using Time-Dependent (Pulsed) Actuation:

Instead of using 3D roughness or pores as "steady" actuators to generate the longitudinal vortex modes as discussed previously (sect. 3.1), time-dependent (sinusoidal or periodically pulsed) actuation can be used to generate unsteady longitudinal vortex modes. In preliminary DNS we have already confirmed that the interaction of (small amplitude) time-periodic longitudinal vortex modes (with appropriate spanwise spacing) with the nonlinear second-mode waves can lead to the same nonlinear breakdown scenarios as in the natural (uncontrolled) case. Thus with a spanwise spacing of the actuators that is different from that resulting in the most rapid transition ("optimal" spacing; see 3.1) the nonlinear stages can be delayed as for passive control.

We will also investigate active control using 2D time-dependent actuation. As discussed in 3.2 above the strategy here is to enhance the 2D second-mode instability waves and suppress the development of the 3D secondary modes, and as a consequence, delay the streak development and breakdown. The advantage of these time-dependent active control strategies compared to the passive ones using roughness (positive or negative) would be that the drag penalties associated with the actuators would be much smaller because they are only used at relatively small time durations (reduced duty cycle) and could be turned off entirely when not needed in certain parts of the flight envelope.

Possible actuator realizations that could be used in wind-tunnel experiments for example, are DBD (Dielectric Barrier Discharge, or "Plasma") actuators, (see for example, Little et al. 2010, 2012; Rethmel et al. 2011). These control strategies will be explored by modeling the local effects of the actuators by localized, time-dependent volume forces and/or entropy blobs.

4.4 Receptivity Investigations (Without and With Flow Control):

Recent analysis of our DNS results for localized pulsed forcing has shown that the downstream location of the disturbance source has a strong impact on the boundary layer receptivity. Thus the ensuing nonlinear scenario depends on the local disturbance generation and development. In order to explore the role of location of the disturbance generator (actuator) on the receptivity of the disturbance source we propose to carry out receptivity analyses of the boundary layer flow for different locations of the disturbance generator. The composition of the disturbance field generated by the localized disturbance will be key to understanding the nature of the nonlinear interactions as the disturbances that are generated by the local receptivity mechanisms enter the nonlinear regime and become involved in the nonlinear interactions.

5. Simulation and Post-Processing Tools
5.1 Direct Numerical Simulation (DNS)

Although considerable insight into the high-speed transition process has already been gained from the (relatively) few DNS reported in the literature, numerous questions remain that can be answered with new high-fidelity DNS using highly accurate and efficient numerical codes. Unquestionably, DNS of transition in high-speed boundary layers is a computationally intensive and challenging task. However, with the progress in numerical techniques and, in particular, with the recent and expected future advances in computer technology, DNS will be employed more extensively for high-speed transition research. With the availability of today's high-performance computers, for example, DNS can be applied to investigate the effect of broadband forcing (either by continuous random forcing or pulse-type disturbance input) on the breakdown processes in order to more realistically model the processes that are likely to take place in free-flight situations. Also, DNS can and should be employed to investigate the effects of "cold" (laboratory) and "hot" (free-flight) conditions on the transition processes (see discussion in § 1) so that the knowledge gained can be utilized for improving transition prediction models and consequently be employed in the design and development of high-speed flight vehicles.

For the proposed simulations of the nonlinear stages and the early stages of turbulent breakdown, we can build on the high-order accurate codes that we developed previously for simulations of "controlled" supersonic transition (see Thumm et al. 1990, Fasel et al. 1993) and which were considerably improved. The codes were parallelized to run efficiently on massively parallel supercomputers such as those available at DoD High Performance Computer Centers (see Appendix C). The codes were also adapted to the cone geometries (including the flared cone) used in the experiments and successfully validated for a range of Mach numbers (M=3.5, M=6.0, M=8.0).

In addition, a new compressible block structured Navier-Stokes Solver was developed with the capability of generalized coordinates and a locally stabilized immersed boundary method in 3D. The solver features multiple schemes to compute the viscous and the convective terms of the compressible Navier-Stokes equations. For the convective terms a second order MUSCL scheme, a $5^{th}$ order WENO scheme, a centered finite difference scheme with adjustable order-of-accuracy and with artificial dissipation and an upwind biased centered finite difference scheme with adjustable order-of accuracy are available. The viscous terms can be computed in the conservative formulation where the viscous fluxes are computed and then differentiated or in non-conservative formulation where the second derivatives are computed directly. When employing generalized coordinates multiple stretching functions are available as well as the capability of reading in 1D, 2D and 3D grid files. The metric terms are computed in strong conservation formulation to ensure freestream conservation. The immersed boundary method is implemented in 3D and was tested and validated for various canonical test cases and applications (Brehm et al. 2014, Brehm et al. 2015). The boundary condition treatment of the immersed boundary was significantly improved to make the code more robust. A so-called x-ray routine is available to read triangulated surfaces of an immersed geometry. Multiple flux splitting routines such as van Leer, Rusanov and AUSMPW+ are readily available.

Figure 54:
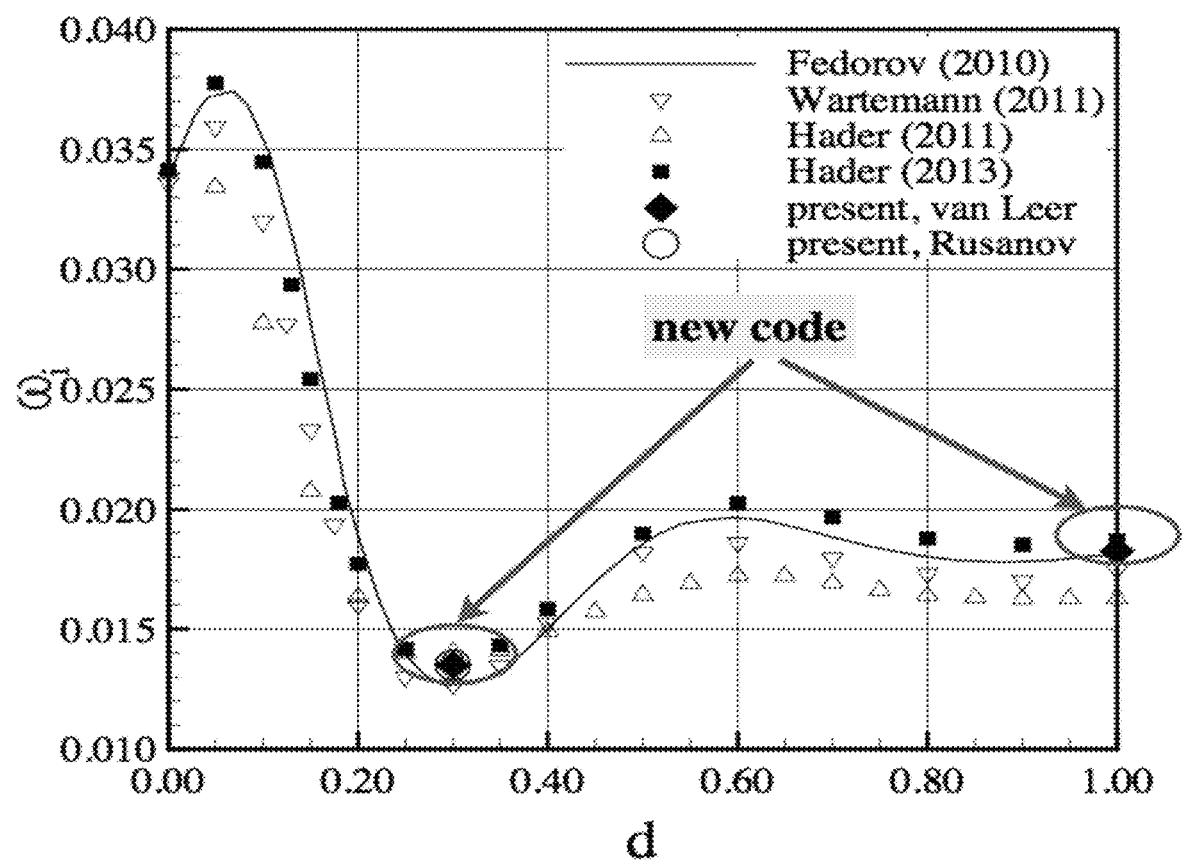
FIG. 54 is a diagram showing temporal growth rate versus cavity depth.
Figure 56:
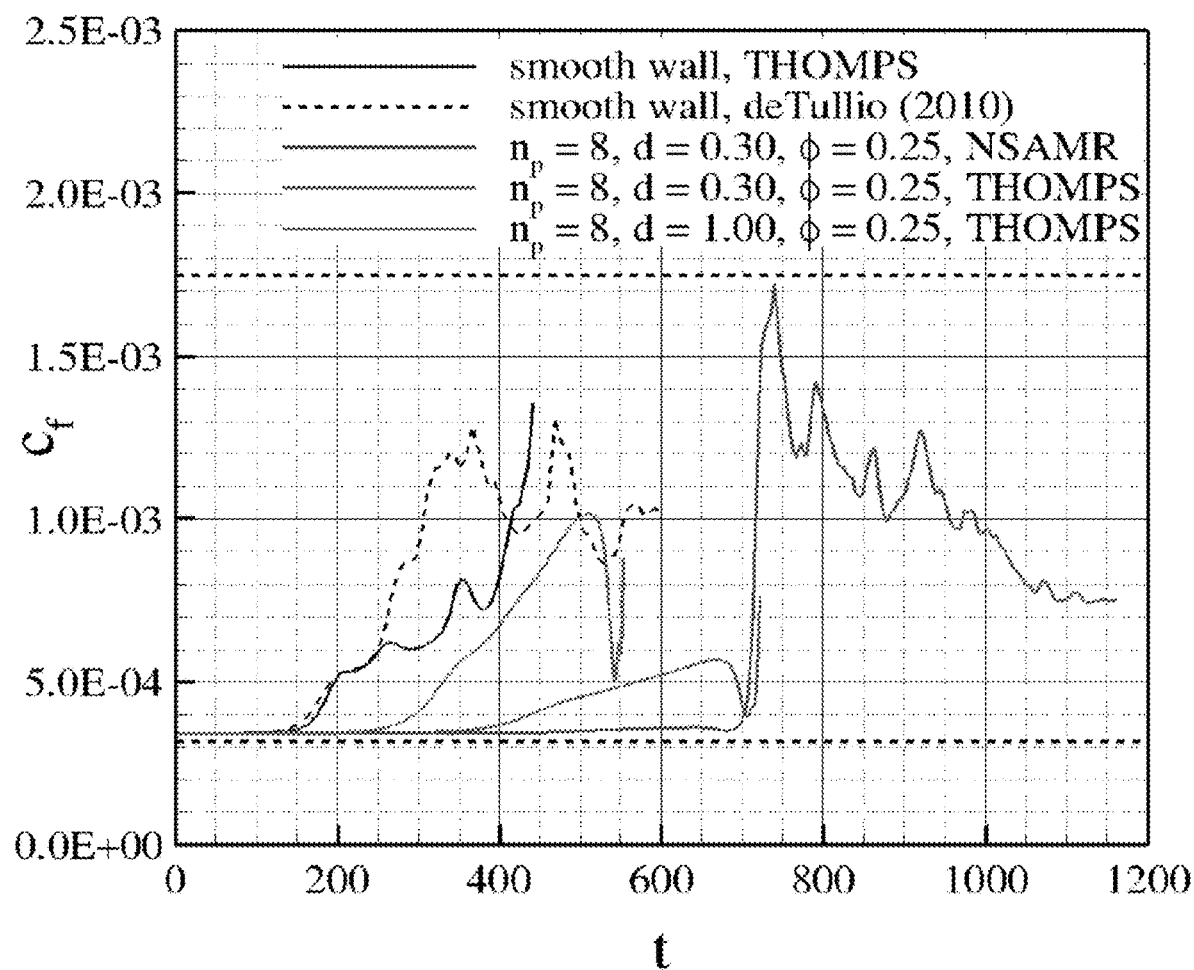
FIG. 56 is a diagram showing skin friction evolutions for smooth and porous wall cases (fundamental resonance breakdown).

To demonstrate the capabilities of the newly developed code some of the porous wall simulations were revisited. The results of the new code for the linear stability regime match very well with the previous results (see FIG. 54). The fundamental breakdown scenario over a porous wall with $n_p$=8 pores, d=0.3 and a porosity of $\varphi$=0.25 was computed with the new code. With the new code the simulations could be advanced into the turbulent flow regime without filtering (see FIG. 55). This shows that the improved boundary condition treatment made the code much more robust compared to the previous implementation. The mode evolution (see FIG. 55, left figure) shows that a broad band of disturbance frequencies is present in the flow. The Van Driest transformed velocity profiles show a clear development of the logarithmic layer (see FIG. 55, right figure), which indicates that the flow is turbulent at these time instances. The skin friction evolution (see FIG. 56) shows that the transition is significantly delayed when employing porous walls.

Figure 57:
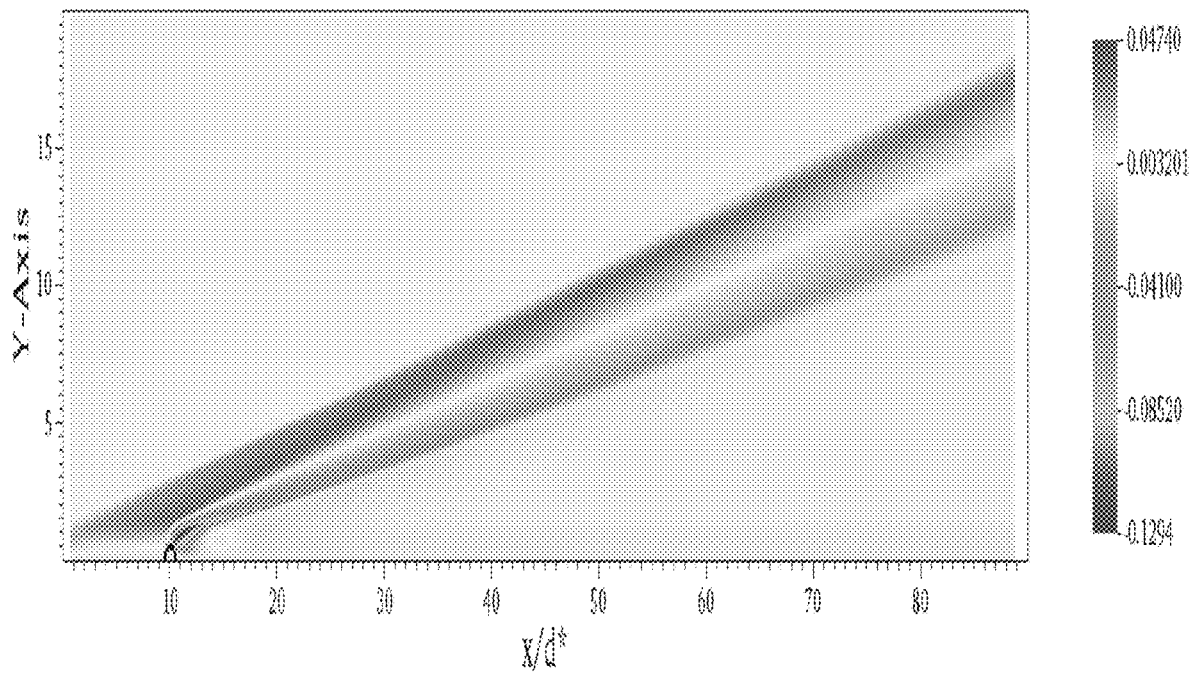
FIG. 57 is a diagram showing wall normal velocity contours for baseflow convergence with isolated roughness element.
Figure 58:
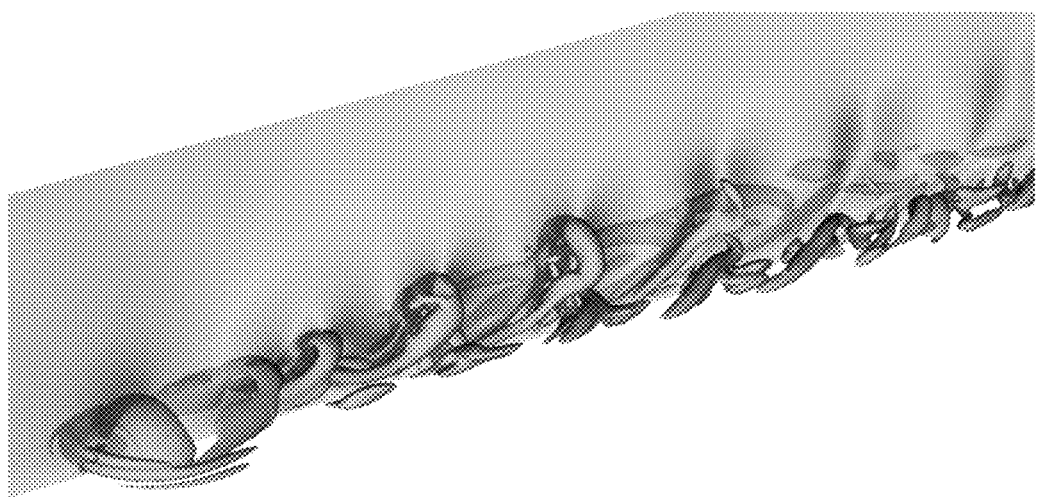
FIG. 58 is a diagram showing 3D roughness in a low speed flow—from our DNS.

Preliminary spatial direct numerical simulations for isolated roughness elements in a compressible boundary layer were carried out (see FIGS. 57 and 58). The roughness elements are physically resolved with a locally stabilized immersed boundary method (Brehm et al. 2012, Brehm et al. 2014, Brehm et al. 2015). The 3D immersed boundary capabilities are also shown for a hemi-spherical roughness element (FIG. 58).

5.2 Data Analysis and Post-Processing

In addition to conventional post-processing of the simulation data, both graphical and numerical, we will employ Proper-Orthogonal Decomposition (POD) for identifying the relevant structures in the nonlinear stages of transition. For example, the application of a POD analysis to data obtained from DNS of fundamental breakdown for a flat-plate boundary layer (Rist and Fasel 1995) led to the successful identification of the relevant vortical structures involved in this process and shed light on the dynamical interplay between the structures during breakdown (see Rempfer and Fasel 1991, 1992, 1994a,b). POD is a valuable tool for identifying and separating modes (structures) of the nonlinear transition development that cannot be done with Fourier analysis (see, for example, comments regarding our results by Lumley 1994). POD analysis allows the identification of the modes that play an "active" role in the nonlinear interactions and those that are "passive." This is accomplished by scrutinizing the energy transfer between the relevant POD modes involved in the nonlinear processes. This is particularly relevant whenever cross-flow vortices are expected to arise as in the simulations of high-speed transition for elliptic cones, or for axisymmetric cones at an angle of attack. The cross-flow vortices (steady or traveling with low frequencies) can interact with the traveling waves. To assess the role of the cross-flow vortices in the transition process, the nature of the nonlinear interactions has to be identified and, in particular, the more active modes have to be separated from the less active, or the passive modes. In addition, POD analysis has particular relevance for high-speed transition since, even without the presence of cross-flow vortices, multiple modes exist: the first (viscous) mode (and multiple viscous modes) and the second (inviscid) mode (and multiple inviscid modes) (see discussion in § 2). Once the amplitudes of any of these modes are large enough, nonlinear interactions with the other modes can take place and, due to the large number of possible modes, a very large number of relevant nonlinear interactions are possible.

6. Exemplary Strategies

Figure 62:
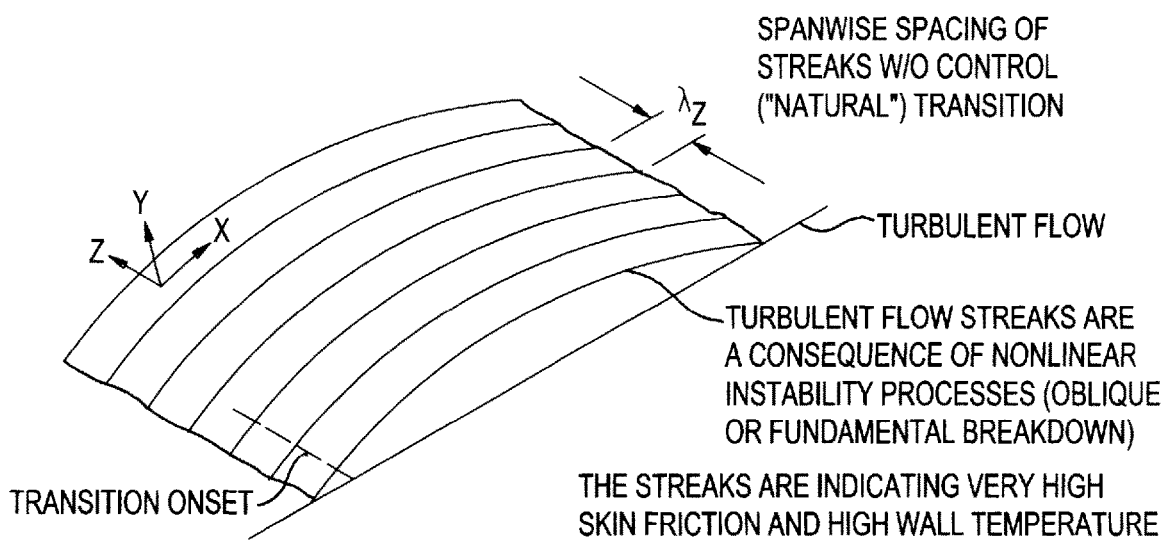
FIG. 62 is a diagram showing a natural ("uncontrolled") transition process. Stream-wise streaks develop for both the so-called "fundamental breakdown" and "oblique breakdown". These two nonlinear mechanisms have been found to be dominant in high-speed (Mach>4) boundary-layer transition.

Our research has shown that in the natural ("uncontrolled") transition process, stream-wise streaks develop for both the so-called "fundamental breakdown" and "oblique breakdown". These two nonlinear mechanisms have been found to be dominant in high-speed (Mach>4) boundary-layer transition. See FIG. 62.

Strategies for Control (Delay or Acceleration) of Transition in High-Speed Boundary Layers Strategy I Use of vortex-generators (very small) such that the "natural" (uncontrolled) spacing of the "streaks" is modified—thus, the "natural" nonlinear transition process is modified: T→S<$\lambda_z$ or S>$\lambda_z$.

Techniques to generate such longitudinal vortices:
a) localized roughness elements;
b) localized suction or blowing through the wall;
c) localized wall heating or cooling; and/or
d) localized modification of material property by, for example, different porosity, different thermal conductivity, etc.

Figure 63:
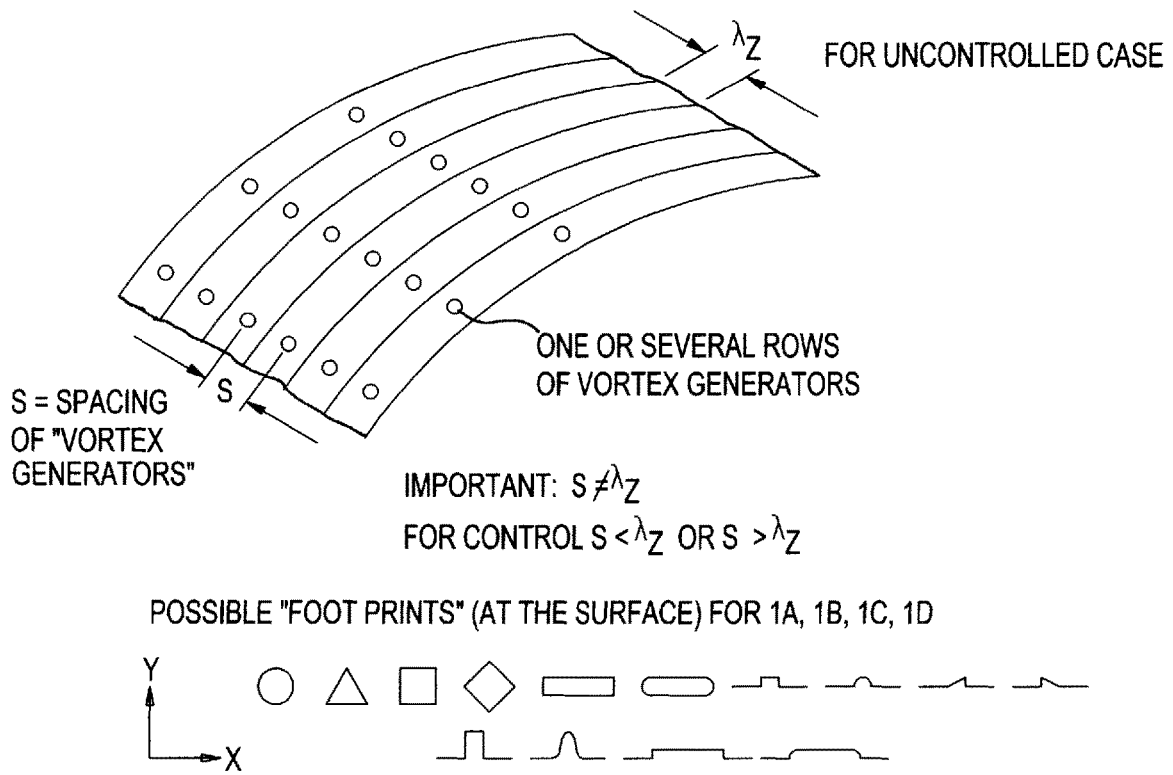
FIG. 63 is a diagram showing exemplary embodiments of vortex generators.

FIG. 63 illustrates exemplary embodiments of these techniques.

Strategy II

Inhibit (prevent or delay) the streak development, which is caused by the generation of longitudinal vortices in the nonlinear transition processes ("fundamental and oblique breakdown").

Exemplary Technique:

Place two-dimensional (spanwise non-varying) barriers that inhibit the three-dimensional instability development and as a consequence, the streak development. FIG. 64A illustrates an exemplary embodiment of this technique.

Exemplary Techniques to Implement Spanwise Barriers:

Same as in Strategy I, a), b), c), or d), except now spanwise constant (two-dimensional) no variation of geometry in z. See possible shapes illustrated in FIG. 64B.

Strategy II does not generate longitudinal vortices. Rather, it makes barriers to prevent the naturally occurring streamwise vortices ("streaks").

FIG. 65 illustrates an exemplary schematic showing the effect of transition control with Strategies I and II, above.

Exemplary Methods and Systems

Embodiments are directed to a method of controlling hypersonic boundary layer transition for a hypersonic vehicle. The method comprises determining locations of streaks that naturally develop during hypersonic flight of a hypersonic vehicle, wherein the locations of the streaks correspond to a hypersonic boundary layer transition for the hypersonic vehicle. The method also comprises providing a plurality of localized vortex generators under, within, or on a surface/wall/skin of the hypersonic vehicle such that the locations of the streaks are modified or eliminated during hypersonic flight of the hypersonic vehicle, wherein the modified or eliminated locations of the streaks result in a change in the hypersonic boundary layer transition during hypersonic flight of the hypersonic vehicle.

In an embodiment, the vortex generators comprise localized roughness elements.

In an embodiment, the vortex generators comprise localized suction devices that provide localized suction through the surface of the hypersonic vehicle.

In an embodiment, the vortex generators comprise localized blowing devices that provide localized blowing through the surface of the hypersonic vehicle.

In an embodiment, the vortex generators comprise localized heating sources that provide localized heating of the surface of the hypersonic vehicle.

In an embodiment, the vortex generators comprise localized cooling sources that provide localized cooling of the surface of the hypersonic vehicle.

In an embodiment, the vortex generators comprise locally modified material property of the surface, and wherein the locally modified material property comprises porosity.

In an embodiment, the vortex generators comprise locally modified material property of the surface, and wherein the locally modified material property comprises thermal conductivity.

In an embodiment, the change in the hypersonic boundary layer transition is a delay in the hypersonic boundary layer transition.

In an embodiment, the vortex generators comprise at least one barrier that spans multiple streaks.

Embodiments are also directed to a system that controls hypersonic boundary layer transition for a hypersonic vehicle. The system comprises a surface/wall/skin of a hypersonic vehicle that is associated with locations of streaks that naturally develop during hypersonic flight of the hypersonic vehicle, wherein the locations of the streaks correspond to a hypersonic boundary layer transition for the hypersonic vehicle. The system also comprises a plurality of localized vortex generators provided under, within, or on the surface/wall/skin of the hypersonic vehicle such that the locations of the streaks are modified or eliminated during hypersonic flight of the hypersonic vehicle, wherein the modified or eliminated locations of the streaks result in a change in the hypersonic boundary layer transition during hypersonic flight of the hypersonic vehicle.

In an embodiment of the system, the vortex generators comprise localized roughness elements.

In an embodiment of the system, the vortex generators comprise localized suction devices that provide localized suction through the surface of the hypersonic vehicle.

In an embodiment of the system, the vortex generators comprise localized blowing devices that provide localized blowing through the surface of the hypersonic vehicle.

In an embodiment of the system, the vortex generators comprise localized heating sources that provide localized heating of the surface of the hypersonic vehicle.

In an embodiment of the system, the vortex generators comprise localized cooling sources that provide localized cooling of the surface of the hypersonic vehicle.

In an embodiment of the system, the vortex generators comprise locally modified material property of the surface, and wherein the locally modified material property comprises porosity.

In an embodiment of the system, the vortex generators comprise locally modified material property of the surface, and wherein the locally modified material property comprises thermal conductivity.

In an embodiment of the system, the change in the hypersonic boundary layer transition is a delay in the hypersonic boundary layer transition.

In an embodiment of the system, the vortex generators comprise at least one barrier that spans multiple streaks.

"On Demand" Control

The strategies discussed above (and illustrated in the figures) for control of transition can be also "on demand", i.e., they are only "active" when needed during the flight trajectory. The active periods can be predetermined based on look-up tables when the flight trajectory is defined a priori. Otherwise, it can be done entirely automatically using various sensors (thermocouples, shear, stress, pressure, etc.) that determines the state of the boundary layer (i.e., laminar, transitional or turbulent) downstream of the "actuator" (vortex generator) locations. A simple and robust feedback controller will then engage (employ) the actuators depending on the type of control required or desired (delay or acceleration of transition).

Using the "on-demand" strategy, either by look-up tables or feedback control, has the advantage (over a strategy where the control is always "on") that the aerodynamic drag (and heating) caused by the vortex generators ("actuators") is eliminated in the parts of the flight trajectory when transition control is not needed. The on demand strategy also increases the durability of the actuators in the harsh hypersonic flight conditions. All of the actuator techniques in Strategies I and II above can be accommodated for the "on demand" control. For example, the roughness elements (in Strategies I and II) would retract to form a smooth surface when not engaged for control.

Additional Description

The above strategies to control hypersonic boundary layer transition may be implemented on any portion of the flight vehicle such as the vehicle's cone, wings, fuselage, etc. (or combinations thereof).

The method steps in any of the embodiments described herein are not restricted to being performed in any particular order. Also, structures mentioned in any of the method embodiments may utilize structures mentioned in any of the device embodiments. Such structures may be described in detail with respect to the device embodiments only but are applicable to any of the method embodiments.

Features in any of the embodiments described in this disclosure may be employed in combination with features in other embodiments described herein, such combinations are considered to be within the spirit and scope of the present invention.

The contemplated modifications and variations specifically mentioned in this disclosure are considered to be within the spirit and scope of the present invention.

More generally, even though the present disclosure and exemplary embodiments are described above with reference to the examples according to the accompanying drawings, it is to be understood that they are not restricted thereto. Rather, it is apparent to those skilled in the art that the disclosed embodiments can be modified in many ways without departing from the scope of the disclosure herein. Moreover, the terms and descriptions used herein are set forth by way of illustration only and are not meant as limitations. Those skilled in the art will recognize that many variations are possible within the spirit and scope of the disclosure as defined in the following claims, and their equivalents, in which all terms are to be understood in their broadest possible sense unless otherwise indicated.

The invention claimed is:

1. A method of controlling hypersonic boundary layer transition for a hypersonic vehicle, the method comprising:
   determining spanwise locations of streaks that naturally develop in a downstream direction during hypersonic flight of the hypersonic vehicle, wherein the spanwise locations of the streaks are a consequence of nonlinear transition stages in a hypersonic boundary layer transition at a surface of the hypersonic vehicle; and
   providing a plurality of localized vortex generators in the spanwise direction which is perpendicular to the downstream direction, at locations that are near or downstream of an onset of nonlinear transition stages of the hypersonic boundary layer transition, wherein the vortex generators generate spanwise vortex modes in a boundary layer adjacent a wall of the hypersonic vehicle that interact nonlinearly with instability waves and the streaks such that nonlinear streak development is delayed or prevented, and growth of the streaks are delayed or prevented, during hypersonic flight of the hypersonic vehicle, wherein the delayed or prevented nonlinear streak development and growth of the streaks result in a delay or prevention in the hypersonic boundary layer transition to turbulence during the hypersonic flight of the hypersonic vehicle, and wherein the delay or prevention in the hypersonic boundary layer transition to turbulence controls hypersonic boundary layer transition of the boundary layer.

2. The method of claim 1, wherein the vortex generators comprise localized roughness elements.

3. The method of claim 1, wherein the vortex generators comprise localized suction devices that provide localized suction through the surface of the hypersonic vehicle.

4. The method of claim 1, wherein the vortex generators comprise localized blowing devices that provide localized blowing through the surface of the hypersonic vehicle.

5. The method of claim 1, wherein the vortex generators comprise localized heating sources that provide localized heating of the surface of the hypersonic vehicle.

6. The method of claim 1, wherein the vortex generators comprise localized cooling sources that provide localized cooling of the surface of the hypersonic vehicle.

7. The method of claim 1, wherein the vortex generators comprise localized porous surface portions.

8. The method of claim 1, wherein the vortex generators comprise localized surface portions with different thermal conductivity than adjacent surface portions.

9. The method of claim 1, wherein the vortex generators comprise at least one barrier that spans across multiple streaks.

10. A system that controls hypersonic boundary layer transition for a hypersonic vehicle, the system comprising:
a surface of the hypersonic vehicle that is associated with spanwise locations of streaks that naturally develop in a downstream direction during hypersonic flight of the hypersonic vehicle, wherein the spanwise locations of the streaks are a consequence of nonlinear transition stages in a hypersonic boundary layer transition at a surface of the hypersonic vehicle; and
a plurality of localized vortex generators provided in the spanwise direction which is perpendicular to the downstream direction, at locations that are near or downstream of an onset of nonlinear transition stages of the hypersonic boundary layer transition, wherein the vortex generators generate spanwise vortex modes in a boundary layer adjacent a wall of the hypersonic vehicle that interact nonlinearly with instability waves and the streaks such that nonlinear streak development is delayed or prevented, and growth of the streaks are delayed or prevented, during hypersonic flight of the hypersonic vehicle, wherein the delayed or prevented nonlinear streak development and growth of the streaks result in a delay or prevention in the hypersonic boundary layer transition to turbulence during the hypersonic flight of the hypersonic vehicle, and wherein the delay or prevention in the hypersonic boundary layer transition to turbulence controls hypersonic boundary layer transition of the boundary layer.

11. The system of claim 10, wherein the vortex generators comprise localized roughness elements.

12. The system of claim 10, wherein the vortex generators comprise localized suction devices that provide localized suction through the surface of the hypersonic vehicle.

13. The system of claim 10, wherein the vortex generators comprise localized blowing devices that provide localized blowing through the surface of the hypersonic vehicle.

14. The system of claim 10, wherein the vortex generators comprise localized heating sources that provide localized heating of the surface of the hypersonic vehicle.

15. The system of claim 10, wherein the vortex generators comprise localized cooling sources that provide localized cooling of the surface of the hypersonic vehicle.

16. The system of claim 10, wherein the vortex generators comprise localized porous surface portions.

17. The system of claim 10, wherein the vortex generators comprise localized surface portions with different thermal conductivity than adjacent surface portions.

18. The system of claim 10, wherein the vortex generators comprise at least one barrier that spans the across multiple streaks.

* * * * *